United States Patent
Yun et al.

(10) Patent No.: US 12,209,977 B2
(45) Date of Patent: Jan. 28, 2025

(54) X-RAY DETECTOR SYSTEM WITH AT LEAST TWO STACKED FLAT BRAGG DIFFRACTORS

(71) Applicant: Sigray, Inc., Concord, CA (US)

(72) Inventors: Wenbing Yun, Walnut Creek, CA (US); Janos Kirz, Berkeley, CA (US)

(73) Assignee: Sigray, Inc., Concord, CA (US)

( * ) Notice: Subject to any disclaimer, the term of this patent is extended or adjusted under 35 U.S.C. 154(b) by 0 days.

(21) Appl. No.: 18/439,625

(22) Filed: Feb. 12, 2024

(65) Prior Publication Data
US 2024/0280515 A1    Aug. 22, 2024

Related U.S. Application Data

(60) Provisional application No. 63/485,327, filed on Feb. 16, 2023.

(51) Int. Cl.
| | |
|---|---|
| *G01N 23/20008* | (2018.01) |
| *G01N 23/20091* | (2018.01) |
| *G01N 23/207* | (2018.01) |
| *G01N 23/2209* | (2018.01) |
| *G21K 1/06* | (2006.01) |

(52) U.S. Cl.
CPC . *G01N 23/20008* (2013.01); *G01N 23/20091* (2013.01); *G01N 23/2076* (2013.01); *G01N 23/2209* (2018.02); *G21K 1/06* (2013.01); *G21K 1/062* (2013.01); *G01N 2223/041* (2013.01); *G01N 2223/0563* (2013.01); *G01N 2223/0568* (2013.01); *G01N 2223/076* (2013.01); *G01N 2223/1016* (2013.01); *G01N 2223/315* (2013.01)

(58) Field of Classification Search
None
See application file for complete search history.

(56) References Cited

U.S. PATENT DOCUMENTS

| | | | |
|---|---|---|---|
| 4,169,228 A | 9/1979 | Briska et al. | |
| 4,642,811 A | 2/1987 | Georgopoulos | |
| 4,945,552 A | 7/1990 | Ueda | |
| 5,016,265 A * | 5/1991 | Hoover | G21K 7/00 |
| | | | 378/43 |
| 5,132,997 A | 7/1992 | Kojima | |

(Continued)

FOREIGN PATENT DOCUMENTS

| | | |
|---|---|---|
| CN | 1656373 A | 8/2005 |
| CN | 1829910 A | 9/2006 |

(Continued)

OTHER PUBLICATIONS

Translation of JP 2019-078593 A (Year: 2019).*

(Continued)

*Primary Examiner* — Thomas R Artman
(74) *Attorney, Agent, or Firm* — Knobbe Martens Olson & Bear LLP

(57) ABSTRACT

An apparatus includes a plurality of stacked flat Bragg diffractors having at least a first flat Bragg diffractor and a second flat Bragg diffractor. The first and second flat Bragg diffractors are positioned sequentially along an x-ray propagation axis of an x-ray beam. The x-ray beam includes x-rays and has an angular beam divergence less than 30 mrad in at least one direction.

29 Claims, 10 Drawing Sheets

(56) References Cited

U.S. PATENT DOCUMENTS

| | | |
|---|---|---|
| 5,173,928 A | 12/1992 | Momose et al. |
| 5,204,887 A | 4/1993 | Hayashida et al. |
| 5,220,591 A | 6/1993 | Ohsugi et al. |
| 5,249,216 A | 9/1993 | Ohsugi et al. |
| 5,280,176 A | 1/1994 | Jach et al. |
| 5,684,857 A | 11/1997 | De Bokx |
| 5,778,039 A | 7/1998 | Hossain |
| 5,790,628 A | 8/1998 | Ishida |
| 5,812,629 A | 9/1998 | Clauser |
| 5,832,052 A | 11/1998 | Hirose et al. |
| 5,912,940 A | 6/1999 | O'Hara |
| 5,930,586 A | 7/1999 | Jain et al. |
| 6,108,398 A | 8/2000 | Mazor et al. |
| 6,181,773 B1 | 1/2001 | Lee et al. |
| 6,195,410 B1 | 2/2001 | Cash, Jr. |
| 6,226,347 B1 | 5/2001 | Golenhofen |
| 6,381,303 B1 | 4/2002 | Vu et al. |
| 6,430,254 B2 | 8/2002 | Wilkins |
| 6,442,231 B1 | 8/2002 | O'Hara |
| 6,456,688 B1 | 9/2002 | Taguchi et al. |
| 6,504,902 B2 | 1/2003 | Iwasaki et al. |
| 6,512,814 B2 | 1/2003 | Yokhin et al. |
| 6,577,704 B1 | 6/2003 | Holz |
| 6,611,577 B1 | 8/2003 | Yamagami |
| 6,639,968 B2 | 10/2003 | Yokhin et al. |
| 6,711,234 B1 | 3/2004 | Loxley et al. |
| 6,763,086 B2 | 7/2004 | Platonov |
| 6,829,327 B1 | 12/2004 | Chen |
| 6,891,627 B1 | 5/2005 | Levy et al. |
| 6,895,071 B2 | 5/2005 | Yokhin et al. |
| 6,914,723 B2 | 7/2005 | Yun et al. |
| 6,934,359 B2 | 8/2005 | Chen |
| 7,006,596 B1 | 2/2006 | Janik |
| 7,010,086 B2 | 3/2006 | Chopra |
| 7,023,955 B2 | 4/2006 | Chen et al. |
| 7,075,073 B1 | 7/2006 | Janik et al. |
| 7,095,822 B1 | 8/2006 | Yun |
| 7,119,953 B2 | 10/2006 | Yun et al. |
| 7,120,228 B2 | 10/2006 | Yokhin et al. |
| 7,180,979 B2 | 2/2007 | Momose |
| 7,183,547 B2 | 2/2007 | Yun et al. |
| 7,187,751 B2 | 3/2007 | Kawahara et al. |
| 7,215,736 B1 | 5/2007 | Wang et al. |
| 7,218,703 B2 | 5/2007 | Yada et al. |
| 7,221,731 B2 | 5/2007 | Yada et al. |
| 7,245,696 B2 | 7/2007 | Yun et al. |
| 7,258,485 B2 | 8/2007 | Nakano et al. |
| 7,268,945 B2 | 9/2007 | Yun et al. |
| 7,388,942 B2 | 6/2008 | Wang et al. |
| 7,394,890 B1 | 7/2008 | Wang et al. |
| 7,400,704 B1 | 7/2008 | Yun et al. |
| 7,406,151 B1 | 7/2008 | Yun |
| 7,414,787 B2 | 8/2008 | Yun et al. |
| 7,453,560 B2 | 11/2008 | Miyake |
| 7,463,712 B2 | 12/2008 | Zhu et al. |
| 7,486,770 B2 | 2/2009 | Baumann |
| 7,492,871 B2 | 2/2009 | Popescu |
| 7,499,521 B2 | 3/2009 | Wang et al. |
| 7,515,684 B2 | 4/2009 | Gibson et al. |
| 7,519,153 B1 | 4/2009 | Moore |
| 7,522,698 B2 | 4/2009 | Popescu |
| 7,522,708 B2 | 4/2009 | Heismann |
| 7,529,343 B2 | 5/2009 | Safai et al. |
| 7,532,704 B2 | 5/2009 | Hempel |
| 7,551,719 B2 | 6/2009 | Yokhin et al. |
| 7,551,722 B2 | 6/2009 | Ohshima et al. |
| 7,561,662 B2 | 7/2009 | Wang et al. |
| 7,564,941 B2 | 7/2009 | Baumann |
| 7,639,786 B2 | 12/2009 | Baumann |
| 7,646,843 B2 | 1/2010 | Popescu et al. |
| 7,653,177 B2 | 1/2010 | Baumann et al. |
| 7,680,243 B2 | 3/2010 | Yokhin et al. |
| 7,778,389 B2 * | 8/2010 | Yoneyama ............ G01N 23/041 378/85 |
| 7,787,588 B1 | 8/2010 | Yun et al. |
| 7,796,725 B1 | 9/2010 | Yun et al. |
| 7,796,726 B1 | 9/2010 | Gendreau et al. |
| 7,809,113 B2 | 10/2010 | Aoki et al. |
| 7,813,475 B1 | 10/2010 | Wu et al. |
| 7,817,777 B2 | 10/2010 | Baumann et al. |
| 7,848,483 B2 | 12/2010 | Platonov |
| 7,864,922 B2 | 1/2011 | Kawabe |
| 7,889,838 B2 | 2/2011 | David et al. |
| 7,899,154 B2 | 3/2011 | Chen et al. |
| 7,920,676 B2 | 4/2011 | Yun et al. |
| 7,924,973 B2 | 4/2011 | Kottler et al. |
| 7,945,018 B2 | 5/2011 | Heismann |
| 7,949,092 B2 | 5/2011 | Brons |
| 7,949,095 B2 | 5/2011 | Ning |
| 7,974,379 B1 | 7/2011 | Case et al. |
| 7,983,381 B2 | 7/2011 | David et al. |
| 8,005,185 B2 | 8/2011 | Popescu |
| 8,009,796 B2 | 8/2011 | Popescu |
| 8,009,797 B2 | 8/2011 | Ouchi |
| 8,041,004 B2 | 10/2011 | David |
| 8,058,621 B2 | 11/2011 | Kommareddy |
| 8,068,579 B1 | 11/2011 | Yun et al. |
| 8,073,099 B2 | 12/2011 | Niu et al. |
| 8,139,711 B2 | 3/2012 | Takahashi |
| 8,165,270 B2 | 4/2012 | David et al. |
| 8,184,771 B2 | 5/2012 | Murakoshi |
| 8,233,587 B2 | 7/2012 | Sato |
| 8,243,879 B2 | 8/2012 | Itoh et al. |
| 8,306,183 B2 | 11/2012 | Koehler |
| 8,351,570 B2 | 1/2013 | Nakamura |
| 8,353,628 B1 | 1/2013 | Yun et al. |
| 8,374,309 B2 | 2/2013 | Donath |
| 8,451,975 B2 | 5/2013 | Tada |
| 8,513,603 B1 | 8/2013 | Lederman et al. |
| 8,559,594 B2 | 10/2013 | Ouchi |
| 8,559,597 B2 | 10/2013 | Chen et al. |
| 8,565,371 B2 | 10/2013 | Bredno |
| 8,591,108 B2 | 11/2013 | Tada |
| 8,602,648 B1 | 12/2013 | Jacobsen et al. |
| 8,632,247 B2 | 1/2014 | Ishii |
| 8,755,487 B2 | 6/2014 | Kaneko |
| 8,767,915 B2 | 7/2014 | Stutman |
| 8,767,916 B2 | 7/2014 | Hashimoto |
| 8,781,069 B2 | 7/2014 | Murakoshi |
| 8,824,629 B2 | 9/2014 | Ishii |
| 8,855,265 B2 | 10/2014 | Engel |
| 8,859,977 B2 | 10/2014 | Kondoh |
| 8,908,824 B2 | 12/2014 | Kondoh |
| 8,972,191 B2 | 3/2015 | Stampanoni et al. |
| 8,989,474 B2 | 3/2015 | Kido et al. |
| 9,001,967 B2 | 4/2015 | Baturin |
| 9,016,943 B2 | 4/2015 | Jacobsen et al. |
| 9,025,725 B2 | 5/2015 | Kiyohara et al. |
| 9,031,201 B2 | 5/2015 | Sato |
| 9,036,773 B2 | 5/2015 | David et al. |
| 9,063,055 B2 | 6/2015 | Ouchi |
| 9,086,536 B2 | 7/2015 | Pang et al. |
| 9,129,715 B2 | 9/2015 | Adler et al. |
| 9,222,899 B2 | 12/2015 | Yamaguchi |
| 9,230,703 B2 | 1/2016 | Mohr et al. |
| 9,234,856 B2 | 1/2016 | Mukaide |
| 9,291,578 B2 | 3/2016 | Adler |
| 9,329,141 B2 | 5/2016 | Stutman |
| 9,357,975 B2 | 6/2016 | Baturin |
| 9,439,613 B2 | 9/2016 | Stutman |
| 9,448,190 B2 | 9/2016 | Yun et al. |
| 9,453,803 B2 | 9/2016 | Radicke |
| 9,480,447 B2 | 11/2016 | Mohr et al. |
| 9,486,175 B2 | 11/2016 | Fredenberg et al. |
| 9,494,534 B2 | 11/2016 | Baturin |
| 9,532,760 B2 | 1/2017 | Anton et al. |
| 9,541,511 B2 | 1/2017 | Vigliante |
| 9,551,677 B2 | 1/2017 | Mazor et al. |
| 9,557,280 B2 | 1/2017 | Pfeiffer et al. |
| 9,570,265 B1 | 2/2017 | Yun et al. |
| 9,588,066 B2 | 3/2017 | Pois et al. |
| 9,594,036 B2 | 3/2017 | Yun et al. |
| 9,632,040 B2 | 4/2017 | Stutman |
| 9,700,267 B2 | 7/2017 | Baturin et al. |

(56) References Cited

U.S. PATENT DOCUMENTS

| | | | |
|---|---|---|---|
| 9,719,947 B2 | 8/2017 | Yun et al. |
| 9,748,012 B2 | 8/2017 | Yokoyama |
| 9,757,081 B2 | 9/2017 | Proksa |
| 9,761,021 B2 | 9/2017 | Koehler |
| 9,770,215 B2 | 9/2017 | Souchay et al. |
| 9,778,213 B2 | 10/2017 | Bakeman et al. |
| 9,823,203 B2 | 11/2017 | Yun et al. |
| 9,826,949 B2 | 11/2017 | Ning |
| 9,861,330 B2 | 1/2018 | Rossl |
| 9,874,531 B2 | 1/2018 | Yun et al. |
| 9,881,710 B2 | 1/2018 | Roessl |
| 9,916,655 B2 | 3/2018 | Sampanoni |
| 10,028,716 B2 | 7/2018 | Rossl |
| 10,045,753 B2 | 8/2018 | Teshima |
| 10,074,451 B2 | 9/2018 | Kottler et al. |
| 10,076,297 B2 | 9/2018 | Bauer |
| 10,085,701 B2 | 10/2018 | Hoshino |
| 10,141,081 B2 | 11/2018 | Preusche |
| 10,151,713 B2 | 12/2018 | Wu et al. |
| 10,153,061 B2 | 12/2018 | Yokoyama |
| 10,153,062 B2 | 12/2018 | Gall et al. |
| 10,247,683 B2 | 4/2019 | Yun et al. |
| 10,267,752 B2 | 4/2019 | Zhang et al. |
| 10,267,753 B2 | 4/2019 | Zhang et al. |
| 10,295,485 B2 * | 5/2019 | Yun ............ G01N 23/087 |
| 10,304,580 B2 | 5/2019 | Yun et al. |
| 10,349,908 B2 | 7/2019 | Yun et al. |
| 10,352,695 B2 | 7/2019 | Dziura et al. |
| 10,352,880 B2 | 7/2019 | Yun et al. |
| 10,401,309 B2 | 9/2019 | Yun et al. |
| 10,416,099 B2 | 9/2019 | Yun et al. |
| 10,466,185 B2 | 11/2019 | Yun et al. |
| 10,473,598 B2 | 11/2019 | Ogata et al. |
| 10,485,492 B2 | 11/2019 | Koehler et al. |
| 10,514,345 B2 | 12/2019 | Ogata et al. |
| 10,514,346 B2 | 12/2019 | Sako |
| 10,568,588 B2 | 2/2020 | Koehler et al. |
| 10,578,566 B2 | 3/2020 | Yun et al. |
| 10,634,628 B2 | 4/2020 | Kasper et al. |
| 10,653,376 B2 | 5/2020 | Yun et al. |
| 10,697,902 B2 | 6/2020 | Sharma et al. |
| 10,782,252 B2 | 9/2020 | Gateshki et al. |
| 10,794,845 B2 | 10/2020 | Filsinger |
| 10,895,541 B2 | 1/2021 | Shchegrov et al. |
| 10,962,491 B2 * | 3/2021 | Yun ............ G21K 1/02 |
| 10,976,270 B2 | 4/2021 | Wormington |
| 10,976,273 B2 * | 4/2021 | Yun ............ H01J 35/18 |
| 10,989,819 B2 | 4/2021 | Wieczorek et al. |
| 11,054,375 B2 | 6/2021 | Seidler et al. |
| 11,175,243 B1 | 11/2021 | Yun et al. |
| 11,215,572 B2 | 1/2022 | Yun et al. |
| 11,549,895 B2 | 1/2023 | Yun et al. |
| 11,686,692 B2 | 6/2023 | Vine et al. |
| 11,885,755 B2 * | 1/2024 | Yun ............ G01N 23/2076 |
| 2001/0046276 A1 | 11/2001 | Schneider et al. |
| 2002/0150208 A1 | 10/2002 | Yohkin et al. |
| 2003/0072413 A1 | 4/2003 | Yokhin et al. |
| 2003/0142781 A1 | 7/2003 | Kawahara |
| 2003/0223536 A1 | 12/2003 | Yun et al. |
| 2004/0028186 A1 | 2/2004 | Yokhin et al. |
| 2004/0047446 A1 | 3/2004 | Platonov |
| 2005/0087699 A1 | 4/2005 | Miyake |
| 2005/0265517 A1 | 12/2005 | Gary |
| 2005/0282300 A1 | 12/2005 | Yun et al. |
| 2005/0286680 A1 | 12/2005 | Momose |
| 2006/0062350 A1 | 3/2006 | Yokhin |
| 2006/0088139 A1 | 4/2006 | Nankano et al. |
| 2006/0169893 A1 | 8/2006 | Lee et al. |
| 2006/0182322 A1 | 8/2006 | Bernhardt et al. |
| 2007/0108387 A1 | 5/2007 | Yun et al. |
| 2007/0183563 A1 | 8/2007 | Baumann |
| 2007/0183579 A1 | 8/2007 | Baumann et al. |
| 2007/0189449 A1 | 8/2007 | Baumann |
| 2007/0248215 A1 | 10/2007 | Ohshima et al. |
| 2007/0285643 A1 | 12/2007 | Wedowski et al. |
| 2008/0043908 A1 | 2/2008 | Teramoto et al. |
| 2008/0084966 A1 | 4/2008 | Aoki et al. |
| 2008/0159475 A1 | 7/2008 | Mazor et al. |
| 2008/0170662 A1 | 7/2008 | Reinhold |
| 2008/0181363 A1 | 7/2008 | Fenter et al. |
| 2008/0273662 A1 | 11/2008 | Yun |
| 2009/0003517 A1 * | 1/2009 | Yoneyama ............ G01N 23/207 378/19 |
| 2009/0052619 A1 | 2/2009 | Endoh |
| 2009/0092227 A1 | 4/2009 | David |
| 2009/0154640 A1 | 6/2009 | Baumann et al. |
| 2009/0316857 A1 | 12/2009 | David et al. |
| 2010/0061508 A1 | 3/2010 | Takahashi |
| 2010/0091947 A1 | 4/2010 | Niu |
| 2010/0246765 A1 | 9/2010 | Murakoshi |
| 2010/0260315 A1 | 10/2010 | Sato et al. |
| 2010/0284513 A1 | 11/2010 | Kawabe |
| 2010/0310041 A1 | 12/2010 | Adams et al. |
| 2010/0329532 A1 | 12/2010 | Masuda et al. |
| 2011/0243302 A1 | 10/2011 | Murakoshi |
| 2011/0261164 A1 | 10/2011 | Olesen et al. |
| 2011/0268252 A1 | 11/2011 | Ozawa et al. |
| 2012/0041679 A1 | 2/2012 | Stampanoni |
| 2012/0224670 A1 | 9/2012 | Kiyohara et al. |
| 2012/0228475 A1 | 9/2012 | Pang et al. |
| 2013/0011040 A1 | 1/2013 | Kido et al. |
| 2013/0039460 A1 | 2/2013 | Levy |
| 2013/0108012 A1 | 5/2013 | Sato |
| 2013/0108022 A1 | 5/2013 | Kugland et al. |
| 2013/0202084 A1 | 8/2013 | Piorek et al. |
| 2013/0251100 A1 | 9/2013 | Sasaki et al. |
| 2013/0308112 A1 | 11/2013 | Clube et al. |
| 2014/0023973 A1 | 1/2014 | Marconi et al. |
| 2014/0037052 A1 | 2/2014 | Adler |
| 2014/0064445 A1 | 3/2014 | Adler |
| 2014/0072104 A1 | 3/2014 | Jacobsen et al. |
| 2014/0105353 A1 | 4/2014 | Pfeiffer et al. |
| 2014/0105363 A1 | 4/2014 | Chen et al. |
| 2014/0112440 A1 | 4/2014 | David et al. |
| 2014/0146945 A1 | 5/2014 | Fredenberg et al. |
| 2014/0153692 A1 | 6/2014 | Larkin et al. |
| 2014/0205057 A1 | 7/2014 | Koehler et al. |
| 2014/0226785 A1 | 8/2014 | Stutman et al. |
| 2014/0270060 A1 | 9/2014 | Date et al. |
| 2015/0023472 A1 | 1/2015 | Schmitt et al. |
| 2015/0030126 A1 | 1/2015 | Radicke |
| 2015/0043713 A1 | 2/2015 | Chen |
| 2015/0049860 A1 | 2/2015 | Das |
| 2015/0051877 A1 | 2/2015 | Bakeman et al. |
| 2015/0055743 A1 | 2/2015 | Vedantham et al. |
| 2015/0055745 A1 | 2/2015 | Holzner et al. |
| 2015/0071402 A1 | 3/2015 | Handa |
| 2015/0117599 A1 | 4/2015 | Yun et al. |
| 2015/0146847 A1 | 5/2015 | Liu |
| 2015/0160354 A1 | 6/2015 | Mertens et al. |
| 2015/0243397 A1 | 8/2015 | Yun et al. |
| 2015/0247811 A1 | 9/2015 | Yun et al. |
| 2015/0260663 A1 | 9/2015 | Yun et al. |
| 2015/0270023 A1 | 9/2015 | Adler |
| 2015/0323474 A1 | 11/2015 | Case et al. |
| 2015/0323478 A1 | 11/2015 | Stutman |
| 2015/0357069 A1 | 12/2015 | Yun et al. |
| 2016/0066870 A1 | 3/2016 | Yun et al. |
| 2016/0091701 A1 | 3/2016 | Raghunathan |
| 2016/0178541 A1 | 6/2016 | Hwang et al. |
| 2016/0206259 A1 | 7/2016 | Auclair et al. |
| 2016/0341674 A1 | 11/2016 | Wu et al. |
| 2016/0351283 A1 | 12/2016 | Adler et al. |
| 2017/0038481 A1 | 2/2017 | Cheng et al. |
| 2017/0047191 A1 | 2/2017 | Yun et al. |
| 2017/0162288 A1 | 6/2017 | Yun et al. |
| 2017/0176356 A1 | 6/2017 | Hoffman et al. |
| 2017/0184520 A1 | 6/2017 | Mortensen et al. |
| 2017/0227476 A1 | 8/2017 | Zhang et al. |
| 2017/0234811 A1 | 8/2017 | Zhang et al. |
| 2017/0261442 A1 | 9/2017 | Yun et al. |
| 2017/0336334 A1 * | 11/2017 | Yun ............ G01N 23/2076 |
| 2018/0182131 A1 | 6/2018 | Koehler et al. |
| 2018/0202951 A1 | 7/2018 | Yun et al. |

(56) References Cited

U.S. PATENT DOCUMENTS

| | | |
|---|---|---|
| 2018/0261352 A1 | 9/2018 | Matsuyama et al. |
| 2018/0306734 A1 | 10/2018 | Morimoto et al. |
| 2018/0323032 A1 | 11/2018 | Strelec et al. |
| 2018/0348151 A1 | 12/2018 | Kasper et al. |
| 2019/0011379 A1 | 1/2019 | Yun et al. |
| 2019/0017946 A1 | 1/2019 | Wack et al. |
| 2019/0027265 A1 | 1/2019 | Dey et al. |
| 2019/0064084 A1 | 2/2019 | Ullom et al. |
| 2019/0086342 A1 | 3/2019 | Pois et al. |
| 2019/0115184 A1 | 4/2019 | Zalubovsky |
| 2019/0145917 A1* | 5/2019 | Yun .................. H01J 35/14 378/53 |
| 2019/0172681 A1 | 6/2019 | Owen et al. |
| 2019/0204757 A1 | 7/2019 | Brussard et al. |
| 2019/0206652 A1 | 7/2019 | Akinwande et al. |
| 2019/0212281 A1 | 7/2019 | Shchgegrov |
| 2019/0216416 A1 | 7/2019 | Koehler et al. |
| 2019/0219713 A1 | 7/2019 | Booker et al. |
| 2019/0257774 A1 | 8/2019 | Seidler et al. |
| 2019/0261935 A1 | 8/2019 | Kitamura |
| 2019/0302042 A1 | 10/2019 | Yun et al. |
| 2019/0317027 A1 | 10/2019 | Tsuboi et al. |
| 2019/0331616 A1 | 10/2019 | Schaff et al. |
| 2019/0369271 A1 | 12/2019 | Yun et al. |
| 2019/0369272 A1 | 12/2019 | Yun et al. |
| 2019/0391087 A1 | 12/2019 | Matejka et al. |
| 2020/0003712 A1 | 1/2020 | Kataoka et al. |
| 2020/0041429 A1 | 2/2020 | Cho et al. |
| 2020/0072770 A1* | 3/2020 | Yun .................. G21K 1/062 |
| 2020/0088656 A1 | 3/2020 | Pois et al. |
| 2020/0090826 A1 | 3/2020 | Adler |
| 2020/0098537 A1 | 3/2020 | Yun et al. |
| 2020/0103358 A1 | 4/2020 | Wiell et al. |
| 2020/0155088 A1 | 5/2020 | Gruener et al. |
| 2020/0158662 A1 | 5/2020 | Horiba et al. |
| 2020/0182806 A1 | 6/2020 | Kappler et al. |
| 2020/0225172 A1 | 7/2020 | Sato et al. |
| 2020/0225173 A1 | 7/2020 | Sato et al. |
| 2020/0225371 A1 | 7/2020 | Greenberg et al. |
| 2020/0232937 A1 | 7/2020 | Yaroshenko et al. |
| 2020/0279351 A1 | 9/2020 | Ratner et al. |
| 2020/0292475 A1 | 9/2020 | Cao et al. |
| 2020/0300789 A1 | 9/2020 | Osakabe et al. |
| 2020/0300790 A1 | 9/2020 | Gellineau et al. |
| 2020/0303265 A1 | 9/2020 | Gellineau et al. |
| 2020/0319120 A1 | 10/2020 | Kitamura et al. |
| 2020/0337659 A1 | 10/2020 | Sano et al. |
| 2020/0378905 A1 | 12/2020 | Safai |
| 2020/0378908 A1 | 12/2020 | Fujimura et al. |
| 2021/0055237 A1 | 2/2021 | Shchegrov et al. |
| 2021/0080408 A1 | 3/2021 | Yun et al. |
| 2021/0255123 A1 | 8/2021 | Koskinen et al. |
| 2021/0356412 A1 | 11/2021 | Yun et al. |
| 2022/0003694 A1 | 1/2022 | Seidler et al. |
| 2022/0082515 A1 | 3/2022 | Yun et al. |
| 2022/0178851 A1 | 6/2022 | Yun et al. |
| 2023/0349842 A1* | 11/2023 | Yun .................. G01N 23/2076 |
| 2024/0280515 A1* | 8/2024 | Yun .................. G01N 23/2209 |

FOREIGN PATENT DOCUMENTS

| | | |
|---|---|---|
| CN | 101257851 B | 9/2008 |
| CN | 101532969 B | 9/2009 |
| CN | 101566591 A | 10/2009 |
| CN | 101576515 A | 11/2009 |
| CN | 101413905 A | 3/2011 |
| CN | 102325498 B | 1/2012 |
| CN | 102507623 A | 6/2012 |
| CN | 102551761 A | 7/2012 |
| CN | 103604818 A | 2/2014 |
| CN | 104264228 A | 1/2015 |
| CN | 104068875 A | 5/2017 |
| CN | 206531787 U | 9/2017 |
| DE | 102007048743 A1 | 6/2010 |
| DE | 102013013344 A1 | 2/2015 |
| EP | 0751533 | 1/1997 |
| EP | 1169713 | 1/2006 |
| EP | 2592626 A1 * | 5/2013 | ............... G21K 1/06 |
| EP | 3168856 A2 | 5/2017 |
| JP | H01-097844 A | 4/1989 |
| JP | H04-285847 A | 10/1992 |
| JP | H06-188092 | 7/1994 |
| JP | H06-213833 A | 8/1994 |
| JP | H07-194592 | 8/1995 |
| JP | H07-311165 A | 11/1995 |
| JP | H08-061941 A | 3/1996 |
| JP | H08-128971 | 5/1996 |
| JP | H08-184572 | 7/1996 |
| JP | H09-166488 | 6/1997 |
| JP | H10-318737 A | 12/1998 |
| JP | H11-006804 A | 1/1999 |
| JP | H11-304728 | 11/1999 |
| JP | H11-352079 | 12/1999 |
| JP | 2001-021507 | 1/2001 |
| JP | 2001-124711 | 5/2001 |
| JP | 2001-235437 | 8/2001 |
| JP | 2002-214165 | 7/2002 |
| JP | 2003-149392 | 5/2003 |
| JP | 2003-329616 | 11/2003 |
| JP | 2004-333131 | 11/2004 |
| JP | 2005-233760 | 9/2005 |
| JP | 2006-501444 | 1/2006 |
| JP | 2007-212272 A | 8/2007 |
| JP | 2007-218683 | 8/2007 |
| JP | 2008-200359 | 4/2008 |
| JP | 2008-145111 | 6/2008 |
| JP | 2008-197495 | 8/2008 |
| JP | 2009-195349 | 3/2009 |
| JP | 2010-032341 A | 2/2010 |
| JP | 2010-236986 | 10/2010 |
| JP | 2011-033537 | 2/2011 |
| JP | 2011-095224 | 5/2011 |
| JP | 2011-218147 | 11/2011 |
| JP | 2012-032387 | 2/2012 |
| JP | 2007-309687 | 6/2012 |
| JP | 2012-112790 | 6/2012 |
| JP | 2012112914 A * | 6/2012 |
| JP | 2012-187341 | 10/2012 |
| JP | H06-102399 A | 10/2012 |
| JP | 2012-254294 | 12/2012 |
| JP | 2013-042983 | 3/2013 |
| JP | 2013-508683 | 3/2013 |
| JP | 2013-096750 | 5/2013 |
| JP | 2013-113782 | 6/2013 |
| JP | 2013-529984 | 7/2013 |
| JP | 2013-181811 | 9/2013 |
| JP | 2014-178130 | 9/2014 |
| JP | 2015-047306 | 3/2015 |
| JP | 2015-072263 | 4/2015 |
| JP | 2015-077289 | 4/2015 |
| JP | 2017-040618 | 2/2017 |
| JP | 2019-078593 | 5/2019 |
| JP | 2019078593 A * | 5/2019 |
| KR | 10-2004-0072780 | 8/2004 |
| KR | 10-2006-0088272 A | 8/2006 |
| KR | 10-2012-0012391 | 2/2012 |
| KR | 10-2012-0091591 A | 8/2012 |
| KR | 10-2014-0059688 | 5/2014 |
| WO | WO 1998/041992 | 9/1998 |
| WO | WO 2006/010091 | 1/2006 |
| WO | WO 2007/125833 | 11/2007 |
| WO | WO 2008/068044 | 6/2008 |
| WO | WO 2009/104560 | 8/2009 |
| WO | WO 2009/121932 | 10/2009 |
| WO | WO 2011/032572 | 3/2011 |
| WO | WO 2012/032950 | 3/2012 |
| WO | WO 2013/004574 | 1/2013 |
| WO | WO 2013/111050 | 8/2013 |
| WO | WO 2013/160153 | 10/2013 |
| WO | WO 2015/066333 | 5/2015 |
| WO | WO 2015/168473 | 11/2015 |
| WO | WO 2015/176023 | 11/2015 |
| WO | WO 2015/187219 | 12/2015 |

(56) References Cited

FOREIGN PATENT DOCUMENTS

| | | |
|---|---|---|
| WO | WO 2016/187623 | 11/2016 |
| WO | WO 2017/031740 | 3/2017 |
| WO | WO 2017/213996 | 12/2017 |
| WO | WO 2018/122213 | 7/2018 |
| WO | WO 2018/175570 | 9/2018 |

OTHER PUBLICATIONS

"High performance benchtop EDXRF spectrometer with Windows®® software," published by: Rigaku Corp., Tokyo, Japan; 2017.
Altapova et al., "Phase contrast laminography based on Talbot interferometry," Opt. Express, vol. 20, No. 6, (2012) pp. 6496-6508.
Andreyev et al., "Boosting the versatility of X-ray microscopes by using robotic arm sample holders," 13th Conf. on Ind. Comp. Tomography, doi.org/10.58286/29261 (2024).
Anklamm et al., "A novel von Hamos spectrometer for efficient X-ray emission spectroscopy in the laboratory," Rev. Sci. Instr. vol. 85 p. 053110 (2014).
Arsana et al., "Laboratory Liquid-Jet X-ray Microscopy and X-ray Fluorescence Imaging for Biomedical Applications," Int'l J. Mol. Sci., Vo. 25, p. 920 (2024).
Bachucki et al., "Laboratory-based double X-ray spectrometer for simultaneous X-ray emission and X-ray absorption studies," J. Anal. Atomic Spectr. DOI:10.1039/C9JA00159J (2019).
Baron et al., "A compact optical design for Bragg reflections near backscattering," J. Synchrotron Rad., vol. 8 (2001), pp. 1127-1130.
Bauer et al., "Increasing the sensitivity of micro X-ray fluorescence spectroscopy through an optimized adaptation of polycapillary lenses to a liquid metal jet source," J. Anal. At. Spectrom. DOI:10.1039/d1ja00295c (2021).
Bech, "X-ray imaging with a grating interferometer," University of Copenhagen PhD. Thesis, (May 1, 2009).
Bech, "In-vivo dark-field and phase-contrast x-ray imaging," Scientific Reports 3, (2013), Article No. 03209.
Bertaux et al., "Sub-pixel high-resolution imaging of high-energy x-rays inspired by sub-wavelength optical imaging," Op. Express, vol. 29, No. 22-25, p. 35003 (2021).
Bertilson et al., "Analyzer-free Hard X-ray Interferometry," Phys. Med. Biol. https://doi.org/10.1088/1361-6560/ad1f84 (2024).
Birkholz, "Chapter 4: Grazing Incidence Configurations," Thin Film Analysis by X-ray Scattering (Wiley-VCH Verlag Gmbh & Co. KGaA, Weinheim, Germany, 2006).
Birnbacher et al., "Quantitative X-ray phase contrast computed tomography with grating interferometry," European J. of Nucl. Med. and Mol. Imaging, https://doi.org/10.1007/s00259-021-05259-6 (2021).
Bogdanowicz et al., "Model-free measurement of lateral recess in gate-all-around transistors with micro hard-X-ray fluorescence," J. Micro/Nanopattern, Mater. Metrol., vol. 22(3), pp. 034001-1-8 (2023).
Brombal et al., "PEPI Lab: a flexible compact multi-modal setup for X-ray phase-contrast and spectral imaging," Sci. Rep. 13, p. 4206, https://doi.org/10.1038/s41598-023-30316-5 (2023).
Buchanan et al., "Effective modelling of high-energy laboratory-based x-ray phase contrast imaging utilising absorption masks or gratings," J. Appl. Physics (accepted) (2020).
Chen et al., "Advance in detection of low sulfur content by wavelength dispersive XRF," Proceedings of the Annual ISA Analysis Division Symposium (2002).
Coan et al., "In vivo x-ray phase contrast analyzer-based imaging for longitudinal osteoarthritis studies in guinea pigs," Phys. Med. Biol. vol. 55(24) (2010), pp. 7649-7662.
Cohen et al., "Tunable laboratory extended x-ray absorption fine structure system," Rev. Sci. Instr. vol. 51, No. 3, Mar. 1980, pp. 273-277.

David et al., "Hard X-ray phase imaging and tomography using a grating interferometer," Spectrochimica Acta Part B vol. 62 (2007) pp. 626-630.
Davis et al., "Bridging the Micro-to-Macro Gap: A New Application for Micro X-Ray Fluorescence," Microsc. Microanal., vol. 17(3) (Jun. 2011), pp. 410-417.
De Pauw et al., "A review of laboratory, commercially available, and facility based wavelength dispersive X-ray fluorescence spectrometers," J. Anal. At. Spectrom., doi: 10.1039/d3ja00315a (2023).
Detlefs et al., "Fast Chemical Contrast by X-ray Fluorescence Intensity Ratio Detection," Anal. Chem., https://doi.org/10.1021/acs.analchem.3c00623 (2023).
Dewulf et al., "Advances in the metrological traceability and performance of X-ray computed tomography," CIRP Annals—Manuf. Tech. vol. 00, 1-24 (2022).
Diaz et al., "Monte Carlo Simulation of Scatter Field for Calculation of Contrast of Discs in Synthetic CDMAM Images," In: Digital Mammography, Proceedings 10th International Workshop IWDM 2010 (Springer Verlag, Berlin Heidelberg), (2010), pp. 628-635 (9 pages).
Dibernardo, "Non-disruptive techniques for depth profiling in photoemission spectroscopy," Nature Review Physics, https://doi.org/10.1038/s42254-021-00331-4 (2021).
Dittler et al., "A mail-in and user facility for X-ray absorption near-edge structure: the CEI-XANES laboratory X-ray spectrometer at University of Washington," J. Synch. Rad. vol. 26, eight pages, (2019).
Dong et al., "Improving Molecular Sensitivity in X-Ray Fluorescence Molecular Imaging (XFMI) of Iodine Distribution in Mouse-Sized Phantoms via Excitation Spectrum Optimization," IEEE Access, vol. 6, pp. 56966-56976 (2018).
Du et al., "Removal of artifacts caused by grating imperfections in X-ray phase contrast tomography," J. of Inst. vol. 16, P06039, doi.org/10.1088/1748-0221/16/06/P06039 (2021).
Erko et al., "X-ray Optics," Ch. 3 of "Handbook of Practical X-Ray Fluorescence Analysis," B. Beckhoff et al., eds. (Springer, Berlin, Germany, 2006), pp. 85-198.
Espes et al., "High-resolution X-ray source with advanced e-beam technology: pushing the resolution limitation for lab-scale NanoCT," Micros. Microanal., vol. 27 (Suppl. 1), p. 1230 (2021).
Feng et al., "Reduction of Compton Background Noise for X-ray Fluorescence Computed Tomography with Deep Learning," Photonics, vol. 9, p. 108 (2022).
Fernández-Ruiz, "TXRF Spectrometry as a Powerful Tool for the Study of Metallic Traces in Biological Systems," Development in Analytical Chemistry, vol. 1 (2014), pp. 1-14.
Fisher et al., "Laminography in the lab: imaging planar objects using a conventional x-ray CT scanner," Meas. Sci. Technol., vol. 30, p. 035401 (2019).
Flenner et al., "Hard X-ray full-field nanoimaging using a direct photon-counting detector," J. Synch. Rad., https://doi.org/10.1107/S1600577522012103 (2022).
Fraunhofer, "HIgh-resolution computed laminography (HRCL) for electronic components," https://www.ikts.fraunhofer.de/en/departments/electronics_microsystems_biomedicine/condition_monitoring_non-destructive_testing/ndt_test_lab/3D-X-ray_inspection_industrial_components/computed_laminography _printed_circuit_board_inspection.html, (2024).
Gaur et al., "On the method of calibration of the energy dispersive EXAFS beamline and Indus-2 and fitting theoretical model to the EXAFS spectrum," Sadhana, vol. 36, No. 3 pp. 3390348 (2011).
Ge et al., "Investigation of the partially coherent effects in a 2D Talbot interferometer," Anal. Bioanal. Chem. vol. 401, (2011), pp. 865-870.
Ge et al., "Self-absorption correction on 2D X-ray fluorescence maps," Sci. Rep. 13, p. 7271, https://doi.org/10.1038/s41598-023-33383-w (2023).
Ghani et al., "A Phase Sensitive X-ray Brest Tomosynthesis System: Preliminary Patient Images with Cancer Legions," Phys. Med. Biol. https://doi.org/10.1088/1361-6560/ac2ea6 (2021).
Gironda et al., "Asymmetric Rowland circle geometries for spherically bent crystal analyzers in laboratory and synchrotron applications," J. Anal. At. Spectrom., doi: 10.1039/d3ja00437f (2024).

(56) References Cited

OTHER PUBLICATIONS

Graetz et al., "Lenseless X-ray Nano-Tomography down to 150 nm Resolution: On the Quantification of Modulation Transfer and Focal Spot of the Lab-based ntCT System," arXiv:2009.11749v1 [physics.ins-det] Sep. 24, 2020, 10 pages.

Gu et al., "A Breakthrough in Resolution and Scan Speed: Overcome the Challenges of 3D X-ray Imaging Workflows for Electronics Package Failure Analysis," 2023 IEEE Int'l Symp. Phys. and Failure Analysis of Integrated Circuits (IPFA), doi: 10.1109/IPFA58228.2023.10249028 (2023).

Günther et al., "Full-field structured-illumination super-resolution X-ray transmission microscopy," Nature Comm. 10:2494 (2019) and supplementary information.

Gustschin et al., "High resolution and sensitivity bi-directional x-ray phase contrast imaging using 2D Talbot array illuminators," arXiv:2105.07347v1 [physics.med-ph] May 16, 2021.

Harasse et al., "X-ray Phase Laminography with Talbot Interferometer", in Developments in X-Ray Tomography VII, Proc. SPIE vol. 7804 (2010), 780411.

Harasse et al., "Iterative reconstruction in x-ray computed laminography from differential phase measurements", Opt. Express. vol. 19 (2011), pp. 16560-16573.

Harasse et al., "X-ray Phase Laminography with a Grating Interferometer using Iterative Reconstruction", in International Workshop on X-ray and Neutron Phase Imaging with Gratings, AIP Conf. Proc. vol. 1466, (2012), pp. 163-168.

Hashimoto et al., "Improved reconstruction method for phase stepping data with stepping errors and dose fluctuations," Optics Express, vol. 28, No. 11, pp. 16363-16384 (2020).

Haug et al., A laboratory-based multifunctional near ambient pressure X-ray photoelectron spectroscopy system for electrochemical, catalytic, and cryogenic studies, Rev. Sci. Instr. vol. 94, 065104, https://doi.org/10.1063/5.0151755 (2023).

Heirwegh et al., "The focused beam X-ray fluorescence elemental quantification software package PIQUANT," Spectrochimica Acta Part B: Atomic Spectroscopy, https://doi.org/10/1016/j.sab.2022.106520 (2022).

Hemraj-Benny et al., "Near-Edge X-ray Absorption Fine Structure Spectroscopy as a Tool for Investigating Nanomaterials," Small, vol. 2(1), (2006), pp. 26-35.

Hennekam et al., "Trace metal analysis of sediment cores using a novel X-ray fluorescence core scanning method," Quaternary Int'l, https://doi.org/10.1016/j.quaint.2018.10.018 (2018).

Hirano et al., "X-ray zooming optics for analyzer-based multi-contrast computed tomography," J. Synch. Rad. Vol. 29, https://doi.org/10.1107/S1600577522001412 (2022).

Holberg et al., "High-Resolution Table-Top NEXAFS Spectroscopy," Anal. Chem. https://10.1021/acs.analchem.1c04374 (2022).

Holfelder et al., "A double crystal von Hamos spectrometer for traceable x-ray emission spectroscopy," Rev. Sci. Instrum. Vol 92, p. 123105 (2021).

Hönlcke et al., "Reference-free X-ray fluorescence analysis with a micrometer-sized incident beam," Nanotechnology, https://doi.org/10.1088/1361-6528/ad3aff (2024).

Honma et al., Full-automatic XAFS Measurement System of the Engineering Science Research II beamline BL14B2 at Spring-8, 2011, AIP Conference Proceedings 1234, pp. 13-16.

Hoshino et al., "High-energy X-ray micro-laminography to visualize microstructures in dense planar object," J. Synch. Rad. https://doi.org/10.1107/S1600577522012176 (2022).

Howard et al., "High-Definition X-ray Fluorescence Elemental Mapping of Paintings," Anal. Chem., 2012, vol. 84(7), pp. 3278-3286.

Hu et al., "Improving small animal cone beam CT resolution by mitigating x-ray focal spot induced blurring via deconvolution," Phys. Med. Bio., in press, https://doi.org/10.1088/1361-6560/ac6b7a (2022).

Ide-Ektessabi et al., "The role of trace metallic elements in neurodegenerative disorders: quantitative analysis using XRF and XANES spectroscopy," Anal. Sci., vol. 21(7) (Jul. 2005), pp. 885-892.

Ishisaka et al., "A New Method of Analyzing Edge Effect in Phase Contrast Imaging with Incoherent X-rays," Optical Review, vol. 7, No. 6, (2000), pp. 566-572.

Ito et al., "A Stable In-Laboratory EXAFS Measurement System," Jap. J. Appl. Phys., vol. 22, No. 2, Feb. 1, 1983, pp. 357-360.

Itoh et al., "Two-dimensional grating-based X-ray phase-contrast imaging using Fourier transform phase retrieval," Op. Express, vol. 19, No. 4 (2011) pp. 3339-3346.

Janssens et al, "Recent trends in quantitative aspects of microscopic X-ray fluorescence analysis," TrAC Trends in Analytical Chemistry 29.6 (Jun. 2010): 464-478.

Jahrman et al., "Vacuum formed temporary spherically and toroidally bent crystal analyzers for x-ray absorption and x-ray emission spectroscopy," Rev. Sci. Inst. vol. 90, 013106 (2019).

Jiang et al., "X-Ray Phase-Contrast Imaging with Three 2D Gratings," Int. J. Biomed. Imaging, (2008), 827152, 8 pages.

Kalasová et al., "Characterization of a laboratory-based X-ray computed nanotomography system for propagation-based method of phase contrast imaging," IEEE Trans. On Instr. And Meas., DOI 10.1109/TIM.2019.2910338 (2019).

Keyrilainen et al., "Phase contrast X-ray imaging of breast," Acta Radiologica, vol. 51 (8), (2010), pp. 866-884.

Khan et al., "Recent Trends in Applications of X-ray Photoelectron Spectroscopy (XPS) Technique in Coatings for Corrosion Protection," Chapter of "Recent Developments in Analytical Techniques for Corrosion Research," I. Toor (ed.), Springer Nature Switzerland AG https://doi.org/10.1007/978-3-030-89101-5_8 (2022).

Kido et al., "Bone Cartilage Imaging with X-ray Interferometry using a Practical X-ray Tube", in Medical Imaging 2010: Physics of Medical Imaging, Proc. SPIE vol. 7622 (2010), 762240.

Kim, "Talbot images of wavelength-scale amplitude gratings," Opt. Express vol. 20(5), (2012), pp. 4904-4920.

Kim et al., "Observation of the Talbot Effect at Beamline 6C Bio Medical Imaging of the Pohang Light Source—II," J. Korean Phys. Soc., vol. 74, No. 10, pp. 935-940 (May 2019).

Kim et al., "A Simulation Study on the Transfer Characteristics of the Talbot Pattern Through Scintillation Screens in the Grating Interferometer," J. Rad. Sci. and Tech. 42(1), pp. 67-75 (2019).

Kiranjot et al., "Surface and interface characterization of Ru/C/Ru trilayer structure using grazing incidence X-ray reflectivity and X-ray fluorescence," Surf. And Interface Analysis, doi: 10.1002/sia7016 (2021).

Kiyohara et al., "Development of the Talbot-Lau Interferometry System Available for Clinical Use", in International Workshop on X-ray and Neutron Phase Imaging with Gratings, AIP Cong. Proc. vol. 1466, (2012), pp. 97-102.

Klockenkämper et al., "7.1 Instrumental Developments" and "7.3 Future Prospects by Combinations," from Chapter 7 of Total Reflection X-ray Fluorescence Analysis and Related Methods 2nd Ed. (J. Wiley and Sons, Hoboken, NJ, 2015).

Klockenkämper et al., "Chapter 3: Instrumentation for TXRF and GI-XRF," Total Reflection X-ray Fluorescence Analysis and Related Methods 2nd Ed. (J. Wiley and Sons, Hoboken, NJ, 2015).

Kottler et al., "A two-directional approach for grating based differential phase contrast imaging using hard x-rays," Opt. Express vol. 15(3), (2007), pp. 1175-1181.

Kottler et al., "Dual energy phase contrast x-ray imaging with Talbot-Lau interferometer," J. Appl. Phys. vol. 108(11), (2010), 114906.

Kulow et al., "On the Way to Full-Field X-ray Fluorescence Spectroscopy Imaging with Coded Apertures," J. Anal. At. Spectrom. Doi: 10.1039/C9JA00232D (2019).

Kutukova et al., "Laboratory High-Contrast X-ray Microscopy of Copper Nanostructures Enabled by a Liquid-Metal-Jet X-ray Source," Nanomaterials, vol. 14, p. 448 (2024).

Kuwabara et al., "Hard-X-ray Phase-Difference Microscopy with a Low-Brilliance Laboratory X-ray Source", Appl. Phys. Express vol. 4 (2011) 062502.

(56) References Cited

OTHER PUBLICATIONS

Leatham et al., "X-ray dark-field and phase retrieval without optics, via the Fokker-Planck equation," arXiv:2122.10999v1, physics.med-ph, Dec. 21, 2021.
Lei et al., "8-inch-diameter field of view for X-ray differential phase-contrast imaging," Nucl. Inst. And Methods in Physics Research A, https://doi.org/10-1016/j.nima.2021.165375 (2021).
Li et al., "X-ray phase-contrast imaging using cascade Talbot-Lau interferometers," Proc. SPIE 10964 (2018), pp. 1096469-1-1096469-6.
Liao et al., "Design of a full-filled transmission X-ray microscope with 30nm resolution," SPIE Proc. Publ., ChinaXiv:202311.00232v1 (2023).
Lin et al., "Quasi-Monte Carlo method for calculating X-ray scatter in CT," Op. Express, vol. 29, No. 9, p. 13746 (2021).
Lin et al., "High energy x-ray Talbot-Lau interferometer employing a microarray anode-structured target source to extend the field of view," Phys. Med. Biol., doi.org/10.1088/1361-6560/ad0196 (2023).
Lohmann et al., "An interferometer based on the Talbot effect," Optics Communications vol. 2 (1971), pp. 413-415.
Longo et al., "Flexible Plenoptic X-ray Microscopy," Photonics, vol. 9, p. 98 (2022).
Lübcke et al., "Soft X-ray nanoscale imaging using a sub-pixel resolution charge coupled device (CCD) camera," Rev. Sci. Instrum. vol. 90, 043111 (2019).
Lucht et al., "Phase retrieval beyond the homogeneous object assumption for X-ray in-line holographic imaging," arXiv:2403.00461v1 [eess.IV] (2024).
Lühl et al., "Scanning transmission X-ray microscopy with efficient X-ray fluorescence detection (STXM-XRF) for biomedical applications in the soft and tender energy range," J. Synch. Rad. vol. 26, https://doi.org/10.1107/S1600577518016879, (2019).
Maisl et al., "Computed Laminography for X-ray Inspection of Lightweight Constructions," 2nd Int'l Symp. On NDT in Aerospace 2010—Mo.3.A.3, https://www.ndt.net/?id+10375 (2010).
Malzer et al., "A laboratory spectrometer for high throughput X-ray emission spectroscopy in catalysis research," Rev. Sci. Inst. 89, 113111 (2018).
Mamyrbayev et al., "Staircase array of inclined refractive multi-lenses for large field of view pixel super-resolution scanning transmission hard X-ray microscopy," J. Synch. Rad., vol. 28 https://doi.org/10.1107/S1600577521001521 (2021).
Matsunaga et al., "Development of projection X-ray microscope with 10 nm spot size," Nodestr. Test. And Eval., https://doi.org.10.1080/10589759.2022.2083616 (2022).
Matsuyama et al., "Wavefront measurement for a hard-X-ray nanobeam using single-grating interferometry", Opt Express vol. 20 (2012), pp. 24977-24986.
Menzies et al., "Dual source X-ray and electron SEM system: Elemental mapping of an Epithermal gold-bearing sample from Karangahake, New Zealand," Microsc. Microanal., vol. 27 (Suppl. 1), pp. 456 (2021).
Miao et al., "Motionless phase stepping in X-ray phase contrast imaging with a compact source," Proceedings of the National Academy of Sciences, vol. 110(48), (2013), pp. 19268-19272.
Miao et al., "A four-grating interferometer for x-ray multi-contrast imaging," Med. Physics, doi: 10.1002/mp.17052 (2024).
Mijovilovich et al., "Analysis of trace metal distribution in plants with lab-based microscopic X-ray fluorescence imaging," Plant Methods, vol. 16, No. 82, 21 pages (2020).
Mizutani et al., X-ray microscopy for neural circuit reconstruction in 9th International Conference on X-Ray Microscopy, J. Phys: Conf. Ser. 186 (2009) 012092.
Modregger et al., "Grating-Based X-ray Phase Contrast Imaging," Ch. 3 of Emerging Imaging Technologies in Medicine, M. Anastasio & P. La Riviere, ed., CRC Press, Boca Raton, FL, (2012), pp. 43-56.
Momose et al., "Phase-Contrast X-Ray Imaging Using an X-Ray Interferometer for Biological Imaging", Analytical Sciences vol. 17 Supplement (2001), pp. i527-i530.
Momose et al., "Demonstration of X-Ray Talbot Interferometry", Jpn. J. Appl. Phys. vol. 42 (2003), pp. L866-L868.
Momose et al., "Phase Tomography Using an X-ray Talbot Interferometer", in Developments in X-Ray Tomography IV, Proc. SPIE vol. 5535 (2004), pp. 352-360.
Momose, "Recent Advances in X-ray Phase Imaging", Jpn. J. Appl. Phys. vol. 44 (2005), pp. 6355-6367.
Momose et al., "Biomedical Imaging by Talbot-Type X-Ray Phase Tomography" in Developments in X-Ray Tomography V, Proc. SPIE vol. 6318 (2006) 63180T.
Momose et al., "Phase Tomography by X-ray Talbot Interferometry for Biological Imaging" Jpn. J. Appl. Phys. vol. 45 2006 pp. 5254-5262.
Momose et al., "X-ray Talbot Interferometry with Capillary Plates", Jpn. J. Appl. Phys. vol. 45 (2006), pp. 314-316.
Momose et al., "Phase Imaging with an X-ray Talbot Interferometer", Advances in X-ray Analysis vol. 49(3) (2006), pp. 21-30.
Momose et al., "Phase Tomography Using X-ray Talbot Interferometer", in Synchrotron Radiation Instrumentation: Ninth International Conference, AIP Conf. Proc. vol. 879 (2007), pp. 1365-1368.
Momose et al., "Sensitivity of X-ray Phase Imaging Based on Talbot Interferometry", Jpn. J. Appl. Phys. vol. 47 (2008), pp. 8077-8080.
Momose et al., "Grating-Based X-ray Phase Imaging Using Multiline X-ray Source", Jpn. J. Appl. Phys. vol. 48 (2009), 076512.
Momose et al., "X-ray phase tomography with a Talbot interferometer in combination with an X-ray imaging microscope", in 9th International Conference on X-Ray Microscopy, J. Phys: Conf. Ser. 186 (2009) 012044.
Momose et al., "High-speed X-ray phase imaging and X-ray phase tomography with Talbot interferometer and white synchrotron radiation", Opt. Express vol. 17 (2009), pp. 12540-12545.
Momose et al., "X-Ray Phase Imaging with Talbot Interferometry", in "Biomedical Mathematics:Promising Directions in Imaging, Therapy Planning, and Inverse Problems", Y. Censor, M. Jiang & G. Wang, eds. (Medical Physics Publishing, Madison, WI, USA, 2010), pp. 281-320.
Momose et al., "X-ray Phase Measurements with Talbot Interferometry and Its Applications", in International Conference on Advanced Phase Measurement Methods in Optics and Imaging, AIP Conf. Proc. vol. 1236 (2010), pp. 195-199.
Momose et al., "X-ray Phase Imaging Using Lau Effect", Appl. Phys. Express vol. 4 (2011) 066603.
Momose et al., "Four-dimensional X-ray phase tomography with Talbot interferometry and white synchrotron radiation: dynamic observation of a living worm", Opt. Express vol. 19 (2011), pp. 8423-8432.
Momose et al., "X-ray Phase Imaging—From Static Observation to Dynamic Observation—", in International Workshop on X-ray and Neutron Phase Imaging with Gratings AIP Conf. Proc. vol. 1466, (2012), pp. 67-77.
Momose et al., "Recent Progress in X-ray and Neutron Phase Imaging with Gratings," Quantum Beam Science, vol. 4, No. 9; doi:10.3390/qubs4010009 (2020).
Momose et al., "Development of grating-based super-resolution x-ray phase imaging," AIP Conf. Proc. 2990, 030003 (2023).
Morimoto et al., "X-ray phase contrast imaging by compact Talbot-Lau interferometer with a signal transmission grating," 2014, Optics Letters, vol. 39, No. 15, pp. 4297-4300.
Morimoto et al., "Design and demonstration of phase gratings for 2D single grating interferometer," Optics Express vol. 23, No. 23, 29399 (2015).
Munro et al., Design of a novel phase contrast imaging system for mammography, 2010, Physics in Medicine and Biology, vol. 55, No. 14, pp. 4169-4185.
Nakamura et al., "Nanoscale X-ray Tomography of Integrated Circuits using a Hybrid Electron/X-ray Microscope: Results and Prospects," 2023 IEEE Phys. Assurance and Inspection of Electron., doi: 10.1109/PAINE58317.2023.10318004 (2023).
Nango et al., "Talbot-defocus multiscan tomography using the synchrotron X-ray microscope to study the lacuno-canalicular network in mouse bone", Biomed. Opt. Express vol. 4 (2013), pp. 917-923.

(56) References Cited

OTHER PUBLICATIONS

Nemeth et al., "Laboratory von Hamos X-ray Spectroscopy for Routine Sample Characterization," arvix:1607.08045v1 (2016).
Neuhausler et al., "Non-destructive high-resolution X-ray imaging of ULSI micro-electronics using keV X-ray microscopy in Zernike phase contrast," Microelectronic Engineering, Elsevier Publishers BV., Amsterdam, NO, vol. 83, No. 4-9 (Apr. 1, 2006) pp. 1043-1046.
Newville, "Fundamentals of XAFS," (Univ. of Chicago, Chicago, IL, Jul. 23, 2004).
Novichkov et al., "Laboratory-based X-ray spectrometer for actinide science," J. Synch. Rad. vol. 30, doi.org/10.1107/S1600577523006926 (2023).
Nykanen et al., "X-ray scattering in full-field digital mammography," Med. Phys. vol. 30(7), (2003), pp. 1864-1873.
O'Brien et al., "Recent Advances in X-ray Cone-beam Computed Laminography," J. X-ray Sci. and Tech., vol. 24, No. 5, pp. 691-707 (2016).
Ohba et al., "Laboratory-size x-ray microscope using Wolter mirror optics and an electron-impact x-ray source," Rev. Sci. Inst. 92, 093704 (2021).
Oji et al., Automatic XAFS measurement system developed at BL14B2 in SPring-8, Available online Nov. 15, 2011, Journal of Synchrotron Radiation, vol. 19, pp. 54-59.
Okolo, "A guide into the world of high-resolution 3D imaging: the case of soft X-ray tomography for the life sciences," Biochem. Soc. Trans., https://doi.org/10.1042/BST20210886 (2002).
Olbinado et al., "Demonstration of Stroboscopic X-ray Talbot Interferometry Using Polychromatic Synchrotron and Laboratory X-ray Sources", Appl. Phys. Express vol. 6 (2013), 096601.
Ortega et al., "Bio-metals imaging and speciation in cells using proton and synchrotron radiation X-ray microspectroscopy," J. Royal Society Interface vol. 6 suppl. 5 (Oct. 6, 2009), pp. 6S649-6S658.
Pandeshwar et al., "Envelope modulated x-ray grating interferometry," Appl. Phys. Lett. 120, 193701 (2022).
Pandeshwar et al., "Modeling of beam hardening effects in a dual-phase X-ray grading interferometer for quantitative dark-field imaging," Optics Express, vol. 28, No. 13, Jun. 22, 2020, pp. 19187-19204 (2020).
Parrill et al., "GISAXS—Glancing Incidence Small Angle X-ray Scattering," Journal de Physique IV, vol. 3 (Dec. 1993), pp. 411-417.
Paunesku et al., "X-Ray Fluorescence Microprobe Imaging in Biology and Medicine," J. Cell. Biochem. vol. 99, pp. 1489-1502 (2006).
Pekel et al., "Geometric calibration of seven degree of freedom robotic sample holder for x-ray CT," Proc. Of SPIE 12304, 7th Int'l Conf. on Image Formation in X-Ray Computed Tomography, 123042L, doi:10.1117/12.2646492 (2022).
Pfeiffer et al., "Phase retrieval and differential phase-contrast imaging with low-brilliance X-ray sources," Nature Physics vol. 2, (2006), pp. 258-261.
Pfeiffer et al., "Hard x-ray phase tomography with low brilliance x-ray sources," Phys. Rev. Lett. vol. 98, (2007), 108105.
Pfeiffer et al., "Hard-X-ray dark-field imaging using a grating interferometer," Nature Materials vol. 7, (2008), pp. 134-137.
Pfeiffer, "Milestones and basic principles of grating-based x-ray and neutron phase-contrast imaging," in International Workshop on X-ray and Neutron Phase Imaging with Gratings AIP Conf. Proc. vol. 1466, (2012), pp. 2-11.
Pianetta et al., "Application of synchrotron radiation to TXRF analysis of metal contamination on silicon wafer surfaces," Thin Solid Films, vol. 373(1-2), 2000, pp. 222-226.
Potts, "Electron Probe Microanalysis", Ch. 10 of "A Handbook of Silicate Rock Analysis" (Springer Science + Business Media, New York, 1987), pp. 326-382.
Prewitt et al., "Focused ion beam repair: staining of photomasks and reticles," J. Phys. D Appl. Phys. vol. 26 (1993), pp. 1135-1137.
Prewitt et al., "Gallium Staining in FIB Repair of Photomasks," Microelectronic Engineering, vol. 21 (1993), pp. 191-196.
Prewitt et al., "FIB Repair of 5X Reticles and Effects on IC Quality," Integrated Circuit Metrology, Inspection, and Process Control VII, Proc. SPIE vol. 1926 (1993), pp. 517-526.
Pushie et al., "Prion protein expression level alters regional copper, iron and zinc content in the mouse brain," Metallomics vol. 3, 206-214 (2011).
Pushie et al., "Elemental and Chemically Specific X-ray Fluorescence Imaging of Biological Systems," Chem. Rev. 114:17, 8499-8541 (2014).
Qiao et al., "Single-shot x-ray phase-contrast and dark-field imaging based on coded binary phase mask," Appl. Phys. Lett. 119, 011105 (2021).
Qin et al., "Trace metal imaging with high spatial resolution: Applications in biomedicine," Metallomics, vol. 3 (Jan. 2011), pp. 28-37.
Redus et al., "Spectrometer configuration and measurement uncertainty in X-ray spectroscopy," X-Ray Spectrom., pp. 1-14 (2020).
Renaud et al., "Probing surface and interface morphology with Grazing Incidence Small Angle X-ray Scattering," Surface Science Reports, vol. 64:8 (2009), pp. 255-380.
Rix et al., "Super-Resolution X-ray phase-contrast and dark-field imaging with a single 2D grating and electromagnetic source stepping," Phys. Med. Biol. In press https://doi.org/10.1088/1361-6560/ab2ff5 (2019).
Rutishauser, "X-ray grating interferometry for imaging and metrology," 2003, Eth Zurich, Diss. ETH No. 20939.
Sato et al., Two-dimensional gratings-based phase-contrast imaging using a conventional x-ray tube, 2011, Optics Letters, vol. 36, No. 18, pp. 3551-3553.
Scherer et al., "Bi-Directional X-Ray Phase-Contrast Mammography," PLoS ONE, vol. 9, Issue 5 (May 2014) e93502.
Scholze et al., "X-ray Detectors and XRF Detection Channels," Ch. 4 of "Handbook of Practical X-Ray Fluorescence Analysis," B. Beckhoff et al., eds. (Springer, Berlin Heidelberg, Germany, 2006), pp. 85-198.
Schunck et al., "Soft x-ray imaging spectroscopy with micrometer resolution," Optica vol. 8, No. 2, pp. 156-160 (2021).
Seddon-Ferretti et al., "HERMES—a GUI-based software tool for pre-processing of X-ray absorption spectroscopy data from laboratory Rowland circle spectrometers," J. Synch. Rad., vol. 29, https://doi.org/10.1107/S1600577521012583, pp. 1-4 (2022).
Sefi et al., "25-Fold Resolution Enhancement of X-ray Microscopy Using Multipixel Ghost Imaging," arXiv:2402.14023 (2024).
Seifert et al., "Talbot-Lau x-ray phase-contrast setup for fast scanning of large samples," Sci. Rep. 9:4199, pp. 1-11 (2019).
Shi et al., "Laboratory X-ray interferometry imaging with a fan-shaped source grating," Optics Lett., doi.org/10.1364/OL.426867 (2021).
Shimamura et al., "Soft X-ray nanobeams formed by aberration-reduced elliptical mirrors with large numerical aperture," Opt. Express, vol. 31, No. 23, 38132 (2023).
Shimura et al., "Hard x-ray phase contrast imaging using a tabletop Talbot-Lau interferometer with multiline embedded x-ray targets", Opt. Lett. vol. 38(2) (2013), pp. 157-159.
Simionovici et al., "X-ray focusing methods for X-ray absorption spectroscopy," Int'l Tables Crystallog. vol. I, https://doi.org/10.1107/S1574870721006844 (2022).
Six et al., "Joint multi-contrast CT for edge illumination X-ray phase contrast imaging using split Barzilai-Borwein steps," Op. Express, vol. 32, No. 2, pp. 1135-1150 (2024).
Soltau et al., "Coherent Diffractive Imaging with Diffractive Optics," Phys. Rev. Lett. 128, 223901 (2022).
Sparks Jr., "X-ray Fluorescence Microprobe for Chemical Analysis," in Synchrotron Radiation Research, H. Winick & S. Doniach, eds. (Plenum Press, New York, NY 1980), pp. 459-512.
Stampanoni et al., "The First Analysis and Clinical Evaluation of Native Breast Tissue Using Differential Phase-Contrast Mammography," Investigative Radiology, vol. 46, pp. 801-806. pub 2011-12-xx.

(56) References Cited

OTHER PUBLICATIONS

Storm et al., "Optimizing the energy bandwidth for transmission full-field X-ray microscopy experiments," J. Synch. Rad., vol. 29, https://doi.org/10.1107/S1600577521011206, pp. 1-10 (2022).
Streli et al., "Micro-X-ray fluorescence spectroscopy," Chapter I.9.f of "Imaging Modalities for Biological and Preclinical Research: A compendium, vol. 1, Part I: Ex vivo biological imaging," Ed. Walter et al., 8 pages, doi:10.1088/978-0-7503-3059-6ch42 (2021).
Su et al., "Quantitative Dual-Energy X-ray Imaging Based on K-Edge Absorption Difference," J. Phys. Chem. Lett. Vol. 14, pp. 10074-10079 (2023).
Sunday et al., "X-ray Metrology for the Semiconductor Industry Tutorial," J. Res. Nat'l Inst. Stan. vol. 124: 124003 (2019); https://doi.org/10.6028/jres.124.003.
Takeda et al., "X-Ray Phase Imaging with Single Phase Grating", Jpn. J. Appl. Phys. vol. 46 (2007), pp. L89-L91.
Takeda et al., "Differential Phase X-ray Imaging Microscopy with X-ray Talbot Interferometer" Appl. Phys. Express vol. 1 (2008) 117002.
Talbot, "Facts relating to optical science No. IV," Philos. Mag. vol. 9 (1836), pp. 401-407.
Tanaka et al., "Cadaveric and in vivo human joint imaging based on differential phase contrast by X-ray Talbot-Lau interferometry", Z. Med. Phys. vol. 23 (2013), pp. 222-227.
Tanaka et al., "Propagation-based phase-contrast imaging method for full-field X-ray microscopy using advanced Kirkpatrick-Baez mirrors," Op. Express vol. 31, No. 16, pp. 26135-26144 (2023).
Tang et al., "Detailed analysis of the interference patterns measured in lab-based X-ray dual-phase grating interferometry through wave propagation simulation," Opt. Ex. vol. 31, No. 2, pp. 1677-1691 (2023).
Tao et al., "Moire artifacts reduction in Talbot-Lau X-ray phase contrast imaging using a three-step iterative approach," Opt. Ex. Vol. 30, No. 20, pp. 35096-35111 (2022).
Tao et al., "Factors Affecting the Spatial Resolution in 2D Grating-Based X-Ray Phase Contrast Imaging," Frontiers in Physics, doi:10.3389/fphy.2021.672207 (2021).
Taphorn et al., "Grating-based spectral X-ray dark-field imaging for correlation with structural size measures," Sci. Reports, vol. 10, 13195 (2020).
Tebina et al., "X-Ray Fault Injection: Reviewing Defensive Approaches from a Security Perspective," 2022 IEEE Int'l Symp. Defect and Fault Tolerances in VLSI and Nanotechnology Systems (DFT), doi: 10.1109/DFT56152.2022.9962362 (2022).
Terzano et al., Recent advances in analysis of trace elements in environmental samples by X-ray based techniques (IUPAC Technical Report), Pure Appl. Chem. 2019.
Tessarini et al., "Semi-classical Monte Carlo algorithm for the simulation of X-ray grating interferometry," Sci. Rep. Vol. 12, p. 2485 (2022).
Tetef et al., "Unsupervised Machine Learning for Unbiased Chemical Classification in X-ray Absorption Spectroscopy and X-ray Emission Spectroscopy," Royal Soc. of Chem. Doi: 10.33774/chemrxiv-2021-5tvrv (2021).
Titus et al., "Advancing the in-situ characterization of light elements via X-ray absorption spectroscopy using superconducting detectors," Microsc. Microanal., vol. 27, (Suppl. 1), pp. 2890 (2021).
Tkachuk et al., "High-resolution x-ray tomography using laboratory sources", in Developments in X-Ray Tomography V, Proc. SPIE 6318 (2006): 631810.
Tkachuk et al., "Multi-length scale x-ray tomography using laboratory and synchrotron sources", Microsc. Microanal. vol. 13 (Suppl. 2) (2007), pp. 1570-1571.
Töpperwien et al., "Multiscale x-ray phase-contrast tomography in a mouse model of transient focal cerebral ischemia," Biomed. Op. Express, vol. 10, No. 1, Jan. 2019, pp. 92-103.
Tsuji et al., "X-Ray Spectrometry: Recent Technological Advances," John Wiley & Sons Ltd. Chichester, West Sussex, UK 2004), Chapters 1-7.
Udagawa, "An Introduction to In-House EXAFS Facilities," The Rigaku Journal, vol. 6, (1) (1989), pp. 20-27.
Udagawa, "An Introduction to X-ray Absorption Fine Structure," The Rigaku Journal, vol. 11(2)(1994), pp. 30-39.
Uehara et al., "Effectiveness of X-ray grating interferometry for non-destructive inspection of packaged devices", J. Appl. Phys. vol. 114 (2013), 134901.
Viermetz et al., "High resolution laboratory grating-based X-ray phase-contrast CT," Scientific Reports 8:15884 (2018).
Vila-Comamala et al., "High sensitivity X-ray phase contrast imaging by laboratory grating-based interferometry at high Talbot order geometry," Op. Express vol. 29, No. 2, pp. 2049-2064 (2021).
Villarraga-Gómez et al., "Assessing Electronic Devices with Advanced 3D X-ray Imaging and Electron Microscopy" (2023).
Vogt, "X-ray Fluorescence Microscopy: A Tool for Biology, Life Science and Nanomedicine," Presentation on May 16, 2012 at James Madison Univ., Harrisonburg, VA (31 slides), 2012.
Wan et al., "Fabrication of Multiple Slit Using Stacked-Sliced Method for Hard X-ray Talbot-Lau Interferometer", Jpn. J. Appl. Phys. vol. 47 (2008), pp. 7412-7414.
Wang et al., "Advantages of intermediate X-ray energies in Zernike phase contrast X-ray microscopy," Biotech. Adv., vol. 31 (2013) pp. 387-392.
Watts et al., "The development of laboratory-based high energy sources for XPS," Surf. Interface Anal., pp. 1-17, doi:10.1002/sia.7300 (2023).
Weitkamp et al., "Hard X-ray phase imaging and tomography with a grating interferometer," Proc. SPIE vol. 5535, (2004), pp. 137-142.
Weitkamp et al., "X-ray phase imaging with a grating interferometer," Opt. Express vol. 13(16), (2005), pp. 6296-6304.
Weitkamp et al., "X-ray wavefront analysis and optics characterization with a grating interferometer," Appl. Phys. Lett. vol. 86, (2005), 054101.
Weitkamp et al., Tomography with grating interferometers at low-brilliance sources, 2006, SPIE, vol. 6318, pp. 0S-1 to 0S-10.
Weitkamp et al., "X-ray wavefront diagnostics with Talbot interferometers," International Workshop on X-Ray Diagnostics and Scientific Application of the European XFEL, Ryn, Poland, (2010), 36 slides.
Weitkamp et al., "Design aspects of X-ray grating interferometry," in International Workshop on X-ray and Neutron Phase Imaging with Gratings AIP Conf. Proc. vol. 1466, (2012), pp. 84-89.
Wen et al., "Fourier X-ray Scattering Radiography Yields Bone Structural Information," Radiology, vol. 251 (2009) pp. 910-918.
Wen et al., "Single-shot x-ray differential phase-contrast and diffraction imaging using two-dimensional transmission gratings," Op. Lett. vol. 35, No. 12, (2010) pp. 1932-1934.
Wirtensohn et al., "The Dark Side of Transmission X-Ray Microscopy," arXiv:2403.18884v1 [physics.optics[ Mar. 27, 2024.
Wilde et al., "Modeling of an X-ray grating-based imaging interferometer using ray tracing," Op. Express vol. 28, No. 17, p. 24657 (2020).
Wilde et al., "Statistical optics modeling of dark-field scattering in X-ray grating interferometers: Part 1. Theory," Op. Express vol. 29, No. 25, p. 40891 (2021).
Wilde et al., "Statistical optics modeling of dark-field scattering in X-ray grating interferometers: Part 2. Simulation," Op. Express vol. 29, No. 25, p. 40917 (2021).
Withers et al., "X-ray computed tomography," Nature Reviews | Methods Primers, vol. 1, No. 18, pp. 1-21 (2021).
Witte et al., "From 2D STXM to 3D Imaging: Soft X-ray Laminography of Thin Specimens," Nano Lett. vol. 20, pp. 1305-1314 (2020).
Wittry et al., "Properties of fixed-position Bragg diffractors for parallel detection of x-ray spectra," Rev. Sci. Instr. vol. 64, pp. 2195-2200 (1993).
Wobrauschek et al., "Micro XRF of light elements using a polycapillary lens and an ultra-thin window Silicon Drift Detector inside a vacuum chamber," 2005, International Centre for Diffraction Data 2005, Advances in X-ray Analysis, vol. 48, pp. 229-235.
Wobrauschek et al., "Energy Dispersive, X-Ray Fluorescence Analysis," Encyclopedia of Analytical Chemistry, R.A. Meyers, Ed. (Wiley 2010).

(56) References Cited

OTHER PUBLICATIONS

Woicik et al., "Soft X-ray absorption spectra," Int. Tables Crystallogr. vol. 1, https://doi.org.10.1107/51574870720008484 (2023).
Xiao et al., "TXM-Sandbox: an open-source software for transmission X-ray microscopy data analysis," J. Synch. Rad., vol. 29, https://doi.org/10.1107/S1600577521011978, p. 1-10 (2022).
Xu et al., "Synchrotron radiation computed laminography for polymer composite failure studies," J. Synch. Rad., vol. 17, pp. 222-226 (2010).
Xu et al., "Comparison of image quality in computed laminography and tomography," Op. Express, vol. 20, No. 2, pp. 794-806 (2012).
Yamada et al., "Compact full-field hard x-ray microscope based on advanced Kirkpatrick-Baez mirrors," Optica, vol. 7, No. 4 pp. 367-370 (2020).
Yashiro et al., "Optimal Design of Transmission Grating for X-ray Talbot Interferometer", Advances in X-ray Analysis vol. 49(3) (2006), pp. 375-379.
Yashiro et al., "Efficiency of capturing a phase image using cone-beam x-ray Talbot interferometry", J. Opt. Soc. Am. A vol. 25 (2008), pp. 2025-2039.
Yashiro et. al., "Hard-X-Ray Phase-Difference Microscopy Using a Fresnel Zone Plate and a Transmission Grating", Phys. Rev. Lett. vol. 103 (2009), 180801.
Yashiro et al., "Hard x-ray phase-imaging microscopy using the self-imaging phenomenon of a transmission grating", Phys. Rev. A vol. 82 (2010), 043822.
Yashiro et al., "On the origin of visibility contrast in x-ray Talbot interferometry", Opt. Express (2010), pp. 16890-16901.
Yashiro et al., "X-ray Phase Imaging Microscopy using a Fresnel Zone Plate and a Transmission Grating", in The 10th International Conference on Synchrotron Radiation Instrumentation, AIP Conf. Proc. vol. 1234 (2010), pp. 473-476.
Yashiro et al., "Distribution of unresolvable anisotropic microstructures revealed in visibility-contrast images using x-ray Talbot interferometry", Phys. Rev. B vol. 84 (2011), 094106.
Yashiro et al., "X-ray Phase Imaging and Tomography Using a Fresnel Zone Plate and a Transmission Grating", in "The 10th International Conference on X-ray Microscopy Radiation Instrumentation", AIP Conf. Proc. vol. 1365 (2011) pp. 317-320.
Yashiro et al., "Theoretical Aspect of X-ray Phase Microscopy with Transmission Gratings" in International Workshop on X-ray and Neutron Phase Imaging with Gratings, AIP Conf. Proc. vol. 1466, (2012), pp. 144-149.
Yoshioka et al., "Imaging evaluation of the cartilage in rheumatoid arthritis patients with an x-ray phase imaging apparatus based on Talbot-Lau interferometry," Scientific Reports, 10:6561, https://doi.org/10.1038/s41598-020-63155-9 (2020).
Yuan at al., "Micro X-ray fluorescence device based on monocapillary ellipsoidal lens for thin film thickness measurements," Nucl. Inst. Meth. Phys. Res. A, vol. 1058, p. 168923 (2024).
Zan et al., "High-resolution multicontrast tomography with an X-ray microarray anode-structured target source," PNAS, doi.org10.1073/pnas.2103126118 (2021).
Zanette et al., "Two-Dimensional X-Ray Grating interferometer," Phys. Rev. Lett. vol. 105 (2010) pp. 248102-1 248102-4.
Zeeshan et al., "In-house setup for laboratory-based x-ray absorption fine structure spectroscopy measurements," Rev. Sci. Inst. 90, 073105 (2019).
Zeng et al., "Glass Monocapillary X-ray Optics and Their Applications in X-Ray Microscopy," X-ray Optics and Microanalysis: Proceedings of the 20th International Congress, AIP Conf. Proc. vol. 1221, (2010), pp. 41-47.
Zhan et al., "A Lightweight Method for Detecting IC Wire Bonding Defects in X-ray Images," Micromachines, vol. 14, p. 1119, https://doi.org/10.3390/mi14061119 (2023).
Zhang et al., "Application of confocal X-ray fluorescence based on capillary X-ray optics in nondestructively measuring the inner diameter of monocapillary optics," Optics Comm. (2018) https://doi.org/10.1016/j.optcom.2018.11.064.
Zhang et al., "Measurement of the inner diameter of monocapillary with confocal X-ray scattering technology based on capillary X-ray optics," Appl. Opt. (Jan. 8, 2019), doc ID 351489, pp. 1-10.
Zhang et al., "Laboratory-scale X-ray absorption spectrometer with a cylindrical Johansson crystal analyzer," Nuclear Inst. And Methods in Physics Research, A (2023), doi: https://doi.org/10.1016/j.nima.2023.168067 (2023).
Zhang et al., "Hard X-ray projection imaging below 5 nm resolution," https://doi.org/10.21203/rs.3.rs-4093473/v1 (2024).
Zhao et al., "X-ray wavefront sensing and optics metrology using a microfocus x-ray grating interferometer with electromagnetic phase stepping," Appl. Phys. Lett. 120, 181105 (2022).
Zhao et al., "Applications of the non-negative least-squares deconvolution method to analyze energy-dispersive x-ray fluorescence spectra," Appl. Op., Vo 62, No. 20, pp. 5556-5564 (2023).
Zhou et al., "X-ray wavefront characterization with grating interferometry using an x-ray microfocus laboratory source," Proceedings, vol. 11492, Advances in Metrology for X-Ray and EUV Optics IX; 114920Q, https://doi.org/10.1117/12.2576152 (2020).
Zhu et al., "Optical Wafer Defect Inspection at the 10 nm Technology Node and Beyond," 2022 Int. Extrem. Manuf. In press https://doi.org/10.1088/2631-7990/ac64d7 (2022).
Abramson et al., "hklhop: a Selection Tool for Asymmetric Reflections of Spherically Bent Crystal Analysers for High Resolution X-ray Spectroscopy," arXiv:2409.10698 (2024).
Celio et al., "Laboratory X-Ray-Assisted Device Alteration for Fault Isolation and Post-Silicon Debug," 2024 IEEE Int'l Reliability Physics Symp. (IRPS), doi: 10.1109/IRPS48228.2024.10529312 (2024).
Chen et al., "A Ray Tracing Survey of Asymmetric Operation of the X-ray Rowland Circle Using Spherically Bent Crystal Analyzers," arXiv:2409.13119v1 (2024).
Dreier et al., "Improved resolution in advanced packaging metrology through advanced nano-focus X-ray sources," 2024 25th Int'l Conf. Elect. Packaging Tech. (ICEPT), doi: 10.1109/ICEPT63120.2024.10668783 (2024).
Fahmi et al., "Biological applications of X-ray fluorescence microscopy: exploring the subcellular topography and speciation of transition metals," Current Opinion in Chem. Bio. vol. 11, pp. 121-127 (2007).
Flenner et al., "Dual-beam X-ray nano-holotomography," J. Synch. Rad., https://doi.org/10.1107/51600577524003801 (2024).
Gobo et al., "Grating-based spatial harmonic frequency X-ray imaging for quantitative characterization of structures with sub-detector spatial resolution," Measurement, doi:10.1016/j.measurement.2024.115601 (2024).
Inoue et al., "Monolithic deformable mirror based on lithium niobate single crystal for high-resolution X-ray adaptive microscopy," Optica, vol. 11, No. 5, pp. 621-625 (2024).
Ma et al., "Exploration and Research of High Contrast and High Resolution Two-dimensional X-Ray Grids," Sixth Conf. Frontiers in Op. Imaging and Tech., Proc. SPIE vol. 13153, doi: 10.1117/12.3014459 (2024).
Mäkinen et al., "Optimization of contrast and dose in X-ray phase-contrast tomography with a Talbot-Lau interferometer," Biomed. Phys. Eng. Express, doi: 10.1088.2057-1976/ad5206 (2024).
Masteghin et al., "Benchmarking of X-Ray Fluorescence Microscopy with Ion Beam Implanted Samples Showing Detection Sensitivity of Hundreds of Atoms," Small Methods, doi: 10.1002/smtd.202301610 (2024).
Matveevskii et al., "Laboratory-based 3D X-ray standing-wave analysis of nanometre-scale gratings," J. Appl. Crystallography, vol. 57, doi.org/10.1107/S1600576724007179 (2024).
McRae et al., "In Situ Imaging of Metals in Cells and Tissues," Chem Rev. vol. 109, doi:10.1021/cr900223a (2009).
Morvay, "Chemical composition depth profiling of thin films using x-ray reflectometry and fluorescence," Ph.D. thesis, Masaryk University, Brno, Czech Republic (2024).
Pieper et al., "Total-Ionizing Dose Damage from X-Ray PCB Inspection Systems," 2024 IEEE Int'l Reliability Physics Symp. (IRPS), doi: 10.1109/IRPS48288.2024.10529337 (2024).

(56) References Cited

OTHER PUBLICATIONS

Shafkat et al., "Assessing Compatiblility of Advanced IC Packages to X-Ray Based Physical Inspection," Elec. Device Failure Analysis, vol. 26, No. 3, pp. 14-24 (2024).
Villarraga-Gómez et al., "Assessing Electronics with Advanced 3D X-ray Imaging Techniques, Nanoscale Tomography, and Deep Learning," J. Fail. Anal. And Preven., https://doi.org/10.1007/s11668-024-01989-5 (2024).
Watanabe et al., "X-ray fluorescence micro-tomography and laminography using an x-ray scanning microscope," J. Phys: Conf. Series 186, 012022 (2009).
Wirtensohn et al., "Nanoscale dark-field imaging in full-field transmission X-ray microscopy," Optica vol. 11, No. 6, doi.org/10.1364/optica.524812 (2024).
Yuan et al., "Performance characterization of an $Al_2O_3/HfO_2$ parabolic multilayer based on a laboratory X-ray source," Appl. Op. vol. 63, No. 22 https://doi.org/10.1364/AO.531983 (2024).
Zhang et al., "Fast and efficient hard X-ray projection imaging below 10 nm resolution," Op. Express, vol. 32, No. 17, pp. 30879-30897 (2024).

\* cited by examiner

US 12,209,977 B2

X-RAY DETECTOR SYSTEM WITH AT LEAST TWO STACKED FLAT BRAGG DIFFRACTORS

CLAIM OF PRIORITY

This application claims the benefit of priority to U.S. Provisional Appl. No. 63/485,327 filed Feb. 16, 2023, which is incorporated in its entirety by reference herein.

BACKGROUND

Field

This application relates generally to x-ray analysis and/or spectroscopy systems.

Description of the Related Art

Parallel beam wavelength dispersive spectrometers (PBWDS) diffract narrow spectral (e.g., energy) bands of x-rays of differing energies in different directions, according to Bragg's law, by impinging a single flat Bragg x-ray diffractor (e.g., single crystal; mosaic crystal) with a parallel (e.g., collimated) x-ray beam and measuring a selected portion of the diffracted x-rays using an x-ray detector. PBWDSs can be used to measure a specific x-ray energy (e.g., a characteristic fluorescence x-ray line of an atomic element or an energy point in x-ray absorption spectroscopy) or for measuring x-ray spectra over an energy range by varying the Bragg angle between the x-rays and the crystallographic planes of the x-ray diffractor. PBWDSs can offer higher spectral resolution than do energy dispersive detectors (e.g., silicon drift detectors, lithium drifted silicon detectors, lithium drifted germanium detectors, photon counting detectors) and can be used in many x-ray spectroscopy techniques, including but not limited to: elemental (e.g., composition) analysis of a sample by measuring the x-ray fluorescence (XRF) spectrum (e.g., characteristic x-ray lines) emitted from a sample resulting from excitation by ionizing radiation (e.g., energetic electrons, x-rays, protons); x-ray absorption spectroscopy (XAS) by either analyzing x-ray absorption spectra of x-rays transmitted through a sample (e.g., transmission mode XAS) or irradiating a sample with a tunable monochromatic x-ray beam having an x-ray energy range while measuring intensities of characteristic fluorescence x-rays of an element in the sample (e.g., fluorescence mode XAS); or x-ray emission spectroscopy (XES) by measuring x-ray emission spectra of an element inside an object excited by ionizing radiation, e.g., x-rays, electrons, or protons.

SUMMARY

In certain implementations, an apparatus comprises a plurality of stacked flat Bragg diffractors comprising at least a first flat Bragg diffractor and a second flat Bragg diffractor. The first and second flat Bragg diffractors are positioned sequentially along an x-ray propagation axis of an x-ray beam. The x-ray beam comprises x-rays and has an angular beam divergence less than 30 mrad in at least one direction.

In certain implementations, an apparatus is configured to receive an x-ray beam propagating along an x-ray propagation axis with an angular beam divergence less than 30 mrad in at least one direction substantially perpendicular to the x-ray propagation axis. The apparatus comprises a plurality of sequentially stacked flat Bragg diffractors that are rigidly connected to one another with a separation between adjacent flat Bragg diffractors less than 200 millimeters. The plurality of sequentially stacked flat Bragg diffractors are configured to receive the x-ray beam. Each flat Bragg diffractor of the plurality of sequentially stacked flat Bragg diffractors is configured to diffract a corresponding diffracted portion of the x-ray beam with a spectral overlap between the diffracted portions from different flat Bragg diffractors less than 25%. The apparatus further comprises at least one x-ray detector configured to receive and detect the diffracted portions.

In certain implementations, an apparatus comprises at least one flat Bragg x-ray diffractor configured to receive an x-ray beam and to diffract at least one corresponding diffracted portion of the x-ray beam. The apparatus further comprises at least one energy dispersive x-ray detector configured to receive and detect a transmitted portion of the x-ray beam that is transmitted through the at least one flat Bragg x-ray diffractor.

DETAILED DESCRIPTION

Figure 1A:
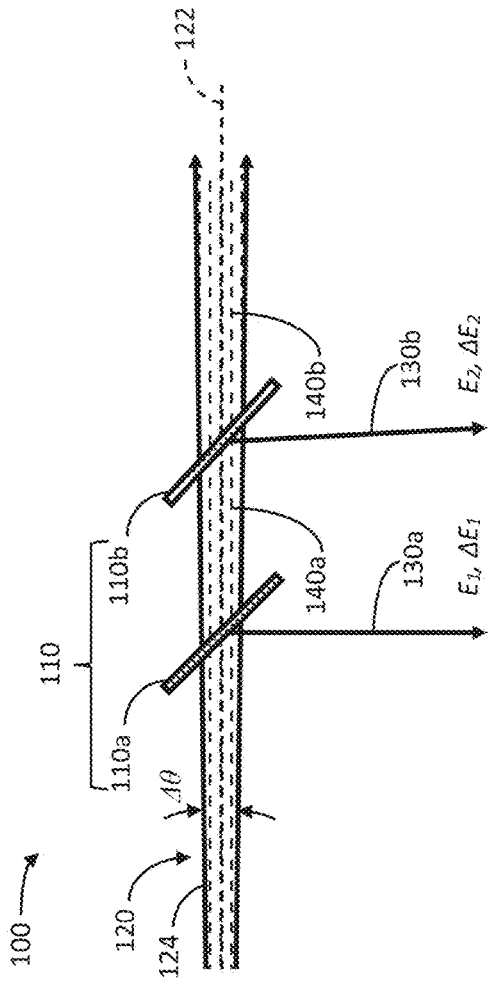
FIGS. 1A and 1B schematically illustrate two examples of an apparatus comprising a plurality of stacked flat Bragg diffractors in accordance with certain implementations described herein.

X-ray wavelength dispersive spectrometers utilize a flat Bragg diffractor that is impinged by a collimated x-ray beam (e.g., the x-rays propagating substantially parallel to one another along an x-ray propagation axis). For example, the flat Bragg diffractors of x-ray wavelength dispersive spectrometers can include single crystals (e.g., for x-ray energies greater than about 1.47 keV: diamond, quartz, Si, Ge, LiF; for x-ray energies less than about 1.47 keV: InSb, PET, ADP, RAP, beryl, TIAP), mosaic crystals (e.g., highly annealed pyrolitic graphite (HAPG); highly oriented pyrolitic graphite (HOPG)), or multilayers.

The x-ray energy E and the total energy resolution $\Delta E$ (e.g., energy bandwidth) of the x-rays diffracted by the flat Bragg diffractor can be expressed as:

$$2 \cdot d \cdot \sin(\theta) = n \cdot \lambda \quad (1)$$

$$\Delta E = \{\Delta E_c^2 + [E \cdot \cot(\theta) \cdot \Delta \theta]^2\}^{1/2} \quad (2)$$

where $\theta$ is the Bragg angle, d is the spacing of the crystallographic planes of the flat Bragg diffractor, $\lambda$ is the x-ray wavelength corresponding to the x-ray energy E, n is an integer, $\Delta\theta$ is the angular beam divergence (e.g., angular spread) of the x-ray beam in the tangential plane or diffraction plane (e.g., defined by the x-ray propagation axis of the x-ray beam and the normal direction to the crystallographic planes of the flat Bragg diffractor), and $\Delta E_c$ is the intrinsic energy resolution of the flat Bragg diffractor (e.g., the value of the total energy resolution $\Delta E$ for a highly collimated incident x-ray beam having an angular beam divergence $\Delta\theta$ smaller than or equal to the Darwin width of the flat Bragg diffractor, such as with synchrotron x-ray sources). In certain implementations, the angular beam divergence $\Delta\theta$ in a direction substantially perpendicular to the diffraction plane can be much larger than the angular beam divergence $\Delta\theta$ substantially in the diffraction plane with minimal increase in the total energy resolution $\Delta\theta$.

The angular contribution term in Exp. (2):

$$[E \cdot \cot(\theta) \cdot \Delta\theta] = \Delta E_a \qquad (3)$$

represents the contribution to the total energy resolution $\Delta E$ due to the angular beam divergence $\Delta\theta$ of the x-ray beam at the Bragg angle $\theta$. For many applications (e.g., XRF, XAS, and XES), a specific value of the total energy resolution $\Delta E$ is desired.

The flat Bragg diffractor diffracts x-rays incident on the flat Bragg diffractor at a point along an x-ray propagation axis within a narrow spectral bandwidth $\Delta E_c$, while x-rays of energies outside the narrow spectral bandwidth $\Delta E_c$ propagating along the same x-ray propagation axis and incident at the same point on the flat Bragg diffractor are not diffracted, so having $\Delta E_c$ smaller than $\Delta E$ leads to inefficient use of the x-rays of the incident x-ray beam.

Previously disclosed PBWDSs exhibit various limitations. For example, previously disclosed PBWDSs perform a single x-ray energy measurement at a time with only x-rays within the energy band $\Delta E$ recorded by the x-ray detector. To measure x-rays within different energy bands, the Bragg angle of the flat Bragg diffractor is changed (e.g., measuring two or more characteristic lines for composition analysis using XRF or measuring XAS and XES spectra).

Another example limitation of previously disclosed PBWDSs is inefficiency in performing multiple spectral measurements. For a collimated x-ray beam propagating along an x-ray propagation axis and incident on a point on a flat Bragg diffractor within a narrow angular beam divergence $\Delta\theta$ (e.g., angular spread equal to or less than the Darwin width of the flat Bragg diffractor in the diffraction plane), only the x-rays with energies within the spectral band $\Delta E_c$ are diffracted, while x-rays with energies outside $\Delta E_c$ are not diffracted (e.g., absorbed by the crystal), so these x-rays are not analyzed and are wasted, resulting in low analysis efficiency. As an example, the intrinsic spectral band diffracted by a flat Si(531) crystal operating at a Bragg angle of 57.7 degrees for the Cu $K_{\alpha 1}$ x-ray line (e.g., about 8 keV) is only 0.06 eV, which is about 35× smaller than the natural radiative Cu $K_{\alpha 1}$ linewidth (e.g., about 2.1 eV) and is substantially narrower than the energy resolution (e.g., band) used for most XAS measurements (e.g., x-ray energies for measuring XAS far above the absorption edge ionization energy, which can be up to 6 eV). As another example, while mosaic crystals can diffract a wider spectral band of x-rays than do single crystals, the spectral band can be wider than what is utilized for the analysis (e.g., when used with incident x-ray beams with large beam divergences in the diffraction plane), resulting in wasted x-rays and low analysis efficiency. In addition, mosaic crystals can cause additional angular spread of the transmitted x-rays due to x-ray scattering by small crystal platelets inside the mosaic crystals, which can worsen the energy resolution for a downstream crystal due to increased x-ray beam divergence.

The energy band $\Delta E$ of the x-rays diffracted from a point on a flat Bragg diffractor is given by Exp. (2) and can be larger than $\Delta E_c$ if the angular beam divergence $\Delta\theta$ of the x-ray beam is larger the Darwin width of the flat Bragg diffractor. Except for higher order harmonics (e.g., x-ray enegies of integer multiples of the x-ray energy for a given Bragg angle $\theta$), a single flat Bragg diffractor (e.g., multilayer diffractor, single crystal, mosaic crystal) cannot be used to simultaneously (e.g., concurrently) measure x-rays of two or more x-ray energies with arbitrary large energy differences (e.g., multiple characteristic lines of an atomic element, such as Cu $K_{\alpha 1}$ and Cu $K_{\alpha 2}$ x-ray lines or $K_\alpha$ and $K_\beta$ x-ray lines; multiple characteristic x-ray lines of multiple atomic elements with energy differences greater than 50 eV, greater than 200 eV, greater than 1000 eV, or greater than 5000 eV; multiple energy points).

Another example limitation of previously disclosed PBWDSs is difficulty in balancing between $\Delta E_c$ and $\Delta E'$ to optimize throughput. For higher throughput (e.g., faster data collection speed), $\Delta E_c$ can be comparable to or larger than (e.g., greater than or equal to) $\Delta E_a$ with a larger angular beam divergence $\Delta\theta$, which is often related to the x-ray collection angle (e.g., from a sample for XRF analysis; from a source for XAS analysis). To achieve reasonable energy resolution with a large angular beam divergence $\Delta\theta$, the flat Bragg diffractor can operate at high Bragg angles but with $\Delta E_c$ significantly more narrow than the energy resolution $\Delta E$ for measurements (e.g., XRF, XAS, and XES). The angular contribution $\Delta E_a$ to the energy resolution $\Delta E$ (see Exp. (3)) constrains the minimum Bragg angle to satisfy a given energy resolution $\Delta E$ (see Exp. (2)) for a given angular beam divergence $\Delta\theta$.

For example, for $\Delta E_a=2$ eV with $\Delta\theta=1$ mrad, a Bragg angle $\theta$ greater than 78.7 degrees can be used for an x-ray energy E=10 keV. The same minimum Bragg angle can be used for $\Delta E_a=20$ eV with $\Delta\theta=10$ mrad and E=10 keV. With such high Bragg angles for many applications, $\Delta E_c$ of a single flat Bragg diffractor is much narrower than the energy resolution used for many XRF applications, resulting in low analysis efficiency, especially when using crystals operating at high Bragg angles (e.g., for large angular beam divergence $\Delta\theta$ of the x-ray beam). As an example, for a Bragg angle $\theta=70$ degrees and x-ray energy E=8.5 keV, the $\Delta E_c$ of Ge(551), Si(551), and LiF(333) crystal planes are 0.08 eV, 0.03 eV, and 0.03 eV, respectively. These values are significantly narrower than the natural linewidth of characteristic x-ray lines in the 8 keV-10 keV energy range (e.g., linewidth of 2.1 eV for the Cu $K_{\alpha 1}$ x-ray line at 8 keV; linewidth of 2.2 eV for the Zn $K_{\alpha 1}$ x-ray line at 9.2 keV; linewidth of 6 eV for the W $L_{\alpha 1}$ x-ray line at 8.4 keV). Therefore, these crystals are highly inefficient for measuring these characteristic x-rays when operating at high Bragg angles. The inefficiency becomes more severe for measuring higher energy x-rays because $\Delta E_c$ decreases with x-ray energy for most single crystals operating at high Bragg angles while the natural linewidth of characteristic x-ray lines increases with x-ray energy. For example, $\Delta E_a$ of Li(1022) crystal planes at a Bragg angle $\theta=66.5$ degrees for E=17.4 keV x-rays is 0.01 eV, while the natural linewidth of the Mo $K_{\alpha 1}$ x-ray line at 17.4 keV is about 6.5 eV (e.g., a ratio between the two is about 650×). Even at moderate Bragg angles (e.g., $\theta=30$ degrees) for E=8.5 keV x-rays, $\Delta E_c$ of Ge(331), Si(331), and LiF(220) crystal planes are 0.31 eV, 0.13 eV, and 0.23 eV, respectively. These values are also much narrower than the energy resolution used for most XRF and XAS measurements and these crystals are therefore inefficient for measuring characteristic x-ray lines at x-ray energies around 8.5 keV or for XAS measurements with x-ray energies around 8.5 keV. To get the energy resolution $\Delta E_c$ to approach 2 eV for E=8.5 keV x-rays, Bragg angles θ that are less than 23 degrees can be used for single Ge crystal flat Bragg diffractors and less than 14 degrees for single crystal Si, LiF, or diamond flat Bragg diffractors.

The x-ray flux of a parallel x-ray beam generally increases with the angular beam divergence 30, so operating at small Bragg angles is generally not desirable in order to achieve small angular contributions to the energy resolution (e.g., $\Delta E_a < \Delta E$) since the small Bragg angles reduce the x-ray flux (e.g., characteristic x-rays) from a sample. Furthermore, the angular contribution to the energy resolution is generally significantly smaller than the energy separations between characteristic K x-ray lines of most atomic elements (e.g., about 20 eV between the Cu $K_{\alpha 1}$ and Cu $K_{\alpha 2}$ x-ray lines) and the energy separations between the L x-ray lines of many atomic elements. However, using flat Bragg diffractors at low Bragg angles (e.g., less than 20 degrees) can provide better match with the energy bandwidth of characteristic x-ray lines of many atomic elements, with x-ray beams having much smaller angular beam divergence $\Delta\theta$, resulting in efficient collection of characteristic x-ray lines from a sample. The energy resolution $\Delta E_c$ of many single crystal flat Bragg diffractors is also much narrower than the energy resolution (e.g., bandwidth) used for most XAS measurements, especially for x-ray energies for measuring EXAFS far above the absorption edge ionization energy, for which energy resolution up to 6 eV can be used. However, the spectral resolution of mosaic crystals (e.g., HOPG; HAPG) can be too wide for the various (e.g., XANES; XES) analyses.

Another example limitation of previously disclosed PBWDSs is that only narrow spectral (e.g., energy) bands of x-rays are diffracted by a single flat Bragg diffractor. To measure a wide spectral range (e.g., concurrently measuring a Cu Lα x-ray line with a Cu $K_\alpha$ x-ray line; concurrently measuring a C $K_\alpha$ x-ray line with a Cu $K_{\alpha 1}$ x-ray line), different flat Bragg diffractors could be used sequentially in time (e.g., measuring with a first flat Bragg diffractor, then switching to a second flat Bragg diffractor and measuring with the second flat Bragg diffractor, etc.) to cover the wide spectral range. For example, crystal diffractors can be used for hard (e.g., energies greater than 5 keV) x-rays or multilayers can be used for soft (e.g., energies less than 1 keV) x-rays. Certain implementations described herein use a plurality of stacked flat Bragg diffractors (e.g., crystal diffractors) to obtain a predetermined total energy resolution while operating at moderate (e.g., 30 to 45 degrees) and high (e.g., greater than 60 degrees) Bragg angles. Certain implementations described herein utilize flat Bragg diffractors with values of the intrinsic energy resolution $\Delta E_c$ that approach (e.g., are substantially equal to) the total energy resolution $\Delta E$ to obtain efficient use of the incident x-rays having x-ray energies within the energy bandwidth $\Delta E$. For small differences between $\Delta E_c$ and $\Delta E$ (e.g., which can be considered a measure of efficiency of a flat Bragg diffractor), the angular contribution $\Delta E_a$ (see Exp. (3)) is configured to be small. For example, small values of $\Delta E_a$ can be obtained with large Bragg angles θ, small angular beam divergences $\Delta\theta$, or combination of both. The incident x-ray beam flux increases with the angular beam divergence $\Delta\theta$, so certain implementations described herein provide increased x-ray analysis speed to impinge the stacked flat Bragg diffractors with the x-ray beam at high Bragg angles to obtain $\Delta E_c$ close to $\Delta E$.

Certain implementations described herein provide an energy dispersive detector system comprising at least two stacked flat Bragg diffractors and an energy dispersive detector positioned to receive diffracted x-rays from the at least two stacked flat Bragg diffractors. The energy dispersive detector has an energy resolution equal to or greater than the energy difference of the mean x-ray energies of the x-rays diffracted by the at least two stacked flat Bragg diffractors. For example, at least two stacked flat crystal diffractors and one x-ray detector can be configured such that the x-ray detector receives some x-rays diffracted by the at least two stacked flat crystal diffractors and the x-ray detector has an energy resolution comparable to or greater than the energy difference of the mean x-ray energies of the x-rays diffracted by the at least two stacked flat crystal diffractors. In certain implementations, the energy dispersive detector system reduces (e.g., minimizes) the number of x-ray detectors that are used (e.g., by selecting the Bragg angles of the at least two stacked flat crystal diffractors, the distances between the at least two stacked flat crystal diffractors, and the relative position of the x-ray detector relative to the at least two stacked flat crystal diffractors). The stacked flat crystal diffractors can comprise different materials from one another or can comprise the same materials as one another, but with different Miller indices. The x-ray detector can be an energy dispersive detector (e.g., silicon drift detector, Li-drift silicon or germanium detector, photon counting detector with selectable energy window, superconductor based microcalorimeter).

Figure 1B:
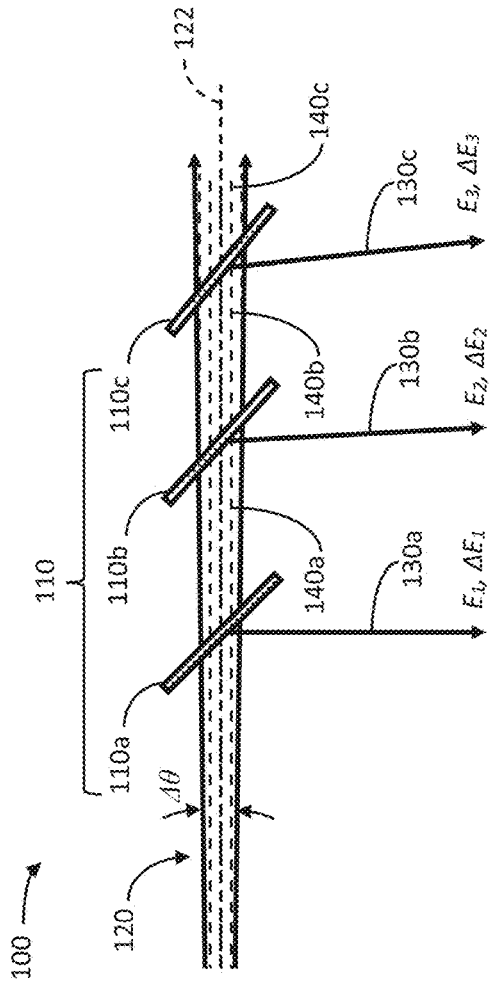

FIGS. 1A and 1B schematically illustrate two examples of an apparatus 100 (e.g., x-ray crystal diffractor; array of sequentially arranged flat Bragg diffractors; PBWDS) in accordance with certain implementations described herein. The apparatus 100 comprises a plurality of stacked flat Bragg diffractors 110 comprising at least first and second flat Bragg diffractors 110a, 110b (e.g., multilayers; single crystals; mosaic crystals) positioned sequentially along an x-ray propagation axis 122 of an x-ray beam 120 comprising x-rays 124 and having an angular beam divergence $\Delta\theta$ less than 30 mrad (e.g., less than 10 mrad; less than 2 mrad; less than 0.2 mrad) in at least one plane comprising the x-ray propagation axis 122 (e.g., in at least one direction substantially perpendicular to the x-ray propagation axis 122). For example, at least one flat Bragg diffractor 110 of the plurality of stacked flat Bragg diffractors 110 can comprise a multilayer structure comprising periodic layers of alternating high mass density and low mass density materials (e.g., Cr/C; W/C; Mo/Si) with a d-spacing in a range of 3 nanometers to 30 nanometers), a single crystal selected from the group consisting of: diamond, quartz, graphite, stack of graphene layers, other materials comprising low atomic number elements, silicon (Si), germanium (Ge), lithium fluoride (LiF), mica, indium antimonide (InSb), polyethylene terephthalate (PET), ammonium dihydrophosphate (ADP), rubidium acid phtahalate (RAP), beryl, and thallium acid phthalate (TIAP) and/or mosaic crystals selected from the group consisting of highly annealed pyrolitic graphite (HAPG) and highly oriented pyrolitic graphite (HOPG).

As used herein, the term "flat Bragg diffractor" has its broadest reasonable interpretation, including but not limited to a diffractor comprising a substantially flat (e.g., planar; radius of curvature greater than 100 meters) multilayer, single crystal, or mosaic crystal configured to diffract x-rays in accordance with Bragg's law. As used herein, the term "stacked flat Bragg diffractors" has its broadest reasonable interpretation, including but not limited to a plurality of flat Bragg diffractors that are connected (e.g., rigidly affixed) to one another through mechanical linkages (e.g., by a common fixture with or without angular adjustments between them) and are configured such that the flat Bragg diffractors are sequentially impinged by the x-ray beam (e.g., sequentially disposed along the x-ray beam axis). For example, the x-ray beam is incident on (e.g., impinges) a first flat Bragg diffractor (e.g., an upstream-most flat Bragg diffractor) and a portion of the x-ray beam transmitted through the first flat Bragg diffractor is incident on (e.g., impinges) a second flat Bragg diffractor (e.g., a next flat Bragg diffractor downstream from the upstream-most flat Bragg diffractor), with a portion of the x-ray beam transmitted through the second flat Bragg diffractor. For an example with more than two flat Bragg diffractors, the portions transmitted through the flat Bragg diffractors are incident on (e.g., impinge) the next downstream flat Bragg diffractors, until a downstream-most flat Bragg diffractor receives (e.g., is impinged by) the portion of the x-ray beam transmitted through the previous flat Bragg diffractor. As used herein, the term "flat Bragg diffractor" used in singular form includes a single flat Bragg diffractor and a single stack of flat Bragg diffractors, unless specifically stated. As used herein, the terms "multiple flat Bragg diffractors," "a plurality of flat Bragg diffractors," and "two flat Bragg diffractors" have their broadest reasonable interpretations, including but not limited to two or more individual flat Bragg diffractors and/or two or more stacks of flat Bragg diffractors.

For example, as shown in FIGS. 1A and 1B, the second flat Bragg diffractor 110b is downstream from the first flat Bragg diffractor 110a (e.g., the second flat Bragg diffractor 110b can be further from a source of the x-ray beam 120 than is the first flat Bragg diffractor 110a). The first flat Bragg diffractor 110a is configured to diffract a first diffracted portion 130a of the x-rays 124 and to transmit a first transmitted portion 140a of the x-rays 124, and the second flat Bragg diffractor 110b is configured to diffract a second diffracted portion 130b of the first transmitted portion 140a and to transmit a second transmitted portion 140b of the first transmitted portion 140a. The first diffracted portion 130a has a first mean (e.g., central) x-ray energy $E_1$ and a first energy resolution $\Delta E_1$ and the second diffracted portion 130b has a second mean (e.g., central) x-ray energy $E_2$ and a second energy resolution $\Delta E_2$, the second x-ray energy $E_2$ different from the first x-ray energy $E_1$.

While the example apparatus 100 of FIG. 1A comprises the first and second flat Bragg diffractors 110a,b, the example apparatus 100 of FIG. 1B comprises first, second, and third flat Bragg diffractors 110a,b,c stacked with one another and positioned sequentially along the x-ray propagation axis 122 (e.g., the third flat Bragg diffractor 110c downstream from the second flat Bragg diffractor 110b). The third flat Bragg diffractor 110c can be configured to diffract a third diffracted portion 130c of the second transmitted portion 140b and to transmit a third transmitted portion 140c of the second transmitted portion 140b. The third diffracted portion 130c can have a third mean (e.g., central) x-ray energy $E_3$ and a third energy resolution $\Delta E_3$, the third x-ray energy $E_3$ different from the first x-ray energy $E_1$ and from the second x-ray energy $E_2$. In certain implementations, positioning and alignment of one or more flat Bragg diffractors 110 (e.g., the first flat Bragg diffractor 110a, the second flat Bragg diffractor 110b, and/or the third flat Bragg diffractor 110c) relative to the x-ray propagation axis 122 is performed, individually or simultaneously, using adjustment mechanisms of the fixture (e.g., computer controlled motorized adjustment mechanisms).

In certain implementations, the plurality of stacked flat Bragg diffractors 110 comprises two or more flat Bragg diffractors 110 (e.g., 2, 3, 4, or 5; 2 to 10; 5 to 10; less than 20; less than 100; more than 5; more than 20; more than 100) stacked with one another and positioned sequentially along the x-ray propagation axis 122. The maximum number of flat Bragg diffractors 110 can be limited by the cumulative x-ray transmission of the plurality of stacked flat Bragg diffractors 110.

In certain implementations, the plurality of stacked flat Bragg diffractors 110 can be configured to diffract more than three (e.g., more than 10; more than 20; more than 30) characteristic x-ray lines simultaneously with energy resolutions better than 30 eV (e.g., for XRF analysis with scanning electron microscopes and micro XRF systems). In certain implementations, at least one flat Bragg diffractor 110 is configured to diffract a single characteristic x-ray line (e.g., two stacked flat Bragg diffractors 110 comprising LiF crystals configured to diffract the Cu $K_{\alpha1}$ x-ray line). The energy resolution can be better than 2 eV with an x-ray beam 120 with an angular beam divergence of 10 mrad, and with the stacked flat Bragg diffractors 110 operated at high Bragg angles such that the Darwin width limited energy resolutions are narrower than the energy bandwidth of the characteristic x-ray lines to be measured.

In certain implementations, at least the upstream-most flat Bragg diffractor 110 (e.g., the first flat Bragg diffractor 110a) of the plurality of stacked flat Bragg diffractors 110 comprises a multilayer Bragg diffractor configured to diffract x-rays 124 having x-ray energies less than 1 keV (e.g., a C $K_\alpha$ x-ray line). The next downstream flat Bragg diffractor 110 (e.g., the second flat Bragg diffractor 110b) of the plurality of stacked flat Bragg diffractors 110 can comprise PET, ADP, or RAP and can be configured to diffract x-rays 124 having x-ray energies greater than 1 keV (e.g., in a range of 1 keV to 3 keV), and the downstream-most flat Bragg diffractor 110 (e.g., the third flat Bragg diffractor 110c) of the plurality of stacked flat Bragg diffractors 110 can comprise a single crystal or a mosaic crystal and can be configured to diffract x-rays 124 having x-ray energies greater than 3 keV (e.g., greater than 5 keV). In certain implementations, at least one flat Bragg diffractor 110 is configured to diffract x-rays 124 having a characteristic x-ray line energy of a predetermined atomic element and another at least one flat Bragg diffractor 110 is configured to diffract x-rays 124 having x-ray energies close to but different from the characteristic x-ray line energy (e.g., energy difference greater than the energy bandwidth of the characteristic x-ray line and less than or equal to 140 eV, less than 50 eV, less than 10 eV) to measure a background contribution (e.g., not resulting from the characteristic x-ray line) to the detected x-rays.

In certain implementations, the plurality of stacked flat Bragg diffractors 110 are positioned along the x-ray propagation axis 122 within a distance along the x-ray propagation axis less than 200 millimeters (e.g., the distance between the upstream-most flat Bragg diffractor 110 and the downstream-most flat Bragg diffractor 110 is less than 200 millimeters). In certain implementations, at least two adjacent flat Bragg diffractors 110 are positioned along the x-ray propagation axis 122 spaced from one another along the x-ray propagation axis 122 by less than 200 millimeters (e.g., less than 50 millimeters; less than 30 millimeters; less than 20 millimeters; less than 10 millimeters; less than 2 millimeters; less than 1 millimeter; less than 0.2 millimeter). In certain implementations, each flat Bragg diffractor 110 of the plurality of stacked flat Bragg diffractors 110 (e.g., first and second flat Bragg diffractors 110a,b) can simultaneously satisfy the Bragg conditions for the x-ray beam 120 having an angular beam divergence Δθ less than 15 mrad (e.g., less than 3 mrad; less than 1 mrad; less than 0.3 mrad) in the diffraction plane within an energy bandwidth less than 25 eV (e.g., less than 10 eV; less than 5 eV; less than 1 eV) with intensity overlap of the x-ray energies of at least two of the diffracted portions 130 less than 5% (e.g., less than 1%).

In certain implementations, at least one flat Bragg diffractor 110 of the plurality of stacked flat Bragg diffractors 110 is symmetrically cut, while in certain other implementations, at least one flat Bragg diffractor 110 of the plurality of stacked flat Bragg diffractors 110 is asymmetrically cut (e.g., increasing its effective Darwin width by a factor of 1.2 to 5; decreasing its effective Darwin width by a factor of 1.2 to 5) to diffract x-rays 124 with an energy resolution different from (e.g., wider or narrower than) the symmetrically cut form of the at least one flat Bragg diffractor 110. In certain implementations, at least one flat Bragg diffractor 110 of the plurality of stacked flat Bragg diffractors 110 comprises an asymmetrically cut crystal is configured to be rotated by 180 degrees, to switch the at least one flat Bragg diffractor 110 of the plurality of stacked flat Bragg diffractors 110 from an increased effective Darwin width to a decreased effective Darwin width, or vice versa.

In certain implementations, at least two flat Bragg diffractors 110 of the plurality of stacked flat Bragg diffractors 110 (e.g., first and second flat Bragg diffractors 110a,b; first and third flat Bragg diffractors 110a,c; second and third flat Bragg diffractors 110b,c; first, second, and third flat Bragg diffractors 110a,b,c) comprise the same material as one another. In certain implementations, at least two flat Bragg diffractors 110 of the plurality of stacked flat Bragg diffractors 110 (e.g., first and second flat Bragg diffractors 110a,b; first and third flat Bragg diffractors 110a,c; second and third flat Bragg diffractors 110b,c; first, second, and third flat Bragg diffractors 110a,b,c) comprise different materials from one another. The at least two flat Bragg diffractors 110 of the plurality of stacked flat Bragg diffractors 110 can be configured to simultaneously satisfy the Bragg conditions for the incident x-rays 124 propagating along the x-ray propagation axis 122 with small angular beam divergence (e.g., less than 30 mrad; less than 20 mrad; less than 10 mrad; less than 5 mrad; less than 3 mrad; less than 2 mrad; less than 1 mrad; less than 0.3 mrad; less than 0.2 mrad) within a narrow spectral bandwidth (e.g., less than 25 eV; less than 10 eV; less than 5 eV; less than 2 eV; less than 1 eV) with minimal (e.g., less than 5%; less than 1%) overlap of diffracted x-ray intensities by the at least two flat Bragg diffractors 110.

At least one flat Bragg diffractor 110 of the plurality of stacked flat Bragg diffractors 110 (e.g., the upstream-most flat Bragg diffractor 110; the first flat Bragg diffractor 110a of FIG. 1A; each of the first and second flat Bragg diffractors 110a,b of FIG. 1B) can have a thickness (e.g., along the x-ray propagation axis 122) greater than 1 micron (e.g., greater than 2 microns) and less than 500 microns (e.g., less than 300 microns; less than 100 microns; less than 50 microns; less than 20 microns; less than 5 microns). For example, in FIG. 1A, the thickness of the first flat Bragg diffractor 110a can be greater than or equal to an extinction length for x-rays 124 having the second x-ray energy $E_2$ in the material of the first flat Bragg diffractor 110a. For another example, in FIG. 1B, the thickness of the first flat Bragg diffractor 110a can be greater than or equal to an extinction length for x-rays 124 having the second x-ray energy $E_2$ and for x-rays 124 having the third x-ray energy $E_3$ in the material of the first flat Bragg diffractor 110a, and the thickness of the second flat Bragg diffractor 110b can be greater than or equal to an extinction length for x-rays 124 having the third x-ray energy $E_3$ in the material of the second flat Bragg diffractor 110b.

Each flat Bragg diffractor 110 of the plurality of stacked flat Bragg diffractors 110 can have an x-ray transmittance greater than 1% (e.g., greater than 2%; greater than 5%; greater than 30%) for x-rays 124 that are diffracted by a downstream flat Bragg diffractor 110. For example, in FIG. 1A, the first flat Bragg diffractor 110a can have a first x-ray transmittance greater than 1% for x-rays 124 having the second x-ray energy $E_2$. For another example, in FIG. 1B, the first flat Bragg diffractor 110a can have a first x-ray transmittance greater than 1% for x-rays 124 having the second x-ray energy $E_2$ and a third x-ray transmittance greater than 1% for x-rays 124 having the third x-ray energy $E_3$, and the second flat Bragg diffractor 110b can have a second x-ray transmittance greater than 1% for x-rays 124 having the third x-ray energy $E_3$. The plurality of stacked flat Bragg diffractors 110 can have an integrated reflectivity approximately equal to a sum of the integrated reflectivities of the individual flat Bragg diffractors 110 of the plurality of stacked flat Bragg diffractors 110, reduced by x-ray absorption by at least one upstream flat Bragg diffractor 110 (e.g., first flat Bragg diffractor 110a in FIGS. 1A and 1B). The upstream-most flat Bragg diffractor 110 (e.g., the first flat Bragg diffractor 110a) can have an x-ray transmission greater than 50% for x-rays 124 within the energy bandwidth of the diffracted portion 130 of x-rays 124 diffracted by at least one downstream flat Bragg diffractor 110 (e.g., the second flat Bragg diffractor 110b; the third flat Bragg diffractor 110c). The upstream-most flat Bragg diffractor 110 of the plurality of stacked flat Bragg diffractors 110 (e.g., the first flat Bragg diffractor 110a) can have an x-ray transmission greater than that of a downstream flat Bragg diffractor 110 (e.g., the second flat Bragg diffractor 110b) within the total spectral bandwidth of the plurality of stacked flat Bragg diffractors 110. In certain implementations in which the x-rays 124 transmitted through the downstream-most flat Bragg diffractor 110 (e.g., the second flat Bragg diffractor 110b of FIG. 1A; the third flat Bragg diffractor 110c of FIG. 1B) are not to be used for further analysis, the downstream-most flat Bragg diffractor 110 can have a low x-ray transmittance (e.g., comprising Ge or another high atomic number material; having a thickness greater than 300 microns) and/or can have a coarser energy resolution than does the upstream-most flat Bragg diffractor 110 of the plurality of stacked flat Bragg diffractors 110.

The diffracted portions 130 (e.g., the first diffracted portion 130a and the second diffracted portion 130b of FIG. 1A; the first, second, and third diffracted portions 130a,b,c of FIG. 1B) can have a total spectral bandwidth (e.g., a sum of the spectral bandwidths of the diffracted portions 130) that substantially matches a predetermined energy range (e.g., an energy range to be used for a given analysis). The transmitted portion that is transmitted through the downstream-most flat Bragg diffractor 110 (e.g., the second transmitted portion 140b transmitted through the second flat Bragg diffractor 110b of FIG. 1A; the third transmitted portion 140c transmitted through the third flat Bragg diffractor 110c of FIG. 1B) can have sufficient x-ray flux for analysis by one or more x-ray detectors (not shown in FIGS. 1A and 1B)

positioned downstream from the downstream-most flat Bragg diffractor 110. In certain implementations, the plurality of stacked flat Bragg diffractors 110 has an x-ray transmittance greater than 3% for x-rays 124 outside the total spectral bandwidths of the diffracted portions 130. For example, the transmitted portion that is transmitted through the downstream-most flat Bragg diffractor 110 has sufficient flux for further analysis by at least one additional spectrometer (e.g., another x-ray stacked crystal diffractor; an array of sequentially arranged flat Bragg diffractors; a single crystal diffractor; a mosaic crystal diffractor; an energy dispersive detector). In certain implementations, the plurality of stacked flat Bragg diffractors 110 contributes an angular spread less than 15 mrad (e.g., less than 10 mrad) to the transmitted portion.

In certain implementations in which the at least two flat Bragg diffractors 110 of the plurality of stacked flat Bragg diffractors 110 (e.g., first and second flat Bragg diffractors 110a,b; first and third flat Bragg diffractors 110a,c; second and third flat Bragg diffractors 110b,c; first, second, and third flat Bragg diffractors 110a,b,c) comprise the same material as one another, the at least two flat Bragg diffractors 110 are configured to diffract x-rays 124 with atomic planes having the same Miller indices as one another (e.g., LiF (111); LiF(200); Si(111)). The mean x-ray energies E of the diffracted portions 130 from each of the at least two flat Bragg diffractors 110 (e.g., the first and second mean energies $E_1$, $E_2$ of the first and second flat Bragg diffracted portions 130a,b) can be different from one another and each of the at least two diffracted portions 130 can have a spectral bandwidth that is less than or equal to one-half of the energy resolution IE from the corresponding flat Bragg diffractor 110 (e.g., the first and second diffracted portions 130a,b can have spectral bandwidths of $\Delta E_1 \leq 0.5 \cdot \Delta E$ and $\Delta E_2 \leq 0.5 \cdot \Delta E$, respectively; the first, second, and third diffracted portions 130a,b,c can have spectral bandwidths of $\Delta E_1 \leq 0.3 \cdot \Delta E$, $\Delta E_2 \leq 0.3 \cdot \Delta E$, and $\Delta E_3 \leq 0.3 \cdot \Delta E$, respectively). The overlap of the spectral bandwidths of at least two diffracted portions 130 can be less than or equal to 5% (e.g., less than 1%) of at least one of the spectral bandwidths. In certain implementations, the difference between the mean energies of at least two diffracted portions 130 is less than or equal to the spectral bandwidth of at least one of the spectral bandwidths (e.g., $(E_2-E_1) \leq \Delta E_1$ and/or $(E_2-E_1) \leq \Delta E_2$).

For example, the x-rays 124 can be incident to each of the at least two flat Bragg diffractors 110 of the plurality of stacked flat Bragg diffractors 110 at different Bragg angles (e.g., difference of at least one Darwin width but less than 30 Darwin widths (e.g., less than 10, 5, or 3 Darwin widths)) such that there is substantially zero spectral overlap between the diffracted portions 130 from the at least two flat Bragg diffractors 110. The Bragg angle difference can be greater than 10 microradians (e.g., greater than 50 microradians; greater than 500 microradians; greater than 5 mrad; greater than 300 mrad). For another example, the x-rays 124 can be incident to each of the at least two flat Bragg diffractors 110 at substantially equal Bragg angles and the at least two flat Bragg diffractors 110 can have different d-spacings (e.g., difference of at least one Darwin width but less than 30 Darwin widths (e.g., less than 10, 5, or 3 Darwin widths)) of the diffracting atomic planes of the at least two flat Bragg diffractors 110. The different d-spacings can be achieved by having the at least two flat Bragg diffractors 110 at different temperatures. For example, LiF has a thermal expansion coefficient of $37 \times 10^{-6}$/K at 283° C. (e.g., more than 10× higher than that for Si) and a thermal conductivity of 0.113 W/K/cm at 314° C. (e.g., more than 15× lower than that for Si). A combination of temperature difference and relative Bragg angle difference can be used to simultaneously satisfy the Bragg conditions for the incident x-rays 124 propagating along the x-ray propagation axis 122 with small angular beam divergence (e.g., less than 30 mrad; less than 20 mrad; less than 10 mrad; less than 5 mrad; less than 3 mrad; less than 2 mrad; less than 1 mrad; less than 0.3 mrad; less than 0.2 mrad) within a narrow spectral bandwidth (e.g., less than 25 eV; less than 10 eV; less than 5 eV; less than 2 eV; less than 1 eV) with minimal (e.g., less than 5%; less than 1%) overlap of diffracted x-ray intensities by the at least two flat Bragg diffractors 110.

In certain implementations, at least one flat Bragg diffractor 110 of the plurality of stacked flat Bragg diffractors 110 has an upstream-most surface, a downstream-most surface, and a temperature difference between the two surfaces, the temperature difference configured to vary a d-spacing of crystal planes of the at least one flat Bragg diffractor 110. For example, the temperature difference can be generated by heating or cooling one of the two surfaces or by heating one of the two surfaces while cooling the other of the two surfaces). The ratio of the d-spacing change due to the temperature difference to the d-spacing of the crystal planes without the temperature difference can be in a range of 10 microradians to 400 microradians (e.g., in a range of 10 microradians to 50 microradians; in a range of 10 microradians to 200 microradians; in a range of 50 microradians to 200 microradians; in a range of 200 microradians to 400 microradians).

In certain implementations, at least two flat Bragg diffractors 110 of the plurality of stacked flat Bragg diffractors 110 are fabricated from a single crystal block. For example, by removing material from between portions of the single crystal block, different portions of the single crystal block can serve as different flat Bragg diffractors 110 with corresponding predetermined thicknesses and predetermined spacings between adjacent flat Bragg diffractors 110 of the plurality of stacked flat Bragg diffractors 110. The fixture can comprise a tilting mechanism configured to introduce or controllably modify a predetermined angular tilt between the crystal planes of the at least two flat Bragg diffractors 110 (e.g., between 5 microradians and 300 mrad).

In certain other implementations, at least two flat Bragg diffractors 110 of the plurality of stacked flat Bragg diffractors 110 are fabricated separately from one another to have corresponding predetermined materials, thicknesses, and crystal planes with predetermined Miller indices (e.g., at predetermined asymmetric angles relative to the crystal surfaces), and the at least two flat Bragg diffractors 110 are affixed (e.g., connected; mounted) to the fixture such that the at least two flat Bragg diffractors 110 have a predetermined angular tilt between the crystal planes of the at least two flat Bragg diffractors 110 (e.g., between 5 microradians and 300 mrad).

Figure 2:
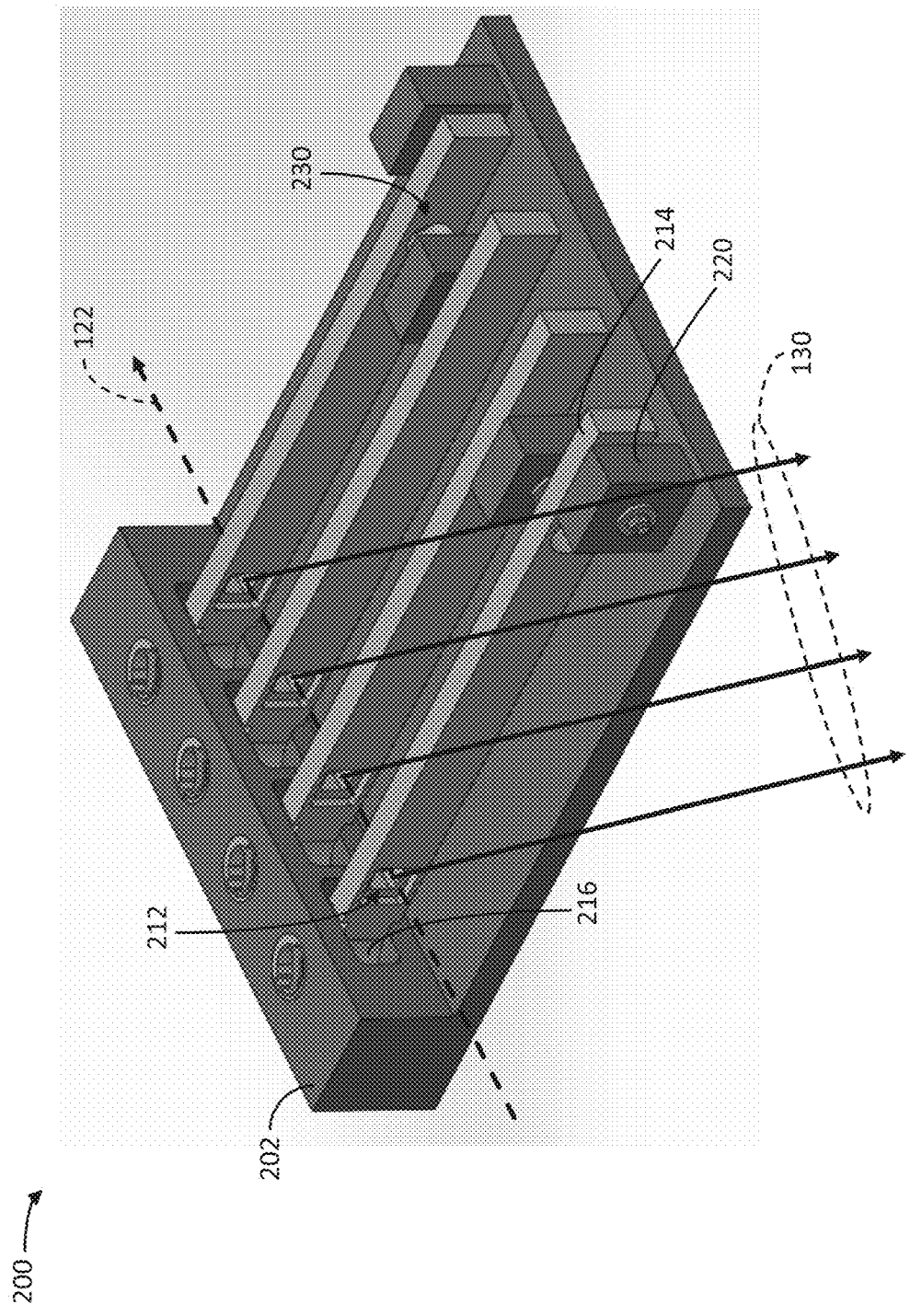
FIG. 2 schematically illustrates an example fixture configured to hold the plurality of stacked flat Bragg diffractors in accordance with certain implementations described herein.

FIG. 2 schematically illustrates an example fixture 200 configured to hold the plurality of stacked flat Bragg diffractors 110 in accordance with certain implementations described herein. The fixture 200 comprises a rigid frame 202 and a plurality of diffractor mounts 210 configured to hold the plurality of stacked flat Bragg diffractors 110 along an x-ray propagation axis 122 of an x-ray beam 120. Each diffractor mount 210 comprises a first portion 212 configured to be affixed to a corresponding flat Bragg diffractor 110 of the plurality of stacked flat Bragg diffractors 110, the first portion 212 substantially transparent to the x-ray beam 120, a second portion 214 configured to be controllably moved to adjust an angle of the corresponding flat Bragg diffractor 110 relative to the x-ray propagation axis 122, and a third portion 216 configured to flex in response to movement of the second portion 214. The first portion 212 can comprise a hole extending through the diffractor mount 210 and/or a membrane having an x-ray transmission (e.g., greater than 50%) to the x-rays 124 to be diffracted by one or more other downstream flat Bragg diffractors 110. The membrane can be configured to support a flat Bragg diffractor 110 that is not sufficiently rigid to be self-supporting across the hole. The fixture 200 can further comprise a plurality of adjustment mechanisms 220 configured to controllably move the second portions 214 of the plurality of diffractor mounts 210 (e.g., manually; electronically). For example, each adjustment mechanism 220 can comprise a threaded through hole and a set screw extending from the through hole and contacting the second portion 214 of the diffractor mount 210. By adjusting the extent of the set screw from the through hole (e.g., manually; electronically), the second portion 214 can be controllably moved against a restoring force generated by the flexing third portion 216 to adjust the angular tilt of the corresponding flat Bragg diffractor 110 (e.g., the diffractor mount 210 serving as a lever arm with the third portion 216 serving as a pivot). In certain implementations, at least one of the diffractor mounts 210 comprises a through hole 230 configured to provide access to the adjustment mechanism 220 (e.g., set screw) mechanically coupled to another of the diffractor mounts 210.

FIGS. 3A-3D schematically illustrate four additional examples of an apparatus 100 (e.g., x-ray crystal diffractor; array of sequentially arranged flat Bragg diffractors) in accordance with certain implementations described herein. The apparatus 100 comprises a sequential stack 300 of a plurality of flat Bragg diffractors 110 (e.g., a plurality of stacked flat Bragg diffractors 110) and at least one first x-ray detector 310. At least two flat Bragg diffractors 110 of the plurality of flat Bragg diffractors 110 (e.g., comprising at least one single crystal and/or at least one mosaic crystal) are stacked with (e.g., mounted to; rigidly attached to) one another such that a separation (e.g., distance) between adjacent flat Bragg diffractors 110 of the at least two flat Bragg diffractors 110 along a direction substantially parallel to the x-ray propagation axis 122 is less than 200 millimeters (e.g., less than 50 millimeters; less than 30 millimeters; less than 20 millimeters; less than 10 millimeters; less than 2 millimeters; less than 1 millimeter; less than 0.2 millimeter). For example, as shown in FIGS. 3A-3D, the first, second, and third flat Bragg diffractors 110$a,b,c$ are stacked with one another and are configured to diffract the first, second, and third diffracted portions 130$a,b,c$, respectively, in directions towards the at least one first x-ray detector 310. The sequential stack 300 can comprise at least two flat Bragg diffractors 110 of the plurality of flat Bragg diffractors 110 that are mounted to a fixture 200 (see, e.g., FIG. 2) configured to align the spatial positions and/or orientations (e.g., Bragg angles) of the plurality of flat Bragg diffractors 110 relative to the x-ray propagation axis 122. In certain implementations, positioning and alignment of the sequential stack 300, at least some of the plurality of flat Bragg diffractors 110, and/or the at least one first x-ray detector 310 is performed using one or more computer controlled motorized motion stages.

As discussed herein with regard to FIGS. 1A and 1, the first and second diffracted portions 130$a,b$ can have first and second mean x-ray energies $E_1$ and $E_2$, respectively, and the third diffracted portion 130$c$ can have a third mean x-ray energy $E_3$. In addition, the first flat Bragg diffractor 110$a$ can have a first x-ray transmittance greater than 1% for x-rays 124 having the second x-ray energy $E_2$ and a third x-ray transmittance greater than 1% for x-rays 124 having the third x-ray energy $E_3$, and the second flat Bragg diffractor 110$b$ can have a second x-ray transmittance greater than 1% for x-rays 124 having the third x-ray energy $E_3$.

In certain implementations, each of the at least two flat Bragg diffractors 110 of the sequential stack 300 is configured to diffract x-rays 124 towards the at least one first x-ray detector 310, the at least two diffracted portions 130 having mean x-ray energies that differ from one another by less than 30 eV (e.g., less than 10 eV; less than 5 eV; less than 2 eV). In certain implementations, each of the at least two flat Bragg diffractors 110 is configured to diffract x-rays 124 towards the at least one first x-ray detector 310, the at least two diffracted portions 130 having mean x-ray energies that differ from one another by greater than 50 eV (e.g., greater than 100 eV; greater than 200 eV; greater than 500 eV; greater than 2000 eV). The at least two diffracted portions 130 (e.g., first, second, and third diffracted portions 130$a, b,c$) have substantially no spectral intensity overlap with one another (e.g., less than 5%; less than 1%; less than 0.1%). While FIGS. 3A-3D show three stacked flat Bragg diffractors 110 (e.g., first, second, and third flat Bragg diffractors 110$a,b,c$), certain other implementations comprise two stacked flat Bragg diffractors 110 or three or more (e.g., 3, 4, or 5; 3 to 10; 5 to 10) stacked flat Bragg diffractors 110.

In certain implementations, the at least one x-ray first detector 310 is configured to receive at least a portion of the diffracted portions 130 of the x-rays 124 diffracted by the plurality of flat Bragg diffractors 110 of the sequential stack 300 and to output detection electrical signals in response to the received diffracted portions 130. For example, as shown in FIGS. 3A-3D, the at least one first x-ray detector 310 is configured to receive the first, second, and third diffracted portions 130$a,b,c$ of the x-rays 124 diffracted by the first, second, and third flat Bragg diffractors 110$a,b,c$. The at least one first x-ray detector 310 can comprise at least one of: a proportional counter, an ionization chamber, a silicon drift detector, a Li-drift silicon or germanium detector, an x-ray scintillator counter, a pin diode detector; an x-ray photon counter with a plurality of active detector elements (e.g., pixels). The at least one first x-ray detector 310 can have an energy resolution less than 25% (e.g., less than 10%) of the mean energy of at least one diffracted portion 130 received by the at least one first x-ray detector 310. The at least one first x-ray detector 310 can be configured to reduce (e.g., minimize; eliminate) contributions from higher diffraction orders or harmonics to the detection electrical signals.

Figure 3A:
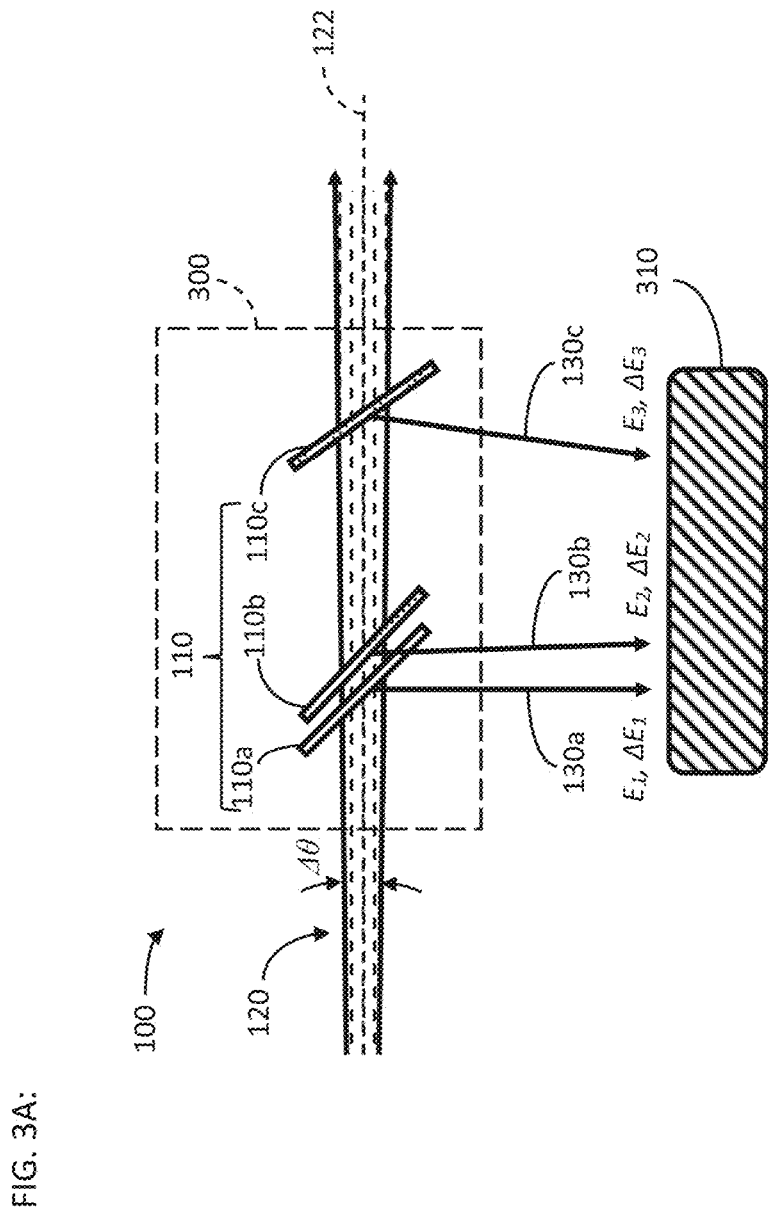
FIGS. 3A-3D schematically illustrate four additional examples of an apparatus comprising a sequential stack of a plurality of flat Bragg diffractors and at least one first x-ray detector in accordance with certain implementations described herein.
Figure 3B:
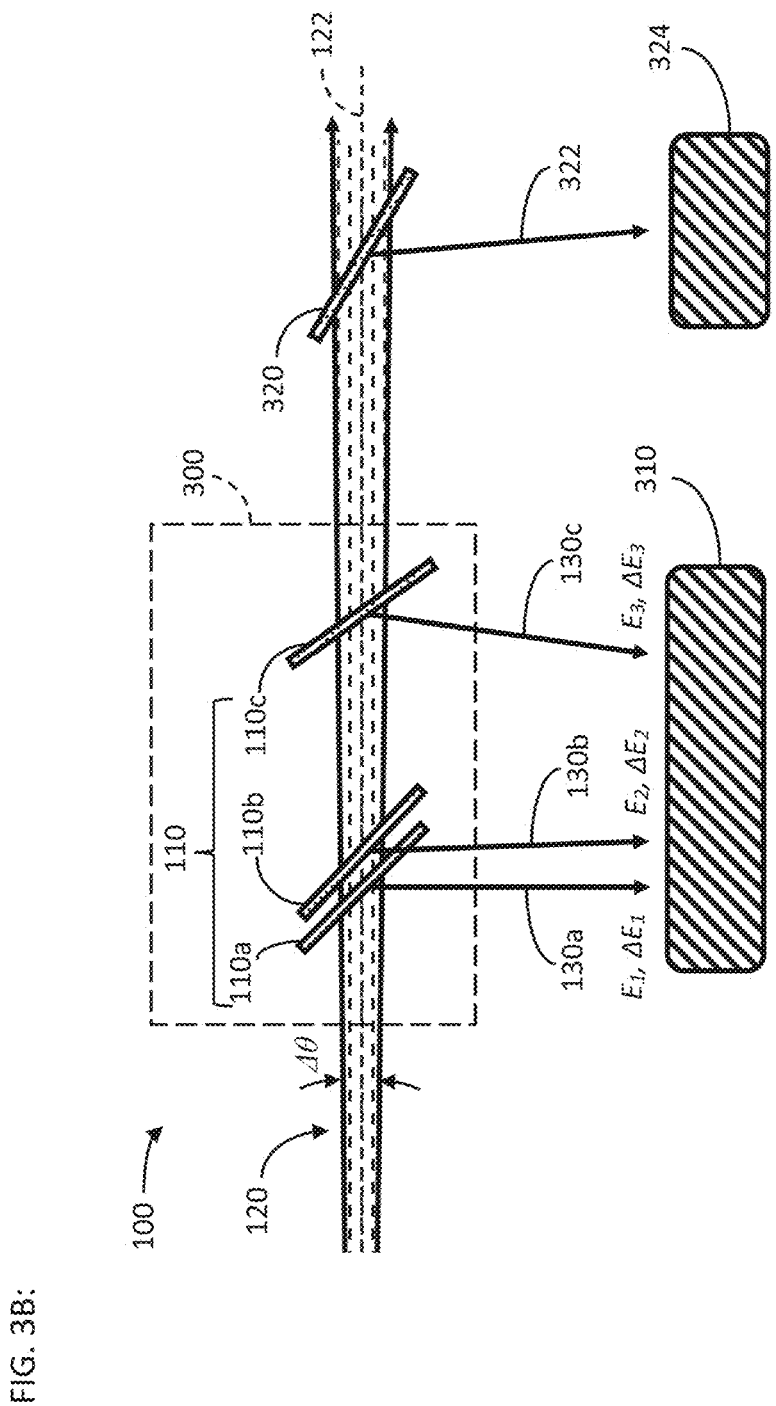
Figure 3C:
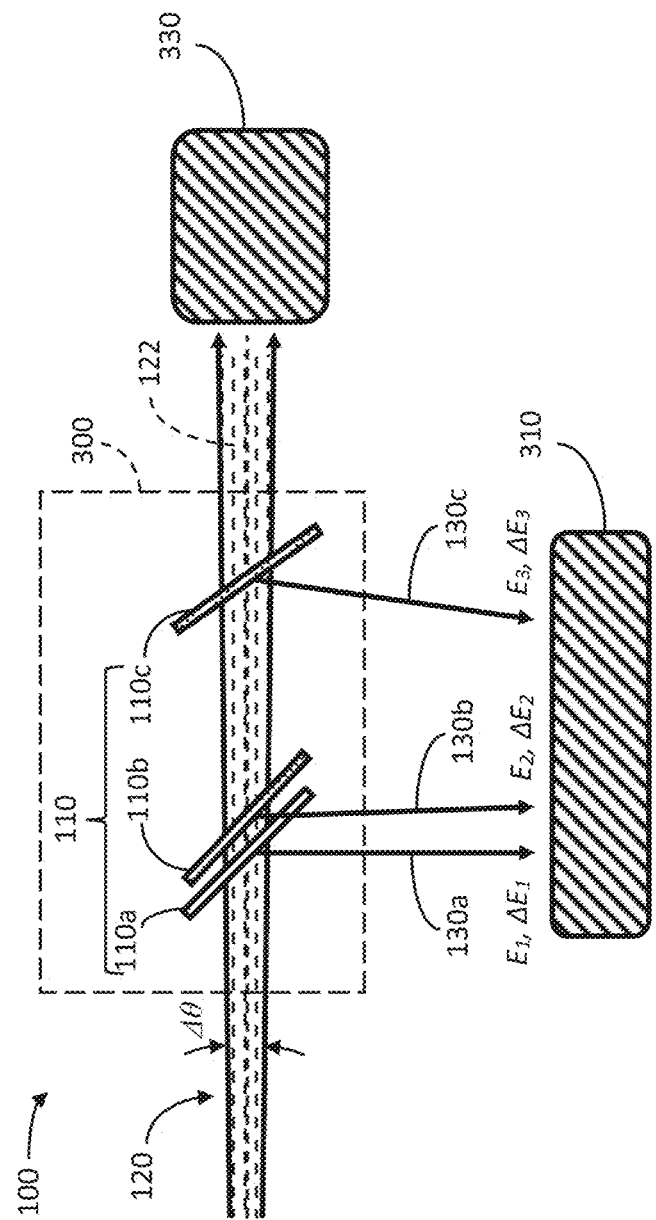

In certain implementations, at least two flat Bragg diffractors 110 of the sequential stack 300 are stacked with one another and another flat Bragg diffractor (e.g., multilayer; single crystal; mosaic crystal) is positioned sequentially (e.g., downstream) along the x-ray propagation axis 122 from the at least two stacked flat Bragg diffractors 110 and is not stacked with the at least two stacked flat Bragg diffractors 110. For example, as shown in FIG. 3B, the apparatus 100 comprises at least one additional flat Bragg diffractor 320 positioned sequentially along the x-ray propagation axis 122 from the sequential stack 300. The apparatus 100 further comprises at least one second x-ray detector 324. The at least one additional flat Bragg diffractor 320 is configured to diffract at least one additional diffracted portion 322 of the x-rays 124 towards the at least one second x-ray detector 324. The at least one additional flat Bragg diffractor 320 can comprise a multilayer diffractor, a single crystal diffractor, a mosaic crystal diffractor, and/or a combination thereof (e.g., an additional sequential stack 300). The at least one second x-ray detector 324 can comprise at least one of: a proportional counter, an ionization chamber, a silicon drift detector, an x-ray scintillator counter, a pin diode detector; an x-ray photon counter with a plurality of active detector elements (e.g., pixels). In certain implementations, positioning and alignment of the at least one second x-ray detector 324 is performed using computer controlled motorized motion stages.

Figure 3D:
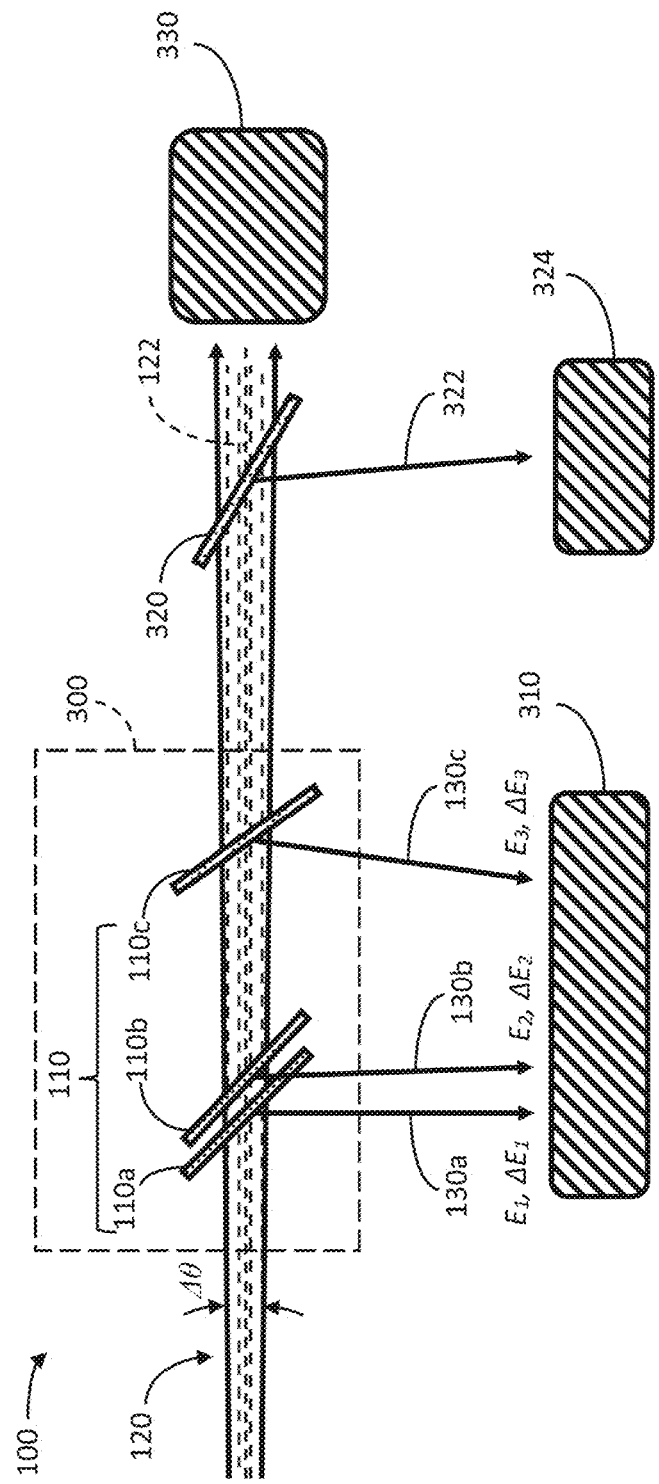

In certain implementations, the apparatus 100 further comprises at least one third x-ray detector 330 configured to receive the x-rays 124 that are transmitted through the sequential stack 300 (see, e.g., FIG. 3C) or through the sequential stack 300 and the at least one additional flat Bragg diffractor 320 (see, e.g., FIG. 3D). The sequential stack 300 can be configured to have an x-ray transmission greater than 1% for x-rays 124 to be detected by the at least one third x-ray detector 330. The at least one first x-ray detector 310 can comprise a pixel array detector (e.g., photon counting pixel array detector having at least one energy threshold configured to reject x-rays with x-ray energies below the at least one energy threshold and/or to reject x-rays with x-ray energies above the at least one energy threshold) and the at least one third x-ray detector 330 can comprise an energy dispersive detector (e.g., silicon drift detector, Li-drift silicon or germanium detector, photon counting detector with selectable energy window, superconductor-based microcalorimeter). The pixel array detector can be configured to have first pixels receive the first diffracted portion 130a, second pixels receive the second diffracted portion 130b, and third pixels receive the third diffracted portion 130c, the first pixels different from the second and third pixels and the second pixels different from the third pixels. In certain implementations, positioning and alignment of the at least one third x-ray detector 330 is performed using computer controlled motorized motion stages.

In certain implementations, the sequential stack 300 is configured to diffract at least one predetermined characteristic x-ray line having a relatively weak intensity (e.g., due to low concentrations of the related atomic elements and/or low fluorescence yields) or a relatively low x-ray energy, and the at least one first x-ray detector 310 comprises an energy dispersive detector. The at least one predetermined characteristic x-ray line can be used to resolve spectral overlay by the at least one third x-ray detector 330, thereby allowing analysis of a wide spectral range of x-rays with sufficient signal-to-noise ratios for detecting weak spectral lines and/or resolving interfering spectral lines.

In certain implementations, the sequential stack 300 and the at least one x-ray detector 310 are configured to concurrently measure multiple energy bands at the same time, such as measuring a plurality of characteristic x-ray lines concurrently. For example, the Cu $L_\alpha$ x-ray line can be measured using a multilayer diffractor of the sequential stack 300 and the Cu $K_{\alpha1}$ x-ray line can be concurrently measured with a single crystal or a mosaic crystal of the sequential stack 300. In certain other implementations, the sequential stack 300 and the at least one x-ray detector 310 are configured to use a single crystal or a mosaic crystal of the sequential stack 300 to concurrently measure the O $K_\alpha$ x-ray line while another flat Bragg diffractor 110 of the sequential stack 300 is used to measure at least one of the Cu $K_{\alpha1}$ x-ray line and Cu $L_\alpha$ x-ray line.

In certain implementations, the apparatus 100 further comprises at least one x-ray shield that is not substantially transmissive to the x-rays 124 and is configured to be selectively positioned to either allow a corresponding diffracted portion 130 of the x-rays 124 to reach the at least one x-ray detector 310 or to block the corresponding diffracted portion 130 of the x-rays 124 from reaching the at least one x-ray detector 310. For example, the at least one x-ray shield can controllably block the first diffracted portion 130 from reaching the at least one x-ray detector 310 such that the at least one x-ray detector 310 only receives the second diffracted portion 130b and/or the third diffracted portion 130c to provide higher energy resolutions.

Figure 4A:
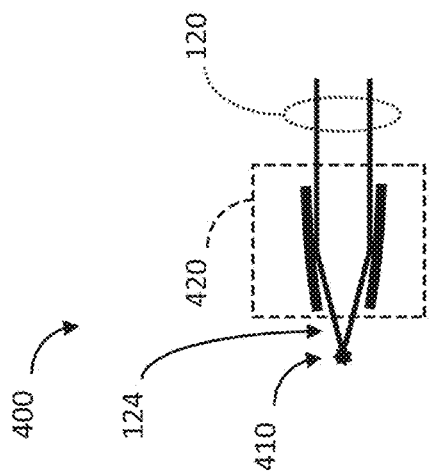
FIGS. 4A-4C schematically illustrate three example x-ray beam sources of a substantially collimated x-ray beam in accordance with certain implementations described herein.
Figure 4B:
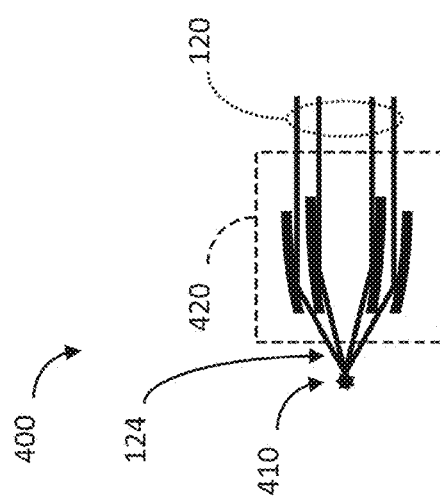
Figure 4C:
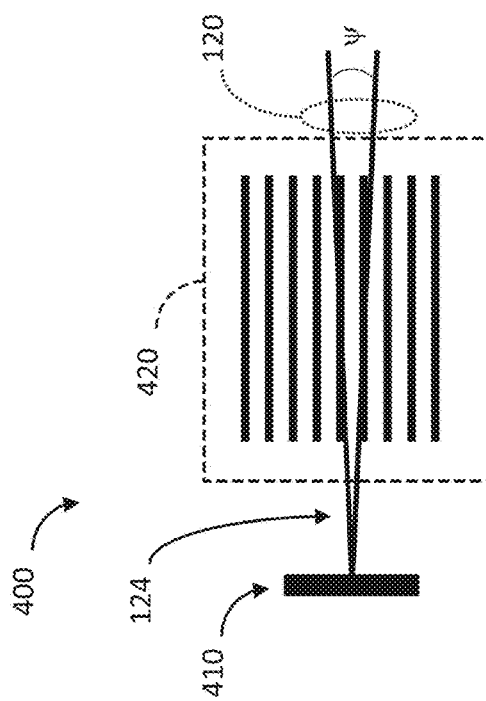

FIGS. 4A-4C schematically illustrate three example x-ray beam sources 400 (e.g., primary source; secondary source) of a substantially collimated x-ray beam 120 in accordance with certain implementations described herein. The x-ray beam source 400 comprises an x-ray source 410 and at least one collimating x-ray optic 420 configured to receive x-rays 124 propagating from the x-ray source 410 and to form the collimated x-ray beam 120 (e.g., having an angular beam divergence less than 30 mrad in at least one plane comprising the x-ray propagation axis 122 and/or in at least one direction substantially perpendicular to the x-ray propagation axis 122). The x-ray beam source 400 is configured to output a substantially collimated (e.g., parallel) x-ray beam 120 having a small angular beam divergence (e.g., less than 30 mrad; less than 20 mrad; less than 10 mrad; less than 5 mrad; less than 3 mrad; less than 2 mrad; less than 1 mrad; less than 0.3 mrad; less than 0.2 mrad) along the x-ray propagation axis 122 (e.g., the longitudinal axis of the at least one collimating x-ray optic 420). In certain implementations, positioning and alignment of at least one of the x-ray source 410 and the at least one collimating x-ray optic 420 is performed using at least one computer controlled motorized motion stage.

In certain implementations, the x-ray source 410 is configured to generate the x-rays 124 in response to incidence of ionizing radiation (e.g., x-rays; charged particles; electrons; protons). As shown in FIGS. 4A and 4B, the x-ray source 410 can comprise a point source (e.g., the x-rays 124 propagating from a spot size less than 200 microns or less than 30 microns in at least one direction substantially perpendicular to the x-ray propagation axis 122). As shown in FIG. 4C, the x-ray source 410 can comprise an extended source (e.g., the x-rays 124 propagating from a range of positions in a range of 20 millimeters to 1000 millimeters along at least one direction substantially perpendicular to the x-ray propagation axis 122). The x-ray source 410 can comprise a sample to be analyzed using the apparatus 100, with the sample irradiated by ionizing radiation to generate the x-rays 124 (e.g., the sample irradiated by a conventional laboratory source of electrons or x-rays, synchrotron radiation source, or other x-ray source that emits broadband or multi-energy x-rays). In certain implementations, the x-ray source 410 is not a component of the apparatus 100, while in certain other implementations, the x-ray source 410 is a component of the apparatus 100.

In certain implementations, the at least one collimating x-ray optic 420 comprises a monocapillary optic (e.g., single capillary optic; mirror optic). In certain implementations, an inner functional surface of the monocapillary optic has a paraboloidal shape, ellipsoidal shape, or a combination of a hyperboloidal shape with either a paraboloidal shape or ellipsoidal shape. As shown in FIG. 4A, the monocapillary optic receives the x-rays 124 from the x-ray source 410 over a corresponding solid angle of collection and reflects the x-rays 124 into the substantially collimated x-ray beam 120. In certain implementations, the inner surface of the monocapillary optic is coated with a layer of high mass density material (e.g., Pt; Ir). In certain implementations, the inner surface of the monocapillary optic is coated with multilayers of alternative low mass density and high mass density materials. For example, the periodicity (e.g., spacing) of the multilayers can be substantially constant. For another example, the periodicity of the multilayers can vary along the optical axis of the monocapillary optic (e.g., longitudinally graded), along a direction substantially perpendicular to the optical axis of the monocapillary optic, or a combination of both.

In certain implementations, the at least one collimating x-ray optic 420 comprises a polycapillary optic (e.g., a plurality of single capillary optics with paraboloidal surfaces nested coaxially; a type III Wolter optic) or a plurality of nested mirror optics (e.g., nested paraboloidal mirror optics; a paraboloidal mirror lens co-axially nested inside a Wolter optic). For example, the Wolter optic can have a hyperboloidal surface segment and a paraboloidal surface segment configured such that a focus of the hyperboloidal surface segment is aligned with the x-ray source 410 and the focus of the paraboloidal surface segment is aligned to another focus of the hyperboloidal surface segment. As shown in FIG. 4B, the polycapillary optic or nested mirror optic receives the x-rays 124 from the x-ray source 410 over a corresponding solid angle of collection and reflects the x-rays 124 into the substantially collimated x-ray beam 120. In certain implementations, the inner surface of the polycapillary optic is coated with a layer of a material different from the substrate material (e.g., glass) of the polycapillary optic. The coating material can be configured to improve the x-ray reflectivity of the polycapillary optic. For example, the coating material can comprise atomic elements with atomic numbers smaller than 15 (e.g., $B_4C$; MgO; LiF; $Si_3N_4$; $SiO_2$; BeO) and/or at least one of: Ni, Cr, Cu. Techniques for applying the coating material include but are not limited to: atomic layer deposition and chemical vapor deposition. In certain implementations, the coating material comprises an organic material with a mass density less than 1.5 g/cm$^3$. Such a coating material can be used to reduce the critical angle of the reflecting surfaces. The coating material can be used to achieve lower angular beam divergence of the polycapillary optic for use in a wavelength spectrometer where a flat diffractor (e.g., single crystal; double crystal) is configured after the polycapillary optic.

In certain implementations, the at least one collimating x-ray optic 420 comprises at least one Soller slit. As shown in FIG. 4B, the at least one Soller slit is configured to receive the x-rays 124 from the x-ray source 410 and to limit the angular spread W of the x-rays 124 emitted from the at least one Soller slit.

In certain implementations, the at least one collimating x-ray optic 420 comprises a compound capillary optic comprising a monocapillary optic and a polycapillary optic having a hollow core, the monocapillary optic nested inside the hollow core. The polycapillary optic can be produced by removing one or more capillaries near the center axis of a polycapillary optic or by producing a polycapillary optic without capillaries near the central axis. The quadric surface of the monocapillary optic can be ellipsoidal, paraboloidal, hyperboloidal, or a combination thereof. The monocapillary optic and the polycapillary optic can be rigidly attached to one another with their optical axes substantially parallel to one another (e.g., colinear with one another, defining a common longitudinal axis, along the x-ray propagation axis 122).

In certain implementations, the compound capillary optic is configured to produce the substantially collimated x-ray beam 120. The portion of the x-ray beam 120 produced by the polycapillary optic has larger angular beam divergence than does the portion of the x-ray beam 120 produced by the monocapillary optic. The optical properties of the compound capillary optic can be configured for x-ray analysis with the x-ray beam 120 and an x-ray wavelength dispersive spectrometer (e.g., small angle x-ray scattering, single crystal x-ray diffraction). For example, for an x-ray wavelength dispersive spectrometer in which the compound capillary optic is placed upstream of a flat Bragg diffractor 110 (e.g., a single crystal, mosaic crystal, stacked crystals diffractor, or multilayer), the larger angular beam divergence of the polycapillary optic can be configured to provide higher efficiency with coarser energy resolution while the lower angular beam divergence of the monocapillary optic can be configured to provide higher energy resolution but lower flux.

In certain implementations, the compound capillary optic further comprises at least one central beam stop configured to block x-rays entering or exiting the monocapillary optic and/or at least one aperture to block x-rays entering or exiting the polycapillary optic, thereby selecting the beam portion from the polycapillary optic and/or the beam portion from the monocapillary optic. The at least one central beam stop can be controllably moved (e.g., via at least one computer controlled motorized motion stage) to block or to allow x-rays 124 to impinge the monocapillary optic and/or to propagate from the monocapillary optic towards the downstream flat Bragg diffractors 110 or sequential stack 300. The at least one aperture can be controllably moved (e.g., via at least one computer controlled motorized motion stage) to block or to allow x-rays 124 to impinge the polycapillary optic and/or to propagate from the polycapillary optic towards the downstream flat Bragg diffractors 110 or sequential stack 300.

Figure 5A:
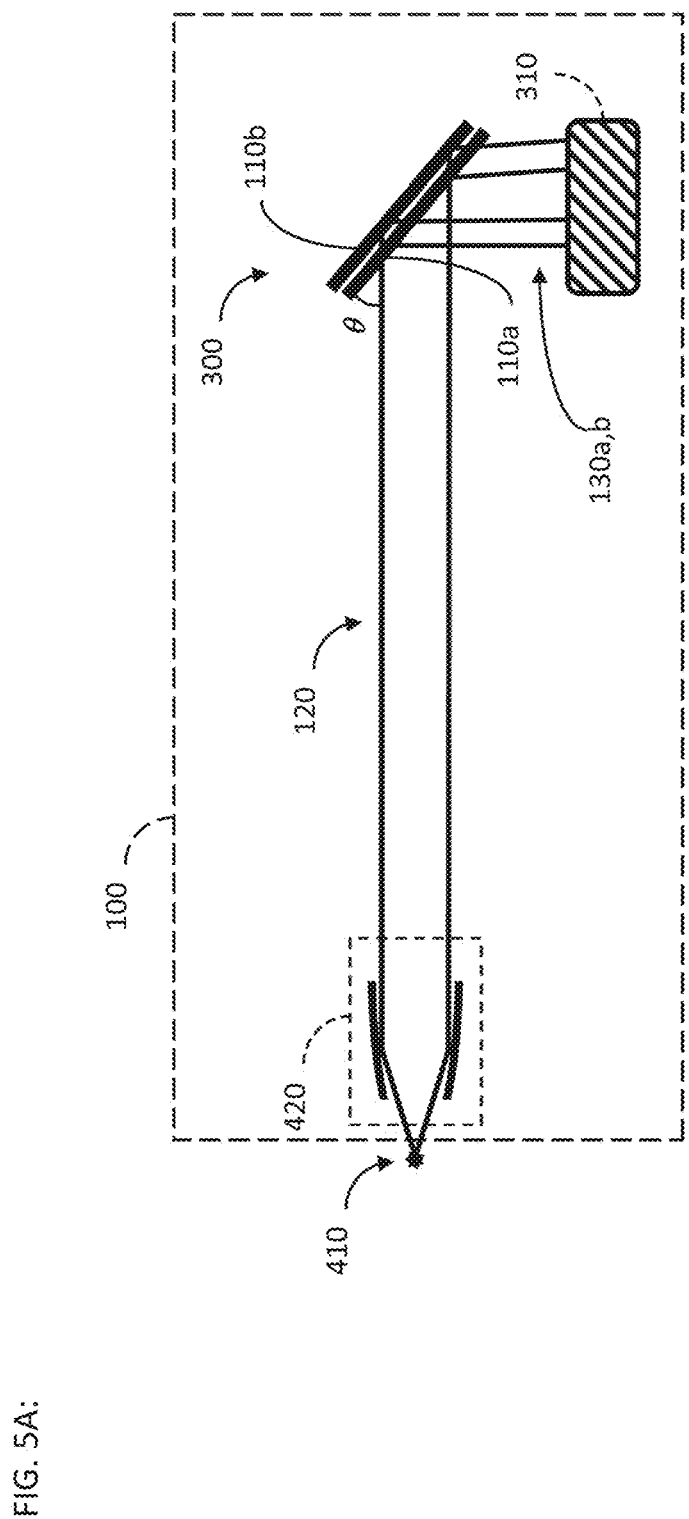
FIGS. 5A-5C schematically illustrate three example apparatus comprising at least one stacked plurality of flat Bragg diffractors in accordance with certain implementations described herein.
Figure 5B:
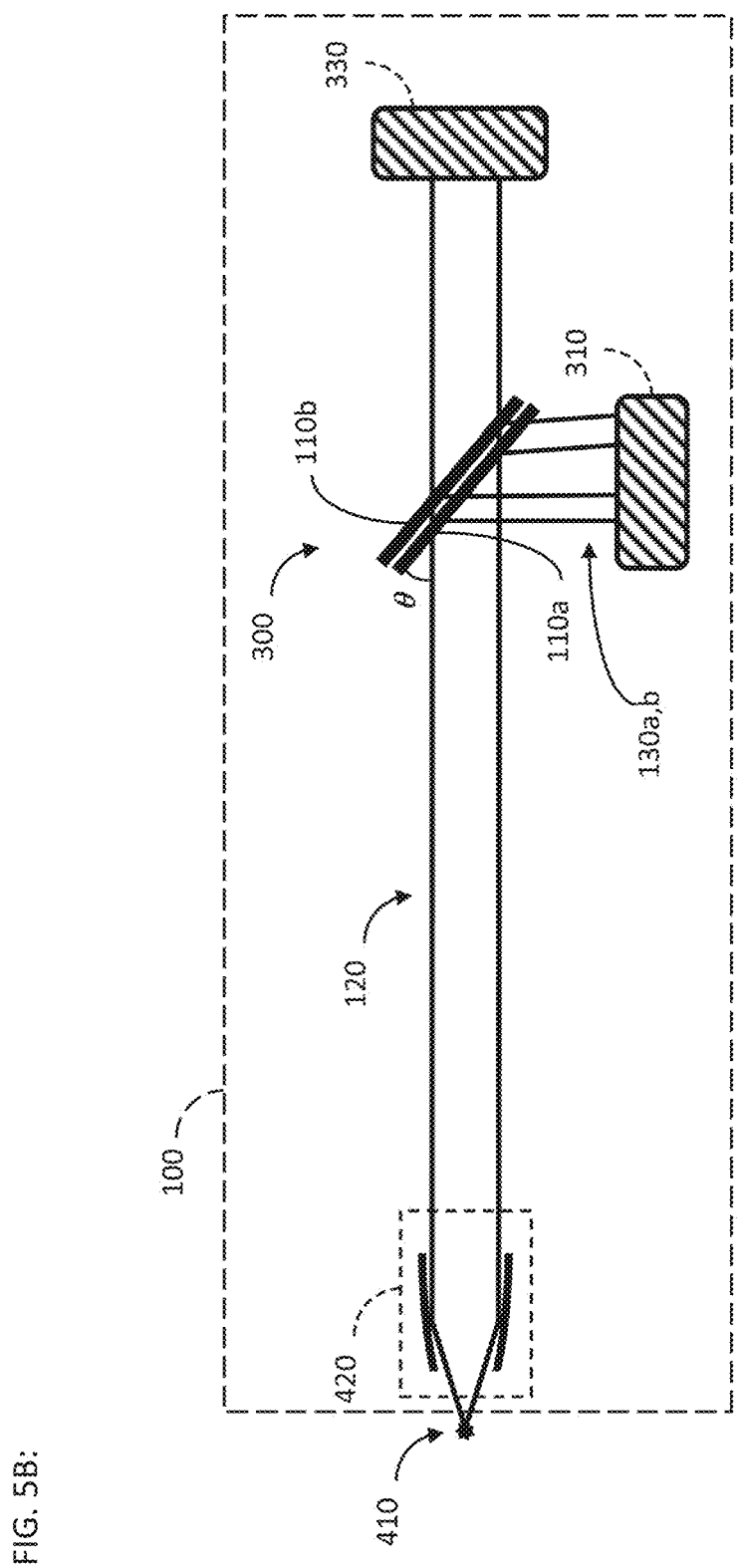
Figure 5C:
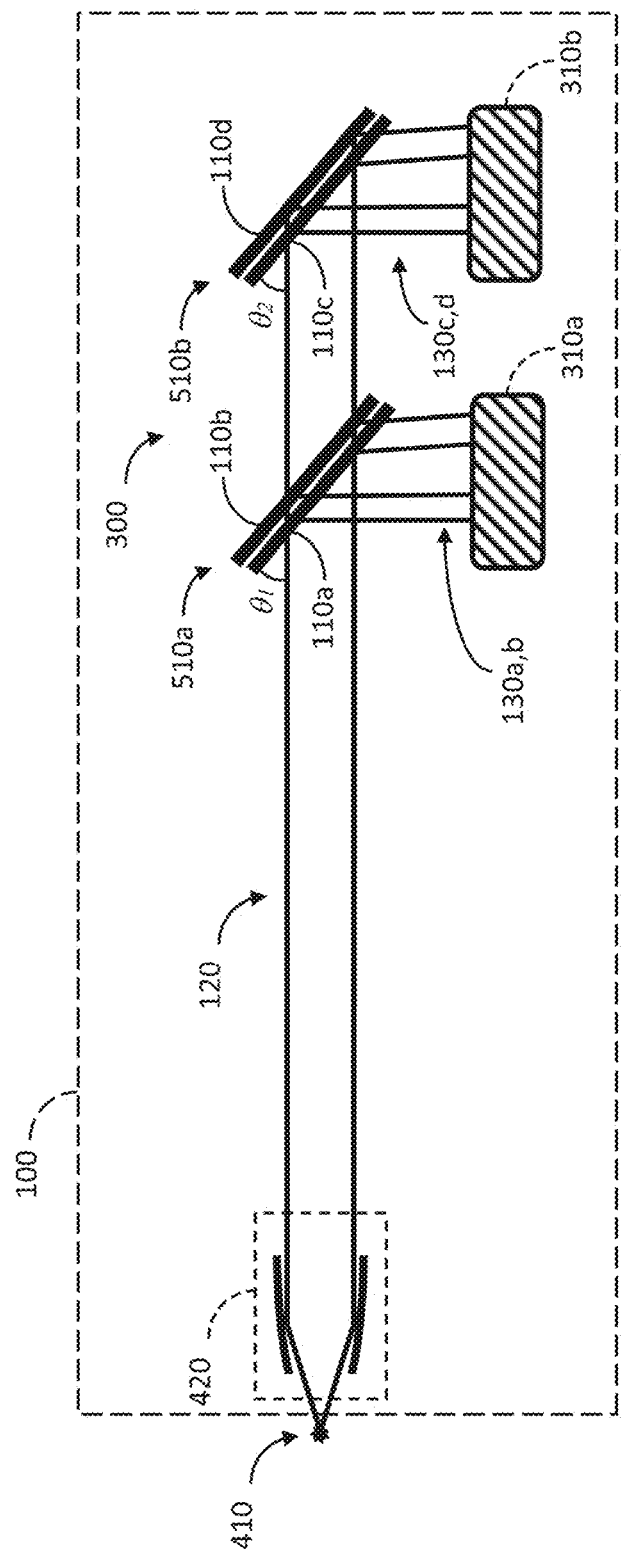

FIGS. 5A-5C schematically illustrate three example apparatus 100 comprising at least one stacked plurality of flat Bragg diffractors 110 in accordance with certain implementations described herein. In FIGS. 5A-5C, the apparatus 100 is an x-ray wavelength dispersive spectrometer (e.g., sequential wavelength dispersive spectrometer) that comprises the plurality of stacked flat Bragg diffractors 110, the at least one x-ray detector 310, and the at least one x-ray collimating optic 420 (e.g., but not the x-ray source 410). The plurality of stacked flat Bragg diffractors 110 of FIGS. 5A-5C comprises a pair of flat crystal diffractors (e.g., first and second flat Bragg diffractors 110a,b; single crystals; mosaic crystals) that are stacked with one another and that are configured to direct corresponding diffracted portions 130a,b towards the at least one first x-ray detector 310. The at least one x-ray detector 310 of FIGS. 5A and 5B is configured to receive both the first and second diffracted portions 130a,b.

The at least one x-ray collimating optic 420 of FIGS. 5A-5C can comprise a plurality of single capillary optics that are coaxially nested. An inner single capillary optic can be configured to output a substantially collimated (e.g., substantially parallel) x-ray beam 120 with a maximum x-ray energy band higher than that of an x-ray beam output by an outer single capillary optic. In certain implementations, the at least one collimating x-ray optic 420 comprises two single capillary optics each with a paraboloidal surface, the two single capillary optics configured such that their foci are aligned with the x-ray source 410 (e.g., primary source; secondary source) and the inner capillary optic is configured to reflect and collimate x-rays of energies less than 20 keV (e.g., less than 10 keV; less than 8 keV; less than 5 keV), while the outer capillary optic is configured to reflect and collimate x-rays of energies less than 3 keV (e.g., less than 2 keV; less than 1 keV; less than 0.5 keV).

In certain implementations, at least one flat Bragg diffractor 110 of the at least one stacked plurality of flat Bragg diffractors 110 is configured to diffract one x-ray fluorescence line of lower energy of an atomic element (e.g., $L_{\alpha 1}$ x-ray line of Cu, or $L_{\alpha 1}$ x-ray line of Pt) and at least one other flat Bragg diffractor 110 of the at least one stacked plurality of flat Bragg diffractors 110 is configured to diffract one x-ray fluorescence line of higher energy of the same atomic element (e.g., $K_{\alpha 1}$ x-ray line of Cu, or $K_{\alpha 1}$ x-ray line of Pt). For example, the first flat Bragg diffractor 110a configured to diffract the lower energy x-ray fluorescence line can be positioned upstream of the second flat Bragg diffractor 110b configured to diffract the higher energy x-ray fluorescence line. Certain such implementations can enable probing of the depth of the atomic element from a surface of the sample containing the atomic element. For example, the material and diffraction plane Miller index of at least one upstream flat Bragg diffractor 110 (e.g., selected from the group consisting of: InSb, PET, ADP, RAP, beryl, TlAP, and quartz) can be configured to diffract x-rays with lower energy (e.g., less than 2 keV; less than 1 keV; less than 0.5 keV) and at least one downstream flat Bragg diffractor 110 (e.g., a single crystal; stacked flat crystals; selected from the group consisting of: Si, Ge, LiF, HOPG, and HAPG) can be configured to diffract x-rays with higher energy (e.g., greater than 3 keV; greater than 5 keV; greater than 10 keV).

In certain implementations, the first flat Bragg diffractor 110a is configured to diffract an x-ray fluorescence line of an atomic element (e.g., $L_{\alpha 1}$ x-ray line of Cu; $L_{\alpha 1}$ x-ray line of Pt) and the second flat Bragg diffractor 110b is configured to diffract x-rays of energy slightly smaller or larger than that of the first flat Bragg diffractor 110a to provide background for more accurate measurement of the x-ray fluorescence line.

The apparatus 100 of FIG. 5B further comprises at least one third x-ray detector 330 (e.g., energy dispersive detector) configured to receive x-rays 124 that are transmitted through the plurality of stacked flat Bragg diffractors 110 (e.g., the at least one third x-ray detector 330 is downstream from the first and second flat Bragg diffractors 110a,b). Examples of the at least one third x-ray detector 330 include but are not limited to: a proportional counter; an ionization chamber; a silicon drift detector; lithium-doped germanium or silicon detector; an x-ray scintillator counter; a pin diode detector; a pixel array x-ray photon counter.

In certain such implementations, the apparatus 100 comprises both an x-ray wavelength dispersive spectrometer and an energy dispersive spectrometer. For example, the at least one wavelength dispersive spectrometer can be configured to measure characteristic x-ray lines having energy differences less than the energy resolution of the energy dispersive detector (e.g., Si K x-ray lines; Ta Mα x-ray lines; W Mα x-ray lines). In certain implementations, the at least one wavelength dispersive spectrometer is configured to measure at least one characteristic x-ray line having a low signal to background ratio (e.g., due to either low concentration of the at least one atomic element associated with the at least one characteristic x-ray line or a large background contribution to the detected signal). In certain implementations, the plurality of stacked flat Bragg diffractors 110 is configured to analyze x-ray fluorescence spectral lines of a plurality of atomic elements with sufficient energy resolution that cannot be resolved by the energy dispersive detector.

In certain implementations, the apparatus 100 can comprise a longitudinal x-ray wavelength dispersive spectrometer comprising a plurality of wavelength dispersive spectrometers that are longitudinally arranged along the x-ray propagation axis 122. For example, the apparatus 100 of FIG. 5C comprises a first wavelength dispersive spectrometer (WDS) 510a comprising a first pair of stacked flat Bragg diffractors 110 (e.g., first and second flat Bragg diffractors 110a,b that are stacked with one another) and a first x-ray detector 310a configured to receive the diffracted portions 130a,b from the first and second flat Bragg diffractors 110a,b. The apparatus 100 of FIG. 5C further comprises a second WDS 510b comprising a second pair of stacked flat Bragg diffractors 110 (e.g., third and fourth flat Bragg diffractors 110c,d that are stacked with one another and are separate from the first and second flat Bragg diffractors 110a,b) and a second x-ray detector 310b configured to receive the diffracted portions 130c,d from the third and fourth flat Bragg diffractors 110c,d. The second WDS 510b is positioned sequentially (e.g., downstream) from the first WDS 510a. The spectral bands of the first and second x-ray wavelength dispersive spectrometers have minimal spectral overlap (e.g., less than 3%; less than 1%). In certain implementations, the third and fourth flat Bragg diffractors 110c,d of the second WDS 510b can be replaced by a single flat crystal diffractor. For example, the single flat crystal diffractor can comprise a diamond, LiF, Si, or Ge crystal (e.g., in symmetric cut form or asymmetric cut form), a channel cut crystal, a stack crystals diffractor, or a mosaic crystal (e.g., HAPG or HAPG) and can be placed at a position that is upstream or downstream relative to first and second diffractors 110a,b. The first and second WDSs 510a,b can be configured such that the at least one flat Bragg diffractor 110 or a stacked plurality of flat Bragg diffractors 110 of the first WDS 510a has higher x-ray transmission for the x-rays 124 to be diffracted by the at least one flat Bragg diffractor 110 of the second WDS 510b than do the at least one flat Bragg diffractor 110 or a stacked plurality of flat Bragg diffractors 110 of the second WDS 510b. Other configurations can comprise additional flat Bragg diffractors 110 and/or stacked plurality of flat Bragg diffractors 110 and x-ray detectors 310 to provide a longitudinal x-ray wavelength dispersive spectrometer comprising one or more additional WDSs.

In certain implementations, at least two of the flat Bragg diffractors 110 of the longitudinal wavelength dispersive spectrometer of FIG. 5C are configured to measure two specific x-ray energies (e.g., two characteristic x-ray lines). In certain implementations, each of the flat Bragg diffractors 110 or stacked plurality of flat Bragg diffractors 110 is configured to measure one specific characteristic x-ray line. In certain implementations, the Bragg angle of at least one of the flat Bragg diffractors 110 or stacked plurality of flat Bragg diffractors 110 is configured to be scanned over a predetermined angular range to measure the x-ray spectrum of the substantially parallel x-ray beam 120. In certain implementations, the number of flat Bragg diffractors 110 including stacked flat Bragg diffractors 110 is in a range of 2 to 10. In certain implementations, the positioning and alignment of at least some of the components of the longitudinal wavelength dispersive spectrometer is performed via computer controlled motorized motion stages.

In certain implementations, the at least two flat Bragg diffractors 110 of a plurality of stacked flat Bragg diffractors 110 comprise a first flat crystal diffractor configured to diffract a first fluorescence x-ray line of lower energy of an atomic element (e.g., $L_{\alpha 1}$ x-ray line of Cu; $L_{\alpha 1}$ x-ray line of Pt) and a second flat crystal diffractor configured to diffract a second fluorescence x-ray line of higher energy of the same atomic element (e.g., $K_{\alpha 1}$ x-ray line of Cu; $K_{\alpha 1}$ x-ray line of Pt). The first flat crystal diffractor can be positioned upstream of the second flat crystal diffractor. Certain such implementations can enable probing of the depth of the atomic element from a surface of the sample containing the atomic element.

In certain implementations, the at least two flat Bragg diffractors 110 of a plurality of stacked flat Bragg diffractors 110 comprise a first flat crystal diffractor configured to diffract a first fluorescence x-ray line of an atomic element (e.g., $L_{\alpha 1}$ x-ray line of Cu; $L_{\alpha 1}$ x-ray line of Pt) and a second flat crystal diffractor configured to diffract x-rays 124 of energy slightly smaller or larger than that of the first flat crystal diffractor to provide background for more accurate measurement of the fluorescence x-ray line.

Example Implementations for x-Ray Fluorescence (XRF) Composition Analysis

In certain implementations, the diffracted portions 130 of x-rays 124 diffracted by at least two flat Bragg diffractors 110 of a plurality of stacked flat Bragg diffractors 110 are portions of a single characteristic x-ray line and have minimal spectral overlap (e.g., less than 5%; less than 1%) between them (e.g., a first flat Bragg diffractor 110a diffracts a first diffracted portion 130a comprising a lower energy half of the characteristic x-ray line and a second flat Bragg diffractor 110b diffracts a second diffracted portion 130b comprising a higher energy half of the characteristic x-ray line). For example, the at least two flat Bragg diffractors 110 can comprise two LiF(111) crystal diffractors having an angular difference of about 40 microradians, each LiF(111) crystal diffractor diffracting approximately one-half of the Cu $K_{\alpha 1}$ x-ray line. Such implementations can be used when the intrinsic energy resolution $\Delta E_c$ of the flat Bragg diffractor 110 is narrower than the total energy resolution $\Delta E$ for a given measurement (e.g., the crystal diffractors can operate at high Bragg angles when the angular beam divergence $\Delta \theta$ is larger than the Darwin widths of the stacked flat Bragg diffractors 110). In certain implementations, at least two stacked flat Bragg diffractors 110 are configured to concurrently diffract two predetermined characteristic x-ray fluorescence lines of one atomic element (e.g., Cu $K_{\alpha 1}$ x-ray line and Cu $K_{\alpha 2}$ x-ray line) and a single x-ray detector 310 (e.g., either energy resolving or not energy resolving) is configured to detect the diffracted portions 130. In certain implementations, the x-ray detector 310 has an energy resolution that is less than 25% (e.g., less than 10%) of the mean (e.g., central) energy of at least one diffracted portion 130 diffracted by the stacked flat Bragg diffractors 110 and received by the x-ray detector 310 (e.g., to minimize or eliminate higher diffraction orders or harmonics contribution to the detected signal).

For example, the plurality of stacked flat Bragg diffractors 110 can comprise two flat mosaic crystal diffractors, one flat Bragg diffractor 110 configured to diffract Cu $K_{\alpha 1}$ x-rays and the other flat Bragg diffractor 110 configured to diffract Cu $K_{\alpha 2}$ x-rays. In certain implementations, at least two stacked flat Bragg diffractors 110 are configured to diffract x-rays with $\Delta E$ optimized for a given analysis (e.g., two characteristic x-ray lines of an atomic element, such as $\Delta E=20$ eV for Cu $K_{\alpha 1}$ x-ray line and $K_{\alpha 2}$ x-ray line; XANES measurements with an energy resolving power $E/\Delta E$ greater than or equal to $10^{-4}$; EXAFS measurements with an energy resolution of about 3-6 eV).

In certain implementations, at least two stacked flat Bragg diffractors 110 of a plurality of stacked flat Bragg diffractors 110 are configured to concurrently diffract two predetermined characteristic x-ray fluorescence lines of two different atomic elements and a single energy dispersive x-ray detector 310 (e.g., silicon drift detector with an energy resolution finer than the energy difference between the two predetermined characteristic x-ray lines) is configured to detect the diffracted characteristic x-rays.

In certain implementations, multiple flat Bragg diffractors 110 are configured to concurrently diffract a predetermined plurality of characteristic x-ray fluorescence lines of multiple atomic elements and an energy dispersive detector 310 (e.g., silicon drift detector) having sufficient energy resolution to differentiate the characteristic x-ray lines is used to detect the diffracted characteristic x-rays. For example, a sequentially stacked crystal analyzer can comprise at least three crystal diffractors configured with appropriate Bragg angle differences to concurrently diffract three $K_{\alpha 1}$ x-ray lines of three atomic elements (e.g., Cr, Fe, Cu) with energy differences greater than 120 eV (e.g., greater than 200 eV; greater than 1000 eV). The analyzer can further comprise an energy dispersive detector (e.g., silicon drift detector, lithium drift detector, or charge coupled detector) configured to detect the diffracted characteristic x-ray lines.

In certain implementations, some of the flat Bragg diffractors 110 of a plurality of stacked flat Bragg diffractors 110 are configured to diffract one or two characteristic x-ray lines of a predetermined atomic element (e.g., Cu $K_{\alpha 1}$ x-ray line and Cu $K_{\alpha 2}$ x-ray line) while other flat Bragg diffractors 110 are configured to diffract characteristic line(s) of different predetermined atomic element(s). In certain implementations, some of the flat Bragg diffractors 110 of the plurality of stacked flat Bragg diffractors 110 are configured to diffract one or two characteristic x-ray lines of a predetermined atomic element (e.g., Cu $K_{\alpha 1}$ x-ray line and Cu $K_{\alpha 2}$ x-ray line) while other flat Bragg diffractors 110 are configured to diffract x-rays near at least one of the predetermined characteristic x-ray lines for obtaining background counts. In certain implementations, the upstream flat Bragg diffractor(s) 110 are configured to diffract characteristic line(s) of weaker intensity while the downstream flat Bragg diffractor(s) 110 are configured to diffract characteristic x-ray lines of higher intensity. In certain implementations, the upstream flat Bragg diffractors 110 are selected have an x-ray transmission greater than 2% for x-rays to be diffracted by at least one downstream flat Bragg diffractor 110.

Example Implementations for XAS

In certain implementations for XAS applications, such as x-ray absorption near edge structure (XANES) or extended x-ray absorption fine structure (EXAFS), at least two flat Bragg diffractors 110 of a plurality of stacked flat Bragg diffractors 110 are configured to diffract x-rays having x-ray energies within a predetermined energy resolution with minimal spectral overlap (e.g., less than 5%; less than 1%) between the diffracted portions 130. For example, one diffracted portion 130 can correspond to the lower energy half of the characteristic x-ray line and the other diffracted portion 130 can correspond to the higher energy half of the characteristic x-ray line (e.g., two LiF(111) crystal diffractors having an angular difference of about 40 microradians for Cu $K_{\alpha 1}$ x-rays). Such implementations can be used when the intrinsic energy resolution $\Delta E_c$ of the flat Bragg diffractor 110 is narrower than the total energy resolution E for a given measurement (e.g., the crystal diffractors can operate at high Bragg angles when the angular beam divergence $\Delta \theta$ is larger than the Darwin widths of the stacked flat Bragg diffractors 110). In certain implementations, at least two stacked flat Bragg diffractors 110 of the plurality of stacked flat Bragg diffractors 110 are configured to concurrently diffract at least two predetermined x-ray energies having an energy difference larger than the energy resolution of the x-ray detector 310 (e.g., silicon drift detector) configured to record the diffracted portions 130 diffracted by the at least two stacked flat Bragg diffractors 110. For XANES measurements, the energy difference can be less than 250 eV but larger than the energy resolution of the x-ray detector 310. For EXAFS measurements, the energy difference can be less than 700 eV but larger than the energy resolution of the x-ray detector 310.

In certain implementations, the stacked flat Bragg diffractors 110 are scanned over an angular range with respect to the x-ray propagation axis 122 of the collimated x-ray beam 120 in response to a previous XAS measurement. In certain implementations, the analyzer comprises the plurality of stacked flat Bragg diffractors 110 and at least one single crystal diffractor 320 configured to diffract x-rays having x-ray energies within a predetermined energy range (e.g., in a range of 100 eV to 200 eV for XANES; in a range of 500 eV to 1000 eV for EXAFS). In certain implementations, a plurality of x-ray detectors 310 are configured to detect x-rays diffracted by the stacked flat Bragg diffractors 110 and the at least one single crystal diffractor 320. In certain implementations, all the stacked flat Bragg diffractors 110 are configured such that the energy resolving power ($E_o/\Delta E$) for the diffracted x-rays by each flat Bragg diffractor 110 of the plurality of stacked flat Bragg diffractors 110 is greater or equal to $10^{-4}$ for XANES measurements and/or the energy resolution E is less than 6 eV (e.g., less than 3 eV) for EXAFS measurements. In certain implementations, the plurality of stacked flat Bragg diffractors 110 is configured to diffract x-rays of predetermined x-ray energies for a given XAS measurement (e.g., x-ray energies corresponding to pre-edge, white line, predetermined x-ray energies containing important structural information for the measurement, such as high absorption and/or low absorption energies). In certain implementations, the number of energy measurement points can be in a range of 5 to 100.

Although commonly used terms are used to describe the systems and methods of certain implementations for ease of understanding, these terms are used herein to have their broadest reasonable interpretations. Although various aspects of the disclosure are described with regard to illustrative examples and implementations, the disclosed examples and implementations should not be construed as limiting. Conditional language, such as "can," "could," "might," or "may," unless specifically stated otherwise, or otherwise understood within the context as used, is generally intended to convey that certain implementations include, while other implementations do not include, certain features, elements, and/or steps. Thus, such conditional language is not generally intended to imply that features, elements, and/or steps are in any way required for one or more implementations. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Conjunctive language such as the phrase "at least one of X, Y, and Z," unless specifically stated otherwise, is to be understood within the context used in general to convey that an item, term, etc. may be either X, Y, or Z. Thus, such conjunctive language is not generally intended to imply that certain implementations require the presence of at least one of X, at least one of Y, and at least one of Z.

Language of degree, as used herein, such as the terms "approximately," "about," "generally," and "substantially," represent a value, amount, or characteristic close to the stated value, amount, or characteristic that still performs a desired function or achieves a desired result. For example, the terms "approximately," "about," "generally," and "substantially" may refer to an amount that is within ±10% of, within ±5% of, within ±2% of, within ±1% of, or within ±0.1% of the stated amount. As another example, the terms "generally parallel" and "substantially parallel" refer to a value, amount, or characteristic that departs from exactly parallel by ±10 degrees, by ±5 degrees, by ±2 degrees, by ±1 degree, or by ±0.1 degree, and the terms "generally perpendicular" and "substantially perpendicular" refer to a value, amount, or characteristic that departs from exactly perpendicular by ±10 degrees, by ±5 degrees, by ±2 degrees, by ±1 degree, or by ±0.1 degree. The ranges disclosed herein also encompass any and all overlap, sub-ranges, and combinations thereof. Language such as "up to," "at least," "greater than," less than," "between," and the like includes the number recited. As used herein, the meaning of "a," "an," and "said" includes plural reference unless the context clearly dictates otherwise. Also, as used in the description herein, the meaning of "in" includes "into" and "on," unless the context clearly dictates otherwise.

While the structures and/or methods are discussed herein in terms of elements labeled by ordinal adjectives (e.g., first, second, etc.), the ordinal adjectives are used merely as labels to distinguish one element from another, and the ordinal adjectives are not used to denote an order of these elements or of their use.

Various configurations have been described above. It is to be appreciated that the implementations disclosed herein are not mutually exclusive and may be combined with one another in various arrangements. Although this invention has been described with reference to these specific configurations, the descriptions are intended to be illustrative of the invention and are not intended to be limiting. Various modifications and applications may occur to those skilled in the art without departing from the true spirit and scope of the invention. Thus, for example, in any method or process disclosed herein, the acts or operations making up the method/process may be performed in any suitable sequence and are not necessarily limited to any particular disclosed sequence. Features or elements from various implementations and examples discussed above may be combined with one another to produce alternative configurations compatible with implementations disclosed herein. In addition, although the disclosed methods and apparatuses have largely been described in the context of various devices, various implementations described herein can be incorporated in a variety of other suitable devices, methods, and contexts.

Various aspects and advantages of the implementations have been described where appropriate. It is to be understood that not necessarily all such aspects or advantages may be achieved in accordance with any particular implementation. Thus, for example, it should be recognized that the various implementations may be carried out in a manner that achieves or optimizes one advantage or group of advantages as taught herein without necessarily achieving other aspects or advantages as may be taught or suggested herein.

What is claimed is:

1. An apparatus comprising:
   a plurality of flat Bragg diffractors comprising at least a first flat Bragg diffractor and a second flat Bragg diffractor, the first and second flat Bragg diffractors positioned sequentially along an x-ray propagation axis of an x-ray beam comprising x-rays and having an angular beam divergence less than 30 mrad in at least one direction, the first and second flat Bragg diffractors sequentially impinged by the x-rays and configured to reflect and diffract corresponding reflected and diffracted portions of the x-rays; and an energy dispersive x-ray detector configured to receive and detect the reflected and diffracted portions from the plurality of flat Bragg diffractors.

2. The apparatus of claim 1, wherein the first flat Bragg diffractor comprises a substantially flat multilayer, single crystal, or mosaic crystal configured to diffract at least some of the x-rays in accordance with Bragg's law.

3. The apparatus of claim 1, wherein the first flat Bragg diffractor and the second flat Bragg diffractor are connected to one another and are configured to be sequentially impinged by the x-ray beam.

4. The apparatus of claim 1, wherein the second flat Bragg diffractor is downstream from the first flat Bragg diffractor, the first flat Bragg diffractor configured to reflect and diffract a first reflected and diffracted portion of the x-rays and to transmit a first transmitted portion of the x-rays, the second flat Bragg diffractor configured to reflect and diffract a second reflected and diffracted portion of the first transmitted portion and to transmit a second transmitted portion of the first transmitted portion, the first reflected and diffracted portion having a first mean x-ray energy $E_1$ and a first energy resolution $\Delta E_1$ and the second reflected and diffracted portion having a second mean x-ray energy $E_2$ and a second energy resolution $\Delta E_2$, the second x-ray energy $E_2$ different from the first x-ray energy $E_1$.

5. The apparatus of claim 4, wherein the first flat Bragg diffractor comprises a multilayer Bragg diffractor configured to reflect and diffract x-rays having x-ray energies less than 1 keV and the second flat Bragg diffractor comprises a single crystal and/or mosaic crystal and is configured to reflect and diffract x-rays having x-ray energies greater than 1 keV.

6. The apparatus of claim 5, wherein the multilayer Bragg diffractor has a d-spacing in a range of 3 nanometers to 30 nanometers, the single crystal comprises a material selected from the group consisting of: diamond, quartz, graphite, stack of graphene layers, other materials comprising low atomic number elements, silicon (Si), germanium (Ge), lithium fluoride (LiF), mica, indium antimonide (InSb), polyethylene terephthalate (PET), ammonium dihydrophosphate (ADP), rubidium acid phtahalate (RAP), beryl, and thallium acid phthalate (TlAP), and the mosaic crystal comprises a material selected from the group consisting of: highly annealed pyrolitic graphite (HAPG) and highly oriented pyrolitic graphite (HOPG).

7. The apparatus of claim 4, wherein the plurality of flat Bragg diffractors further comprises a third flat Bragg diffractor downstream from the second flat Bragg diffractor, the third flat Bragg diffractor configured to reflect and diffract a third reflected and diffracted portion of the second transmitted portion and to transmit a third transmitted portion of the second transmitted portion, the third reflected and diffracted portion having a third mean x-ray energy $E_3$ and a third energy resolution $\Delta E_3$, the third x-ray energy $E_3$ different from the first x-ray energy $E_1$ and from the second x-ray energy $E_2$.

8. The apparatus of claim 7, wherein the second flat Bragg diffractor is configured to diffract x-rays having x-ray energies in a range of 1 keV to 3 keV, and the third flat Bragg diffractor comprises a single crystal and/or mosaic crystal and is configured to reflect and diffract x-rays having x-ray energies greater than 3 keV.

9. The apparatus of claim 7, wherein the first flat Bragg diffractor has a first x-ray transmittance greater than 1% for x-rays having the second x-ray energy $E_2$ and a third x-ray transmittance greater than 1% for x-rays having the third x-ray energy $E_3$, and the second flat Bragg diffractor has a second x-ray transmittance greater than 1% for x-rays having the third x-ray energy $E_3$.

10. The apparatus of claim 1, wherein the plurality of flat Bragg diffractors are positioned along the x-ray propagation axis within a region extending along the x-ray propagation axis by a distance less than 200 millimeters.

11. The apparatus of claim 1, wherein at least two adjacent flat Bragg diffractors of the plurality of flat Bragg diffractors are positioned along the x-ray propagation axis spaced from one another along the x-ray propagation axis by less than 30 millimeters.

12. The apparatus of claim 1, wherein at least two flat Bragg diffractors of the plurality of flat Bragg diffractors comprise the same material as one another.

13. The apparatus of claim 12, wherein the at least two flat Bragg diffractors are configured to reflect and diffract x-rays with atomic planes having the same Miller indices as one another and the x-rays are incident to each of the at least two flat Bragg diffractors at different Bragg angles such that a spectral bandwidth overlap between diffracted x-rays from the at least two flat Bragg diffractors is substantially zero.

14. The apparatus of claim 12, wherein the x-rays are incident to each of the at least two flat Bragg diffractors at substantially equal Bragg angles and diffracting atomic planes of the at least two flat Bragg diffractors have different d-spacings.

15. The apparatus of claim 1, wherein at least two flat Bragg diffractors of the plurality of flat Bragg diffractors comprise different materials from one another.

16. The apparatus of claim 1, further comprising:
a fixture comprising a rigid frame; and
a plurality of mounts affixed to the fixture, the plurality of mounts configured to hold the plurality of flat Bragg diffractors along the x-ray propagation axis, each mount comprising a first portion configured to be affixed to a corresponding flat Bragg diffractor of the plurality of flat Bragg diffractors and a second portion configured to be controllably moved to adjust an angle of the corresponding flat Bragg diffractor relative to the x-ray propagation axis.

17. An apparatus configured to receive an x-ray beam propagating along an x-ray propagation axis with an angular beam divergence less than 30 mrad in at least one direction substantially perpendicular to the x-ray propagation axis, the apparatus comprising:
a plurality of sequentially stacked flat Bragg diffractors that are rigidly connected to one another with a separation between adjacent flat Bragg diffractors less than 200 millimeters, the plurality of sequentially stacked flat Bragg diffractors configured to receive the x-ray beam, each flat Bragg diffractor of the plurality of sequentially stacked flat Bragg diffractors configured to diffract a corresponding diffracted portion of the x-ray beam with a spectral overlap between the diffracted portions from different flat Bragg diffractors less than 25%; and
at least one x-ray detector configured to receive and detect the diffracted portions.

18. The apparatus of claim 17, wherein the diffracted portions diffracted by at least two flat Bragg diffractors of the plurality of sequentially stacked flat Bragg diffractors have different mean x-ray energies that differ by less than 30 eV.

19. The apparatus of claim 17, wherein the diffracted portions diffracted by at least two flat Bragg diffractors of the plurality of sequentially stacked flat Bragg diffractors have different mean x-ray energies that differ by more than 50 eV.

20. The apparatus of claim 17, wherein the plurality of sequentially stacked flat Bragg diffractors comprises a first set of stacked flat Bragg diffractors and a second set of stacked flat Bragg diffractors, the at least one x-ray detector comprising a first x-ray detector and a second x-ray detector, the first set of stacked flat Bragg diffractors configured to diffract x-rays towards the first x-ray detector and the second set of stacked flat Bragg diffractors configured to diffract x-rays towards the second x-ray detector.

21. The apparatus of claim 17, wherein the plurality of sequentially stacked flat Bragg diffractors comprises at least one multilayer diffractor, at least one single crystal diffractor, and/or at least one mosaic crystal diffractor.

22. The apparatus of claim 17, wherein the plurality of sequentially stacked flat Bragg diffractors comprises at least two single crystal diffractors configured such that the x-ray beam has a Bragg angle difference relative to the at least two single crystal diffractors that is greater than 10 microradians.

23. The apparatus of claim 17, wherein the plurality of sequentially stacked flat Bragg diffractors comprises more than two flat Bragg diffractors.

24. The apparatus of claim 17, wherein the plurality of sequentially stacked flat Bragg diffractors comprises at least one flat Bragg diffractor having a thickness along the x-ray propagation axis that is less than 500 microns.

25. The apparatus of claim 17, wherein the plurality of sequentially stacked flat Bragg diffractors is configured to diffract at least two characteristic x-ray lines of one or two atomic elements concurrently.

26. The apparatus of claim 17, further comprising at least one motion stage configured to controllably adjust at least one Bragg angle of at least one flat Bragg diffractor of the plurality of sequentially stacked flat Bragg diffractors.

27. The apparatus of claim 17, wherein the at least one x-ray detector is selected from the group consisting of: proportional counter; ionization chamber; silicon drift detector; Li-drift silicon or germanium detector; x-ray scintillator counter; pin diode detector; x-ray photon counter with a plurality of active detector elements; pixel array detector; photon counting detector with selectable energy window; superconductor based microcalorimeter.

28. The apparatus of claim 17, wherein the at least one x-ray detector comprises a photon counting pixel array detector having at least one energy threshold configured to reject x-rays with x-ray energies below the at least one energy threshold and/or to reject x-rays with x-ray energies above the at least one energy threshold.

29. The apparatus of claim 17, further comprising at least one collimating x-ray optic configured to receive x-rays propagating from an x-ray source and to form the x-ray beam.

* * * * *

UNITED STATES PATENT AND TRADEMARK OFFICE
CERTIFICATE OF CORRECTION

| | |
|---|---|
| PATENT NO. | : 12,209,977 B2 |
| APPLICATION NO. | : 18/439625 |
| DATED | : January 28, 2025 |
| INVENTOR(S) | : Wenbing Yun et al. |

Page 1 of 1

It is certified that error appears in the above-identified patent and that said Letters Patent is hereby corrected as shown below:

In the Specification

Column 3, Line 16, delete "resolution $\Delta\theta$." and insert -- resolution $\Delta E$. --.

Column 5, Line 14, delete "divergence 30, so" and insert -- divergence $\Delta\theta$, so --.

Column 11, Line 32, delete "resolution IE from" and insert -- resolution $\Delta E$ from --.

Column 22, Line 63, delete "resolution E for" and insert -- resolution $\Delta E$ for --.

Column 23, Line 32, delete "resolution E is" and insert -- resolution $\Delta E$ is --.

Signed and Sealed this
Thirteenth Day of May, 2025

Coke Morgan Stewart
*Acting Director of the United States Patent and Trademark Office*